(12) United States Patent
Tang et al.

(10) Patent No.: US 11,294,501 B2
(45) Date of Patent: Apr. 5, 2022

(54) METHOD FOR PROXIMITY SENSING

(71) Applicant: Novatek Microelectronics Corp., Hsinchu (TW)

(72) Inventors: Yu-Ying Tang, Taoyuan (TW); Ching-Yang Pai, Taipei (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/796,961

(22) Filed: Feb. 21, 2020

(65) Prior Publication Data
US 2020/0272329 A1 Aug. 27, 2020

Related U.S. Application Data

(60) Provisional application No. 62/808,845, filed on Feb. 22, 2019, provisional application No. 62/838,913, filed on Apr. 25, 2019.

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01); *G06F 2203/04108* (2013.01)

(58) Field of Classification Search
CPC .............. G06F 3/041662; G06F 3/044; G06F 2203/04108
See application file for complete search history.

(56) References Cited

U.S. PATENT DOCUMENTS

| | | | |
|---|---|---|---|
| 9,870,110 | B2 | 1/2018 | Lee et al. |
| 10,061,460 | B2 | 8/2018 | Lee et al. |
| 2009/0250268 | A1 | 10/2009 | Staton et al. |
| 2015/0103277 | A1 | 4/2015 | Ishizaki et al. |
| 2016/0179251 | A1 | 6/2016 | Lee et al. |
| 2018/0095561 | A1 | 4/2018 | Lee et al. |
| 2018/0364830 | A1* | 12/2018 | Shepelev ............ G06F 3/04166 |

FOREIGN PATENT DOCUMENTS

| | | |
|---|---|---|
| TW | 201510796 | 3/2015 |
| TW | 201624237 | 7/2016 |

OTHER PUBLICATIONS

"Office Action of Taiwan Counterpart Application", dated Dec. 2, 2020, p. 1-p. 7.

* cited by examiner

*Primary Examiner* — Peter D McLoone
(74) *Attorney, Agent, or Firm* — JCIPRNET

(57) ABSTRACT

An electronic device controlling a touch panel and performing a proximity sensing method is provided. The electronic device includes a touch controller. The touch controller is configured to group a plurality of touch sensors into a sensing group of one or more touch sensors and a non-sensing group of one or more touch sensors, control the sensing group to perform a proximity or hover sensing operation during a first sensing period and not control the non-sensing group to perform the proximity or hover sensing operation during the first sensing period, set one or more first touch sensors of the non-sensing group to a floating state during the first sensing period, and set one or more second touch sensors of the non-sensing group to a simultaneously-driven state during the first sensing period.

27 Claims, 46 Drawing Sheets

Sensing Setting

Floating Setting

Sensing Setting

Floating Setting

Mutual Sensing

Self Sensing for Proximity Sensing

Sensing Setting

Floating Setting

Sensing Setting

Floating Setting

METHOD FOR PROXIMITY SENSING

CROSS REFERENCE TO RELATED APPLICATION

This application claims the priority benefit of U.S. provisional application Ser. No. 62/808,845, filed on Feb. 22, 2019 and 62/838,913, filed on Apr. 25, 2019. The entirety of the above-mentioned patent applications is hereby incorporated by reference herein and made a part of this specification.

TECHNICAL FIELD

The disclosure is directed to an electronic device comprising a touch controller and controlling a touch panel to perform a proximity sensing method.

BACKGROUND

One of current design trends is to provide a full-screen display in smartphones. In order to reduce the number of components of the display and to increase screen-to-body ratios, smartphone manufacturers also search for solutions to gradually substitute optical proximity sensors.

Proximity or hover sensing is to use touch panel sensors to sense whether an object is near a touch panel. For example: when receiving a phone call, by detecting that the user's face is near the display, it is possible is turn off the display and reduce power consumption. Using touch panel sensors may reduce cost, simplify structural design of smartphones, and allow for higher screen-to-body ratios.

However, using touch panel sensors as proximity sensors also has several disadvantages. Among these disadvantages, touch panel sensors have low sensing sensitivity. Moreover, touch panel sensors perform proximity sensing but only for short distances. Increasing the supply voltage to the touch panel reduces these disadvantages. However, increasing the supply voltage also results in much higher power consumption.

SUMMARY OF THE DISCLOSURE

Accordingly, to address the above described difficulty, the disclosure provides an electronic device comprising a touch controller and controlling a touch panel to perform a proximity sensing method. The touch controller may set a first group of touch sensors to a floating state. The touch controller may set a second group of touch sensors to a simultaneously-driven state. Thus, the proximity sensing method may provide higher sensing sensitivity and hover sensing for longer distances. The proximity sensing method may also provide lower power consumption.

In one of the embodiments, the disclosure is directed to an electronic device to control a touch panel comprising an array of a plurality of touch sensors, the electronic device comprising: a touch controller, configured to group the plurality of touch sensors into a sensing group of one or more touch sensors and a non-sensing group of one or more touch sensors, control the sensing group to perform a proximity or hover sensing operation during a first sensing period and not control the non-sensing group to perform the proximity or hover sensing operation during the first sensing period, wherein the touch controller is configured to set one or more first touch sensors of the non-sensing group to a floating state during the first sensing period, and set one or more second touch sensors of the non-sensing group to a simultaneously-driven state during the first sensing period, wherein at least one of the one or more first touch sensors of the non-sensing group is adjacent to the sensing group.

In one of the embodiments, the disclosure is directed to an electronic device to control a touch panel comprising an array of a plurality of touch sensors, the electronic device comprising: a touch controller, configured to group the plurality of touch sensors into a sensing group and a non-sensing group, control the sensing group to perform a proximity or hover sensing operation during a first sensing period and not control the non-sensing group to perform the proximity or hover sensing operation during the first sensing period, wherein the sensing group comprises a plurality of first touch sensor units each comprising one or more touch sensors, the non-sensing group comprises a plurality of second touch sensor units each comprising one or more touch sensors, the first touch sensor units and the second touch sensor units are arranged in an array and alternately disposed in each column and each row of the array, wherein the touch controller is configured to set one or more of first touch sensors of the non-sensing group to a floating state during the first sensing period, and wherein at least one of the one or more first touch sensors of the non-sensing group is adjacent to the sensing group.

In one of the embodiments, the disclosure is directed to an electronic device, comprising: a touch panel comprising an array of a plurality of touch sensors, the electronic device comprising: a touch controller, coupled to the touch panel and configured to group the plurality of touch sensors into a sensing group of one or more touch sensors and a non-sensing group of one or more touch sensors, control the sensing group to perform a proximity or hover sensing operation during a sensing period and not control the non-sensing group to perform the proximity or hover sensing operation during the sensing period, wherein the touch controller is configured to set one or more first touch sensors of the non-sensing group to a floating state during the sensing period, and set one or more second touch sensors of the non-sensing group to a simultaneously-driven state during the sensing period, wherein at least one of the one or more first touch sensors of the non-sensing group is adjacent to the sensing group.

In one of the embodiments, the disclosure is directed to an electronic device, comprising: a touch panel comprising an array of a plurality of touch sensors; and a touch controller, coupled to the touch panel and configured to group the plurality of touch sensors into a sensing group and a non-sensing group, control the sensing group to perform a proximity or hover sensing operation during a first sensing period and not control the non-sensing group to perform the proximity or hover sensing operation during the first sensing period, wherein the sensing group comprises a plurality of first touch sensor units, the non-sensing group comprises a plurality of second touch sensor units, the first touch sensor units and the second touch sensor units are arranged in an array and alternately disposed in each column and each row of the array, wherein the touch controller is configured to set one or more of first touch sensors of the non-sensing group to a floating state during the first sensing period, and wherein at least one of the one or more first touch sensors of the non-sensing group is adjacent to the sensing group.

In one of the embodiments, the disclosure is directed to a method for driving a touch panel, wherein the touch panel comprises an array of a plurality of touch sensors, the method comprising: grouping the plurality of touch sensors into a sensing group of one or more touch sensors and a non-sensing group of one or more touch sensors; controlling the sensing group to perform a proximity or hover sensing operation during a sensing period and not controlling the non-sensing group to perform the proximity or hover sensing operation during the sensing period; and setting one or more first touch sensors of the non-sensing group to a floating state during the sensing period, and setting one or more second touch sensors of the non-sensing group to a simultaneously-driven state during the sensing period, wherein at least one of the one or more first touch sensors of the non-sensing group is adjacent to the sensing group.

In one of the embodiments, the disclosure is directed to a method for driving a touch panel, wherein the touch panel comprises an array of a plurality of touch sensors, the method comprising: grouping the plurality of touch sensors into a sensing group and a non-sensing group; controlling the sensing group to perform a proximity or hover sensing operation during a first sensing period and not controlling the non-sensing group to perform the proximity or hover sensing operation during the first sensing period, wherein the sensing group comprises a plurality of first touch sensor units, the non-sensing group comprises a plurality of second touch sensor units, the first touch sensor units and the second touch sensor units are arranged in an array and alternately disposed in each column and each row of the array; and setting one or more of first touch sensors of the non-sensing group to a floating state during the first sensing period, wherein at least one of the one or more first touch sensors of the non-sensing group is adjacent to the sensing group.

In one of the embodiments, the disclosure is directed to an electronic device to control a touch panel comprising an array of a plurality of touch sensors, the electronic device comprising: a touch controller, configured to group the plurality of touch sensors into a sensing group of one or more touch sensors and a non-sensing group of one or more touch sensors, control the sensing group to perform a proximity or hover sensing operation during a first sensing period and not control the non-sensing group to perform the proximity or hover sensing operation during the first sensing period, wherein the touch controller is configured to set one or more first touch sensors of the non-sensing group to a floating state during the first sensing period, wherein at least one of the one or more first touch sensors of the non-sensing group is adjacent to the sensing group, the touch controller is configured to obtain a summation value of a first capacitance variation value of a sensing capacitor and a second capacitance variation value of a parasitic capacitor, wherein the sensing capacitor is between an object in proximity to the touch panel and the sensing group and the parasitic capacitor is between the sensing group and the at least one of the one or more first touch sensors of the non-sensing group, wherein the second capacitance variation value is for increasing sensing sensitivity of the proximity or hover sensing operation.

In one of the embodiments, the disclosure is directed to an electronic device to control a touch panel comprising an array of a plurality of touch sensors, the electronic device comprising: a touch controller, configured to group the plurality of touch sensors into a sensing group of one or more touch sensors and a non-sensing group of one or more touch sensors, wherein in a touch sensing operation, the touch controller is configured to set one or more first touch sensors of the non-sensing group to a simultaneously-driven state during a touch sensing period, wherein in a proximity or hover sensing operation, the touch controller is configured to set one or more first touch sensors of the non-sensing group to a floating state during a proximity or hover sensing period, and wherein at least one of the one or more first touch sensors of the non-sensing group is adjacent to the sensing group.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
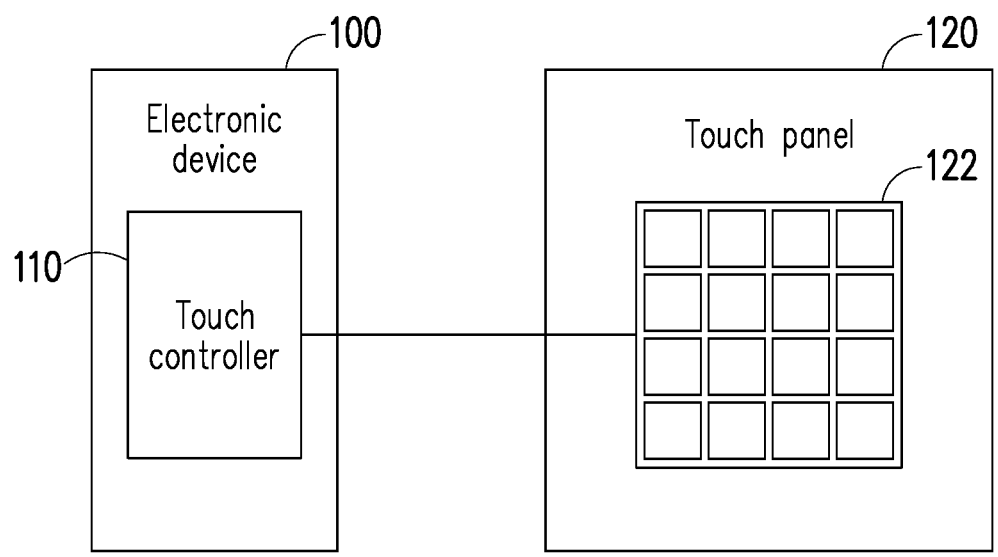
FIG. 1 is a schematic diagram illustrating an electronic device according to an embodiment of the disclosure.

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected", "coupled", and variations thereof herein are used broadly and encompass direct and indirect connections and couplings.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1 is a schematic diagram illustrating an electronic device according to an embodiment of the disclosure. In FIG. 1, the electronic device 100 may include a touch controller 110.

FIG. 1 also illustrates a touch panel. The touch panel 120 may include a plurality of touch sensors 122. The touch panel 120 may be, for example, a capacitive touch panel, capable of performing mutual-capacitance sensing and/or self-capacitance sensing. In addition, the touch panel may be a touch display panel for providing a display function and a touch control function. Moreover, the touch panel may be a touch display panel capable of sensing fingerprints. The touch controller 110 is coupled to the plurality of touch sensors 122. The touch controller 110 is configured to control the touch sensors to perform proximity or hover sensing operation. The proximity or hover sensing operation is able to detect the presence of a nearby object without any physical contact to the touch panel 120. The touch controller 110 may also set the touch sensors to a floating state. The touch controller 110 may also set the touch sensors to a simultaneously-driven state. The proximity or hover sensing operation, the floating state, and the simultaneously-driven state are further described in the several embodiments of the disclosure. Hereinafter, "proximity or hover sensing operation" is referred to as "proximity sensing operation".

Figure 2:
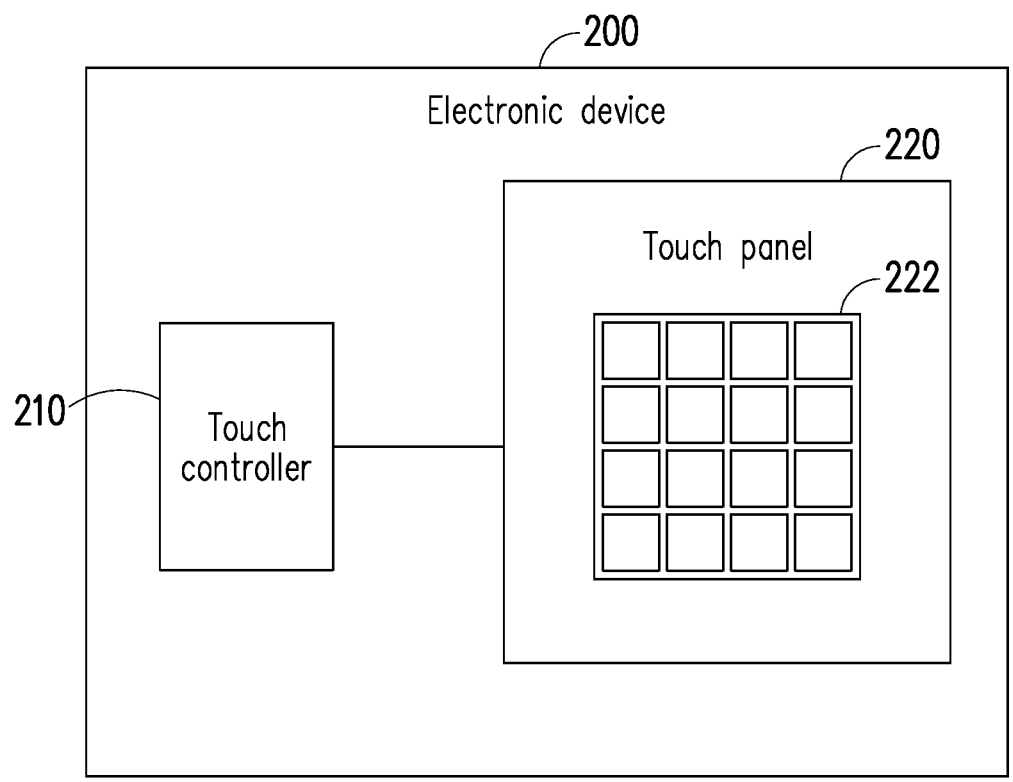
FIG. 2 is a schematic diagram illustrating an electronic device according to an embodiment of the disclosure.

FIG. 2 is a schematic diagram illustrating an electronic device according to an embodiment of the disclosure. Difference between FIG. 2 and FIG. 1 is that the electronic device 200 of FIG. 2 may also include a touch panel 220. The touch panel 220 may also include a plurality of touch sensors 222. The touch controller 210, the touch panel 220 and the plurality of touch sensors 222 are similar to the touch controller 110, the touch panel 120 and the plurality of touch sensors 122 of FIG. 1.

Figure 3A:
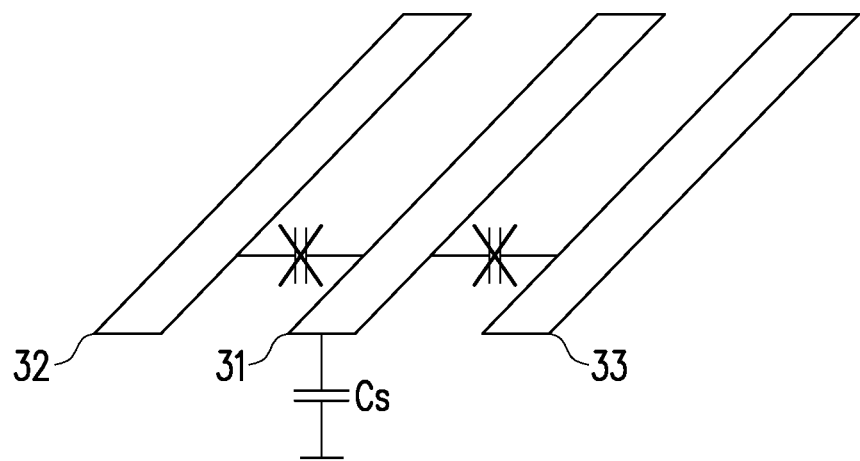
FIGS. 3A and 3B illustrate touch sensors in a simultaneously-driven state according to an embodiment of the disclosure.
Figure 3B:
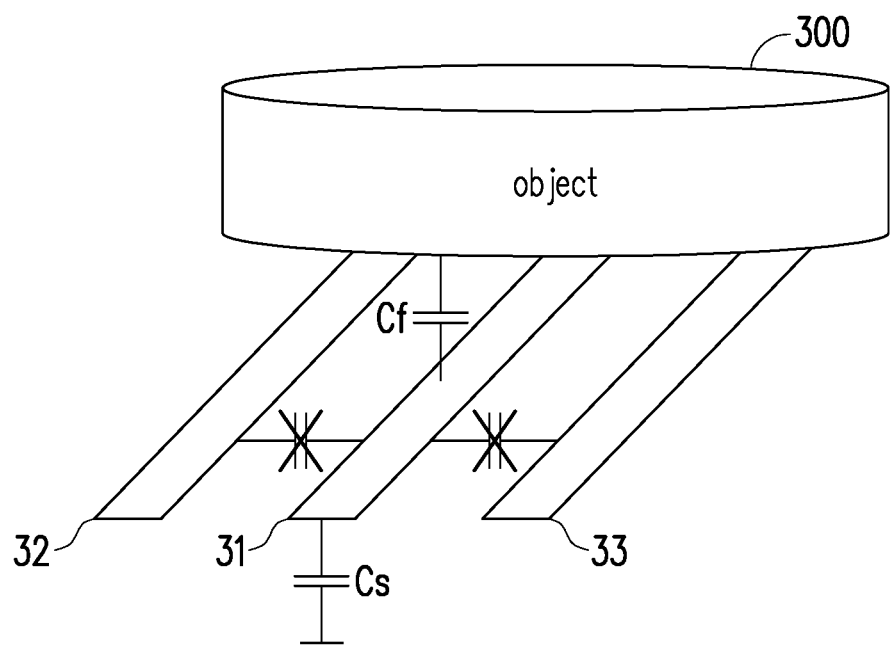

FIGS. 3A and 3B illustrate touch sensors in a simultaneously-driven state according to an embodiment of the disclosure. FIGS. 3A and 3B illustrate touch sensors 31, 32 and 33. In the example of FIGS. 3A and 3B, touch sensor 31 is controlled to perform a proximity sensing operation. The self-capacitance of touch sensor 31 is Cs. In order to reduce sensing load of touch sensor 31, touch sensors 32 and 33 may be driven at the same time as touch sensor 31 performs proximity sensing. Touch sensors 32 and 33 are driven with the same driving signal as touch sensor 31. Thus, touch sensors 32 and 33 are in a simultaneously-driven state.

The touch controller 110 of FIG. 1 or the touch controller 210 of FIG. 2 may control the touch sensors 31, 32 and 33. For example, the touch controller 110 may provide a driving signal to the touch sensor 31. The touch controller 110 may receive a sensing signal from the touch sensor 31. Thus, in FIGS. 3A and 3B, the touch controller 110 may perform a proximity sensing operation with the touch sensor 31.

The touch controller 110 may provide a driving signal to the touch sensors 32 and 33. However, the touch controller 110 may not receive a sensing signal from the touch sensors 32 and 33. Thus, in FIGS. 3A and 3B, the touch sensors 32 and 33 are set to the simultaneously-driven state. The touch controller 110 may not perform a proximity sensing operation with the touch sensors 32 and 33.

There is a parasitic capacitance between touch sensors 31 and 32. Similarly, there is a parasitic capacitance between touch sensors 31 and 33. However, since touch sensors 32 and 33 are in the simultaneously-driven state, the parasitic capacitance may be reduced. The touch sensors perform self-capacitance sensing only for purpose of explanation and the disclosure is not limited thereto.

FIG. 3B illustrates the case when an object is near the touch sensors 31, 32 and 33. As the object 300 moves near to the touch sensors, a capacitance Cf may be generated between the object 300 and the touch sensor 31. As previously described, since touch sensors 32 and 33 are in a simultaneously-driven state, the parasitic capacitance may be reduced. Thus, the change in capacitance sensed by touch sensor 31 equals Cf.

Figure 4A:
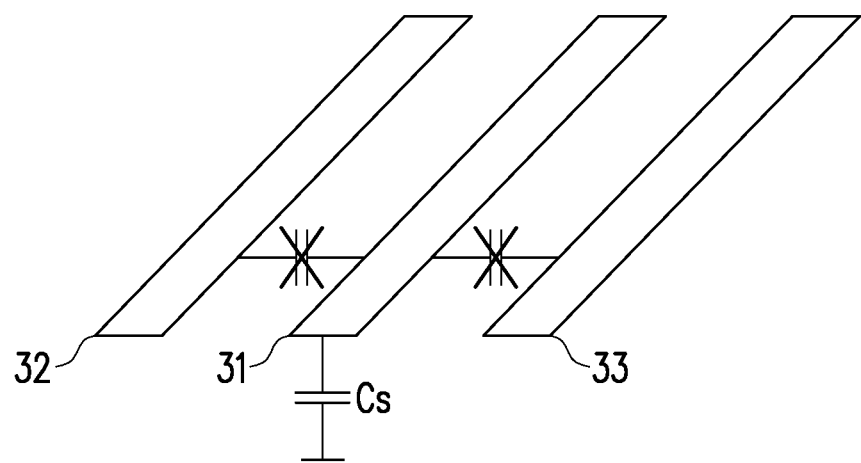
FIGS. 4A and 4B illustrate touch sensors in a floating state according to an embodiment of the disclosure.
Figure 4B:
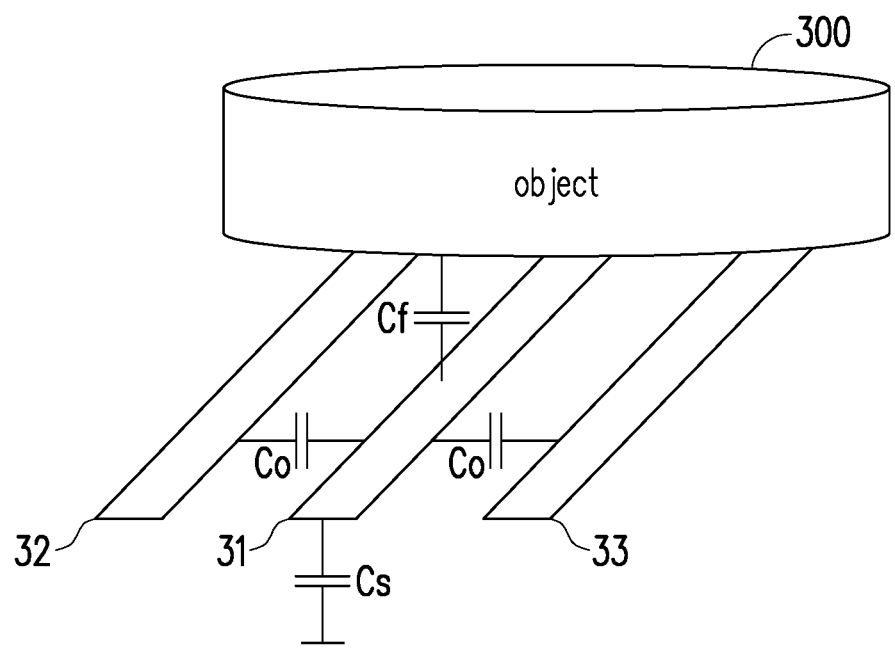

FIGS. 4A and 4B illustrate touch sensors in a floating state according to an embodiment of the disclosure. FIGS. 4A and 4B illustrate touch sensors 31, 32 and 33. In the example of FIGS. 4A and 4B, touch sensor 31 is controlled to perform a proximity sensing operation. The self-capacitance of touch sensor 31 is Cs. Difference between FIGS. 3A, 3B, 4A and 4B is that touch sensors 32 and 33 in FIGS. 4A and 4B may be in a floating state. Floating state may also be known as high impedance state or high-Z state. In the floating state, touch sensors 32 and 33 are not driven by a voltage and are not coupled to ground.

Description about the proximity sensing operation with the touch sensor 31 is similar to the description for FIGS. 3A and 3B.

In FIGS. 4A and 4B, the touch controller 110 may not provide a driving signal to the touch sensors 32 and 33. The touch controller 110 may not receive a sensing signal from the touch sensors 32 and 33. Thus, in FIGS. 4A and 4B, the touch sensors 32 and 33 are set to the floating state. The touch controller 110 may not perform a proximity sensing operation with the touch sensors 32 and 33. The touch controller 110 may control one or more switches to determine whether to provide a driving signal to touch sensors 31, 32 and 33. The touch controller 110 may also control one or more switches to determine whether to receive a sensing signal from touch sensors 31, 32 and 33.

Since touch sensor 32 is in a floating state, there is no parasitic capacitance between touch sensors 31 and 32. Similarly, since touch sensor 33 is in a floating state, there is no parasitic capacitance between touch sensors 31 and 33.

FIG. 4B illustrates the case when an object is near the touch sensors 31, 32 and 33. As the object 300 moves near to the touch sensors, a capacitance Cf is generated between the object 300 and the touch sensor 31. However, the object 300 also alters the floating state of touch sensors 32 and 33. Thus, the object 300 also causes the generation of parasitic capacitances Co between the touch sensor performing proximity sensing and the touch sensors in the floating state. The change in capacitance sensed by touch sensor 31 equals Cf+ΣCo. Consequently, setting the non-sensing touch sensor to be in the floating state may provide increased sensing sensitivity of the proximity sensing operation compared to FIGS. 3A and 3B in which the non-sensing touch sensors 32 and 33 are in a simultaneously-driven state.

In the following embodiments, when proximity sensing is performed, one or more non-sensing touch sensors in a neighborhood region of a sensing touch sensor (for example, the touch sensors 32 and 33 near the sensing touch sensor 31) can be set in a floating state, thereby increasing sensing sensitivity of the proximity sensing operation.

In some embodiments, all of the non-sensing touch sensors can be set in a floating state. In some embodiments, the other non-sensing touch sensors outside the neighborhood region of a sensing touch sensor can be set in a simultaneously-driven state.

In some embodiments, the touch controller 110 can be configured to perform different sensing operations. More specifically, a touch controller 110 can perform a proximity or hover sensing operation during a first sensing period which may occur under a first operation mode and can perform a touch sensing operation during a second sensing period which may occur during a second operation mode.

In the first sensing period, the touch controller 110 can be configured to group the plurality of touch sensors into a sensing group of one or more touch sensors and a non-sensing group of one or more touch sensors, control the sensing group to perform the proximity or hover sensing operation during a first sensing period and not control the non-sensing group to perform the proximity or hover sensing operation during the first sensing period. To increase sensing sensitivity for the the proximity or hover sensing operation, the touch controller 110 can be configured to set one or more touch sensors of the non-sensing group to a floating state during the first sensing period, wherein at least one of the one or more floating touch sensors of the non-sensing group can be adjacent to or in the neighborhood region of the sensing group. The touch controller can be configured to set all of the touch sensors of the non-sensing group to the floating state during the first sensing period. Alternatively, the touch controller is further configured to set one or more other touch sensors of the non-sensing group (outside of the neighborhood region of the sensing touch sensor) to a simultaneously-driven state during the first sensing period.

During the second sensing period different from the first sensing period, the touch controller 110 can be configured to control the sensing group to perform the touch sensing operation and not control the non-sensing group to perform the touch sensing operation during the second sensing period. To decrease the interference with the touch sensing operation caused by parasitic capacitance, the touch controller 110 is configured to set the one or more touch sensors of the non-sensing group to a simultaneously-driven state during the second sensing period. Preferably but not limitedly, the touch controller 110 may be configured to set all of the non-sensing touch sensors to the simultaneously-driven state during the second sensing period.

Figure 5A:
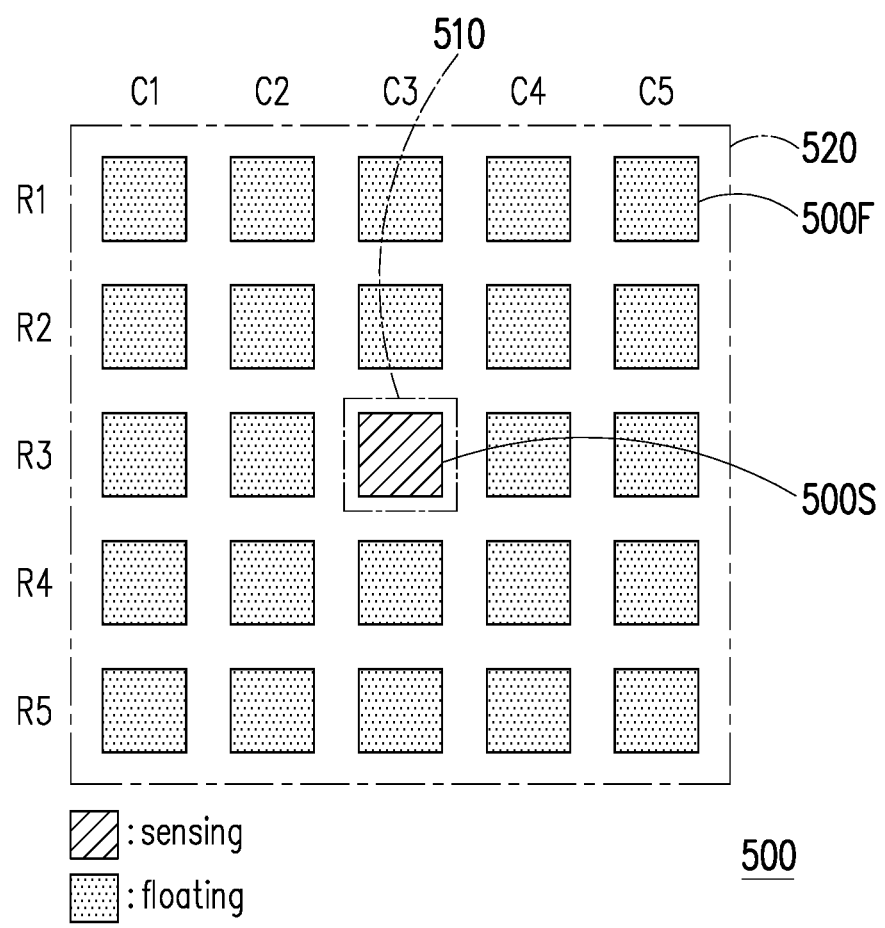
FIGS. 5A, 5B and 5C are schematic diagrams illustrating a plurality of touch sensors according to an embodiment of the disclosure.
Figure 5B:
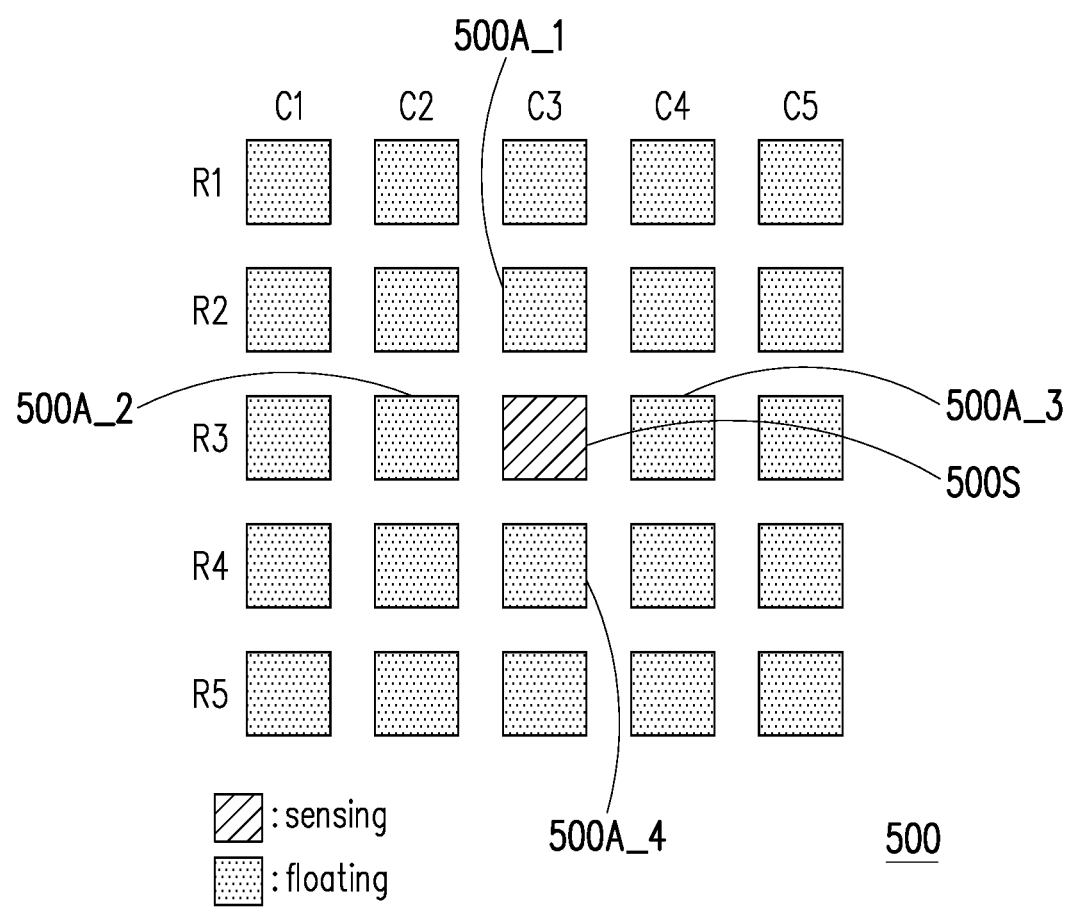
Figure 5C:
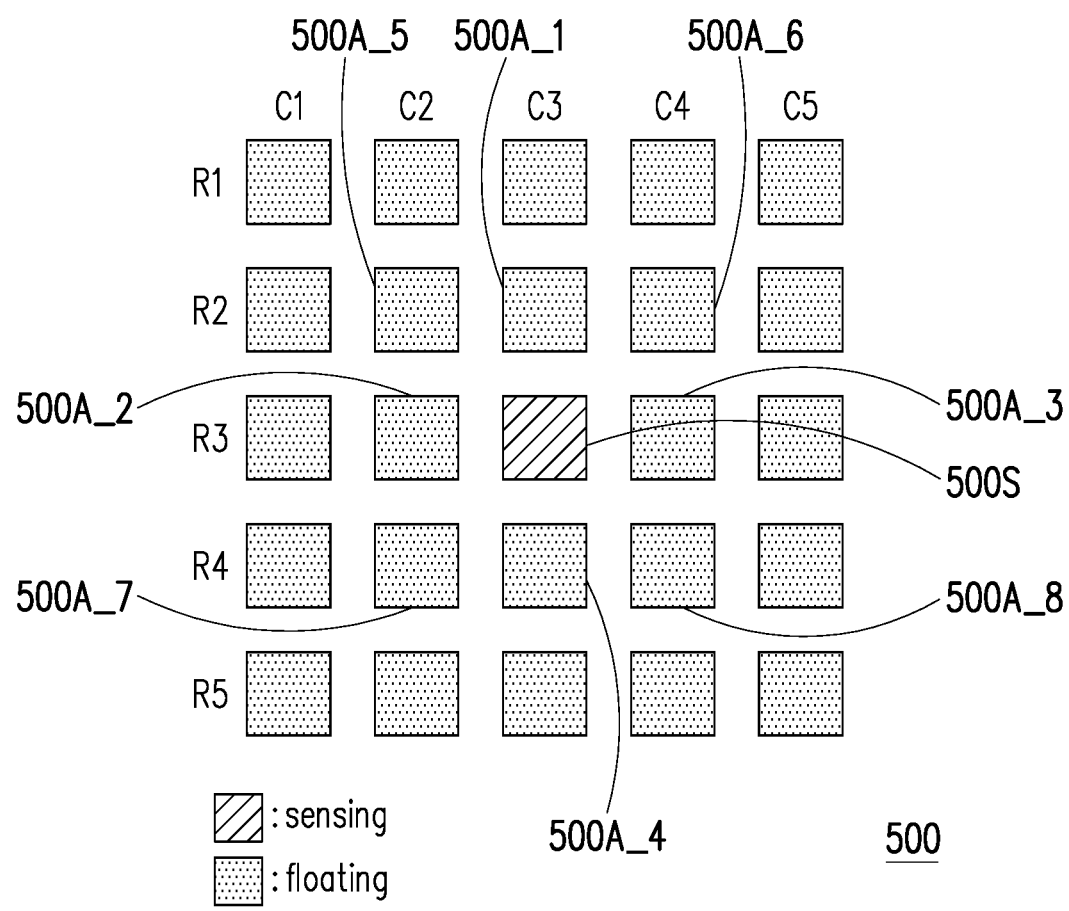

FIGS. 5A, 5B and 5C are schematic diagrams illustrating a plurality of touch sensors according to an embodiment of the disclosure. FIGS. 5A, 5B and 5C show a plurality of touch sensors 500. The plurality of touch sensors 500 may be arranged into an array of rows R1 to R5 and columns C1 to C5. In the example of FIGS. 5A, 5B and 5C, the touch sensors 500 have a square shape, but the shape does not intend to limit the invention.

Figure 6A:
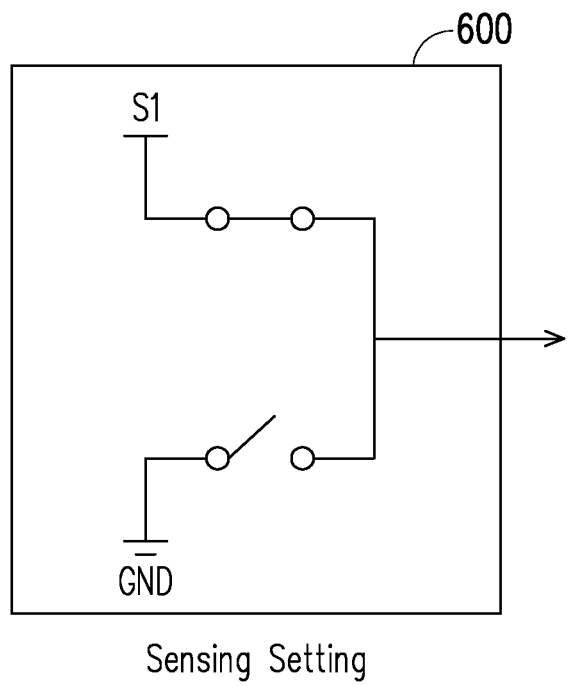
FIGS. 6A and 6B illustrate a sensing setting and a floating setting for touch sensors according to an embodiment of the disclosure.

FIG. 5A shows a sensing group 510 and a non-sensing group 520. The touch controller 110 of FIG. 1 or the touch controller 210 of FIG. 2 may control the plurality of touch sensors 500. For example, the touch controller 110 may group the plurality of touch sensors 500 into the sensing group 510 and the non-sensing group 520. The grouping can be dynamically made to sequentially perform a proximity sensing operation at different locations. The sensing group 510 may include one or more touch sensors 500S. The touch controller 110 may control the sensing group 510 to perform a proximity sensing operation. The touch sensor, at a time, for example, can be the touch sensor 500S, which is represented as being filled with lines. The non-sensing group 520 may be the rest of touch sensors 500, including one or more touch sensors 500F which are represented as being filled with dots. In other words, the touch controller 110 is configured not to control the non-sensing group 520 to perform a proximity sensing operation when it controls the touch sensor 500S to perform the proximity sensing operation. In some embodiments, a part or all of the touch sensors 500F may be set to the floating state. In an embodiment, a part or all of the touch sensors 500F may be set to the simultaneously-driven state. In the simultaneously-driven state, the sensing group 510 is driven by a touch driving signal S1 as depicted in FIG. 6A for the proximity or hover sensing operation.

In the simultaneously-driven state, the non-sensing group 520 is driven by a simultaneously-driven signal which has the same waveform, frequency and phase as that of the touch driving signal S1 for reducing the parasitic capacitance but not for the proximity or hover sensing operation.

FIG. 5B shows the touch sensor 500S and adjacent touch sensors 500A_1, 500A_2, 500A_3 and 500A_4. In FIG. 5B, the touch sensor 500S may be located on row R3 and column C3. The touch sensors 500A_1 and 500_A4 may be located on column C3. The touch sensor 500A_1 may be located on row R2. Touch sensor 500A_4 may be located on row R4. Thus, the touch sensors 500A_1 and 500A_4 may be located on the same column as the touch sensor 500S and on adjacent rows. Additionally, the touch sensors 500A_2 and 500A_3 may be located on row R3. The touch sensor 500A_2 may be located on column C2. Touch sensor 500A_3 may be located on column C4. Thus, touch sensors 500A_2 and 500A_3 may be located on the same row as the touch sensor 500S and on adjacent columns. These four touch sensors 500A_1, 500A_2, 500A_3 and 500A_4 may be the touch sensors adjacent to the touch sensor 500S.

FIG. 5C shows the touch sensor 500S and touch sensors 500A_1, 500A_2, 500A_3, 500A_4, 500A_5, 500A_6, 500A_7 and 500A_8. The touch sensors 500A_1 to 500A_4 may be the touch sensors adjacent to the touch sensor 500S. The touch sensors 500A_5 to 500A_8 may be located on the adjacent rows and on the adjacent columns. The touch sensors 500A_1 to 500A_8 may be the touch sensors surrounding the touch sensor 500S. Hence, in FIG. 5C, there are eight touch sensors 500A_1 to 500A_8 surrounding the touch sensor 500S.

Furthermore, there are several touch sensors 500F which are not surrounding the touch sensor 500S. Thus, these touch sensors are farther away from the touch sensor 500S.

In FIG. 5C, there are different embodiments capable of increasing sensing sensitivity of proximity sensing. For example, a part or all of the touch sensors adjacent to the touch sensor 500S may be set to the floating state. A first part or all of the touch sensors surrounding the touch sensor 500S may be set to the floating state. A second part of the touch sensors surrounding the touch sensor 500S may be set to the simultaneously-driven state. A part or all of the touch sensors farther away from the touch sensor 500S may be set to the floating state. A part or all of the touch sensors 500F may be set to the floating state in order to increase sensing sensitivity. In an embodiment, a part or all of the touch sensors farther away from the touch sensor 500S may be set to the simultaneously-driven state. In another embodiment, all of the touch sensors other than the touch sensors surrounding the touch sensor 500S may be set to the simultaneously-driven state. In another embodiment, a first part of the touch sensors other than the touch sensors surrounding the touch sensor 500S may be set to the floating state. A second part of the touch sensors other than the touch sensors surrounding the touch sensor 500S may be set to the simultaneously-driven state. In the simultaneously-driven state, the sensing touch sensor is driven by the touch driving signal S1 as depicted in FIG. 6A for the proximity or hover sensing operation. In the simultaneously-driven state, the non-sensing touch sensor is driven by a simultaneously-driven signal which has the same waveform, frequency and phase as that of the touch driving signal S1 for reducing the parasitic capacitance but not for the proximity or hover sensing operation.

Figure 6B:
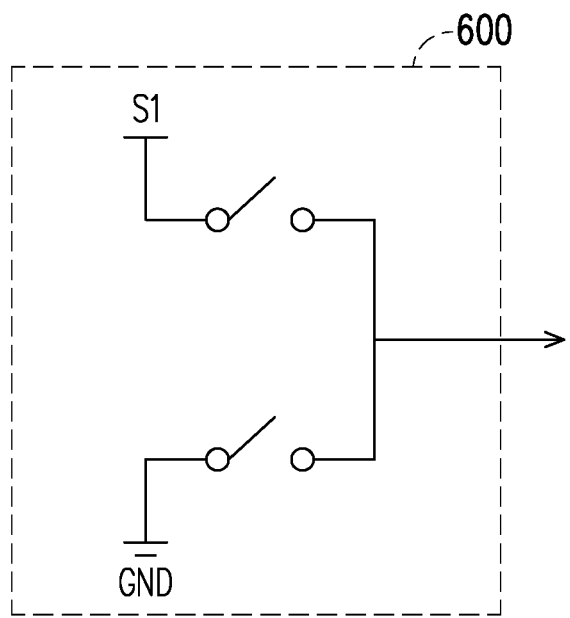

FIGS. 6A and 6B illustrate a sensing setting and a floating setting for touch sensors according to an embodiment of the disclosure. FIGS. 6A and 6B show a switch circuit 600. The switch circuit 600 may connect a touch sensor to a touch driving signal S1. FIGS. 6A and 6B also show that the switch circuit 600 may connect a touch sensor to ground GND. For example, the touch controller 110 of FIG. 1 or the touch controller 210 of FIG. 2 may control the switch circuit 600. FIGS. 6A and 6B show that the touch sensor may not be coupled to ground GND since the corresponding switch is turned off. Thus, in both sensing setting and floating setting, the touch sensor may not be coupled to ground GND.

FIG. 6A illustrates a sensing setting. The touch sensor may be coupled to the touch driving signal S1 since the corresponding switch is turned on. Thus, the touch sensor may perform proximity sensing.

FIG. 6B illustrates a floating setting. Different from FIG. 6A, the touch sensor may not be coupled to the touch driving signal S1 since the corresponding switch is turned off. The touch sensor may not be driven by the touch driving signal S1. The touch sensor may also not be coupled to ground GND. Thus, the touch sensor may be in a floating state.

Figure 7:
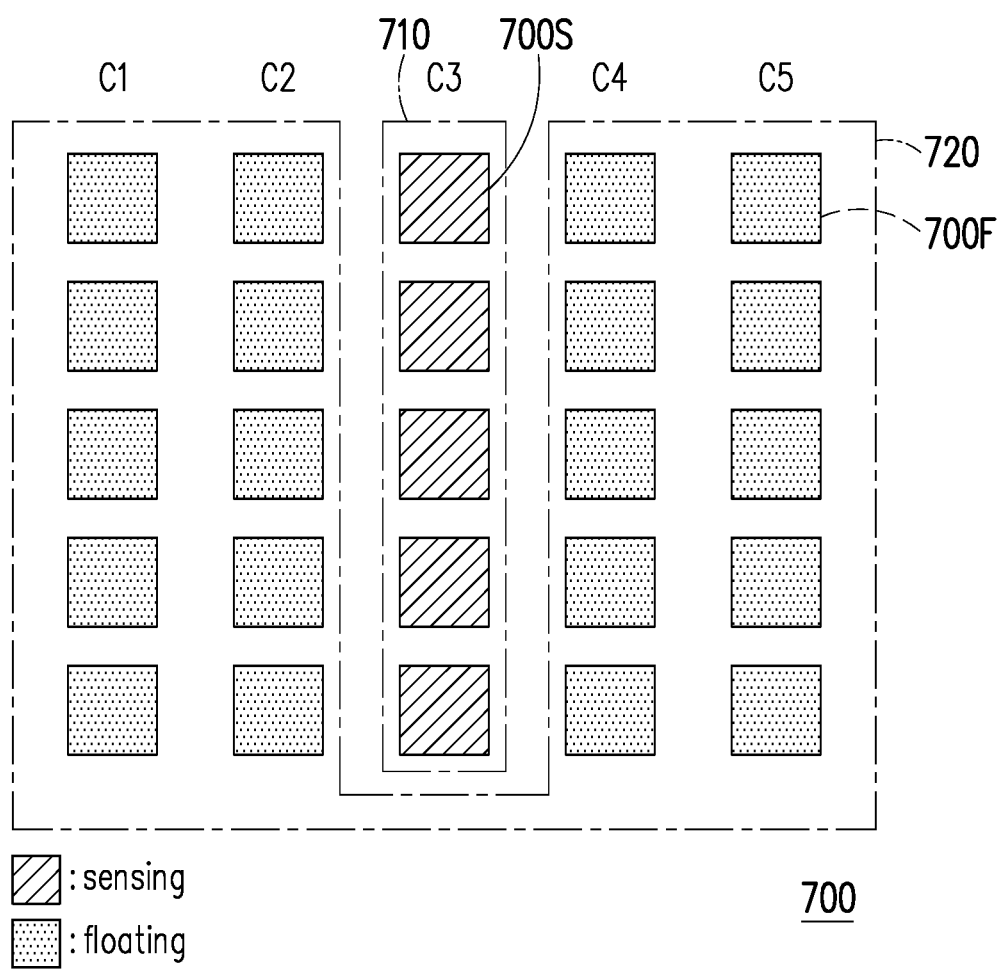
FIG. 7 is a schematic diagram illustrating a plurality of touch sensors according to an embodiment of the disclosure.

FIG. 7 is a schematic diagram illustrating a plurality of touch sensors according to an embodiment of the disclosure. Difference between FIG. 7 and FIG. 5A is that the plurality of touch sensors 700 of FIG. 7 may be driven to perform proximity sensing in groups. The plurality of touch sensors 700 may be grouped into a sensing group 710 and a non-sensing group 720. The sensing group 710 may include one or more touch sensors 700S. The sensing group 710 may be controlled to perform a proximity sensing operation. The touch sensors 700S are filled with lines. In FIG. 7, the touch sensors 700S are the touch sensors of column C3.

The non-sensing group 720 may include one or more touch sensors 700F. The non-sensing group 720 may be not controlled to perform a proximity sensing operation when the sensing group 710 is being controlled to perform the proximity sensing operation. The touch sensors 700F are filled with dots. A part or all of the touch sensors 700F may be set to the floating state. In an embodiment, a part or all of the touch sensors 700F may be set to the simultaneously-driven state. In the simultaneously-driven state, the sensing touch sensor is driven by the touch driving signal S1 as depicted in FIG. 6A for the proximity or hover sensing operation. In the simultaneously-driven state, the non-sensing touch sensor is driven by a simultaneously-driven signal which has the same waveform, frequency and phase as that of the touch driving signal S1 for reducing the parasitic capacitance but not for the proximity or hover sensing operation.

In FIG. 7, the touch sensors 700S of the sensing group 710 are the touch sensors of column C3. Thus, the sensing group 710 may include at least one touch sensor 700S arranged as a touch sensor unit. In FIG. 7, the touch sensor unit may be the sensing group 710.

A panel may include the plurality of touch sensors 700. The touch sensors 700S of the touch sensor unit 710 belong to the same column C3. Thus, the extension direction of the touch sensor unit 710 may be parallel with a column direction of a panel. The touch sensor unit 710 may also have a bar shape extended along an extension direction. However, the touch sensor unit 710 does not intend to limit the disclosure. In another embodiment of the disclosure, the extension direction of a touch sensor unit may be parallel with a row direction of a panel. In another embodiment of the disclosure, the extension direction of a touch sensor unit may be non-parallel with a column or row direction of the panel.

Figure 8A:
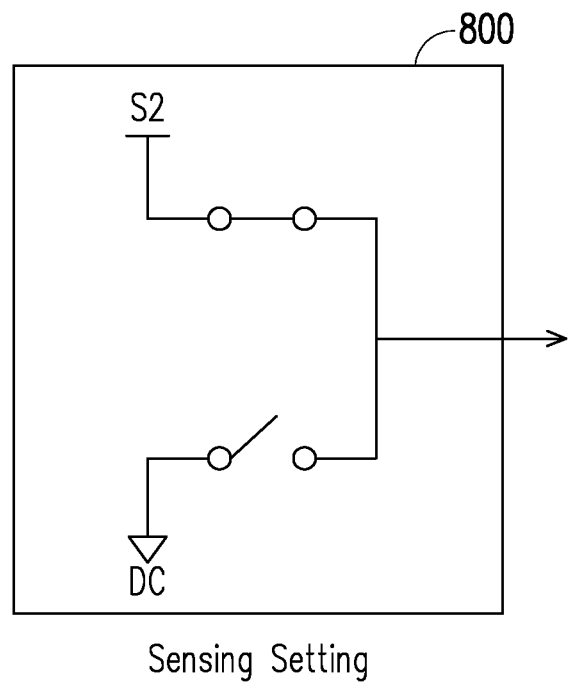
FIGS. 8A and 8B illustrate a sensing setting and a floating setting for touch sensors according to an embodiment of the disclosure.

In FIG. 7, there are different embodiments capable of increasing sensing sensitivity of proximity sensing. For example, a part or all of the touch sensors 700F adjacent to the touch sensor unit 710 may be set to the floating state. A first part or all of the touch sensors 700F surrounding the touch sensor unit 710 may be set to the floating state. A second part of the touch sensors 700F surrounding the touch sensor unit 710 may be set to the simultaneously-driven state. A part or all of the touch sensors 700F farther away from the touch sensor unit 710 may be set to the floating state. The sensors 700F may be set to the floating state in order to increase sensing sensitivity. In an embodiment, part or all of the touch sensors 700F farther away from the touch sensor unit 710 may be set to the simultaneously-driven state. In another embodiment, all of the touch sensors other than the touch sensors surrounding the touch sensor unit 710 may be set to the simultaneously-driven state. In another embodiment, a first part of the touch sensors other than the touch sensors surrounding the touch sensor unit 710 may be set to the floating state. A second part of the touch sensors other than the touch sensors surrounding the touch sensor unit 710 may be set to the simultaneously-driven state. In the simultaneously-driven state, the sensing touch sensor is driven by a touch driving signal S2 as depicted in FIG. 8A for the proximity or hover sensing operation. In the simultaneously-driven state, the non-sensing touch sensor is driven by a simultaneously-driven signal which has the same waveform, frequency and phase as that of the touch driving signal S2 for reducing the parasitic capacitance but not for the proximity or hover sensing operation.

In FIG. 7, the touch sensors of the plurality of touch sensors 700 have a square shape. However, the disclosure is not limited to touch sensors with a square shape, and may include touch sensors with a rectangular shape, among other shapes.

Figure 8B:
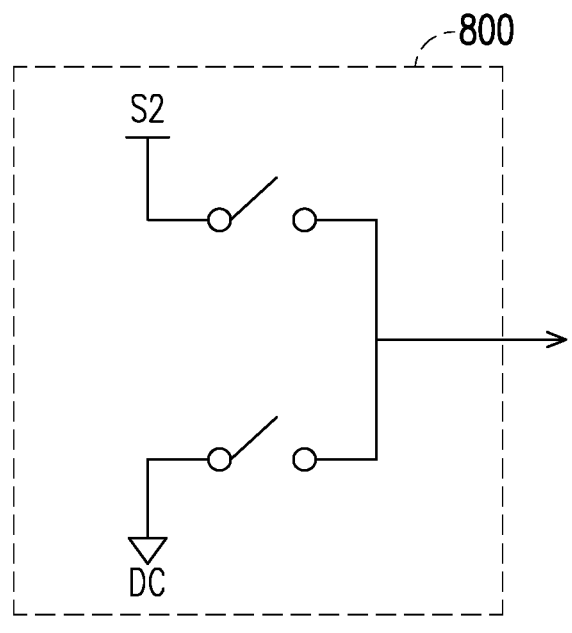

FIGS. 8A and 8B illustrate a sensing setting and a floating setting for touch sensors according to an embodiment of the disclosure. FIGS. 8A and 8B show a switch circuit 800. The switch circuit 800 may connect a touch sensor to a touch driving signal S2. For example, the touch controller 110 of FIG. 1 or the touch controller 210 of FIG. 2 may control the switch circuit 800. Different from FIGS. 6A and 6B, FIGS. 8A and 8B show the switch circuit 800 may connect a touch sensor to a direct current (DC) voltage. A touch panel may include the touch sensor. The touch panel may also be a touch display panel. Thus, the touch sensor may be driven by the touch driving signal S2 to perform proximity sensing. Alternatively, the touch sensor may be driven by the DC voltage for displaying.

In FIGS. 8A and 8B, the touch sensor may not be coupled to the DC voltage. FIG. 8A illustrates a sensing setting. In FIG. 8A, the touch sensor may be coupled to the touch driving signal S2 since the corresponding switch is turned on. Thus, the touch sensor may perform proximity sensing.

FIG. 8B illustrates a floating setting. Different from FIG. 8A, the touch sensor may not be coupled to the touch driving signal S2 since the corresponding switch is turned off. The touch sensor may not be driven by the touch driving signal S2. The touch sensor may also not be coupled to the DC voltage. Thus, the touch sensor may be in a floating state.

Figure 9A:
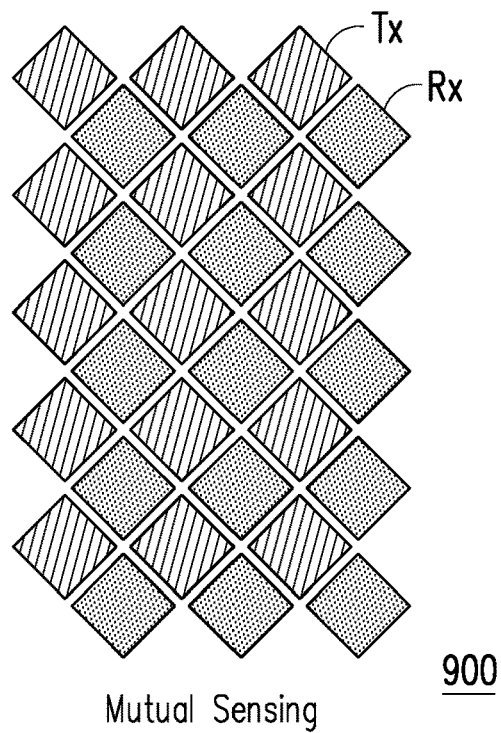
FIGS. 9A and 9B illustrate a plurality of touch sensors which may perform mutual-sensing and may also perform proximity sensing by self-sensing according to an embodiment of the disclosure.
Figure 9B:
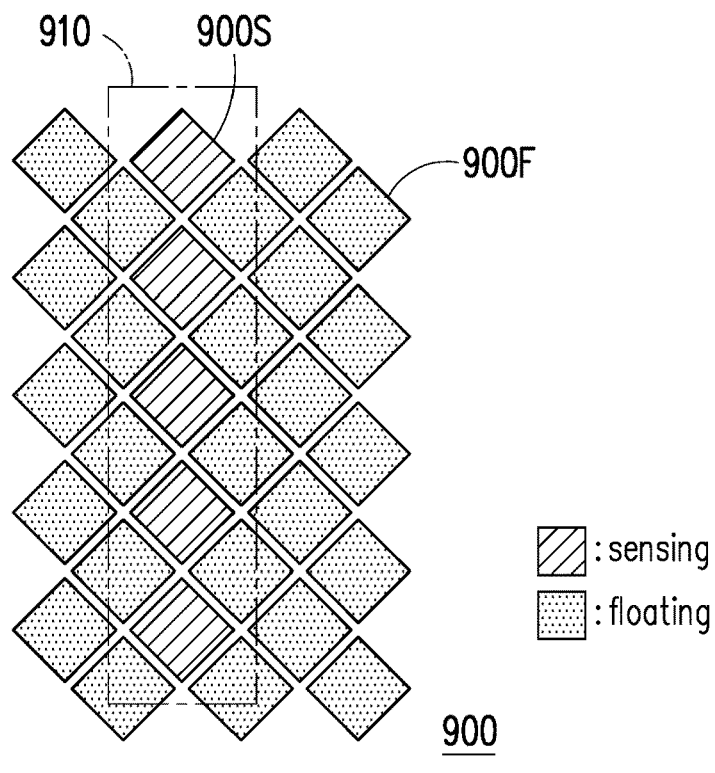

FIGS. 9A and 9B illustrate a plurality of touch sensors which may perform mutual-sensing and may also perform proximity sensing by self-sensing according to an embodiment of the disclosure. FIGS. 9A and 9B show a plurality of touch sensors 900. The touch sensors 900 of FIGS. 9A and 9B are mutual-sensing diamond sensors. FIG. 9A shows that the touch sensors 900 are transmitters Tx or receivers Rx. In FIG. 9A, the touch sensors Tx are filled with lines. The touch sensors Rx are filled with dots.

FIG. 9B shows that, when performing proximity sensing, the touch sensors 900 may be self-sensing sensors. The touch sensors 900 may be grouped into a sensing group 910 and a non-sensing group. The sensing group 910 may include one or more touch sensors 900S. The sensing group 910 may be controlled to perform a proximity sensing operation. The proximity sensing operation may be a self-sensing operation. The touch sensors 900S are represented as being filled with lines. The non-sensing group of FIG. 9B includes the touch sensors 900F which do not belong to the sensing group 910. The touch sensors 900F may be set to the floating state. The touch sensors 900F are represented as being filled with dots.

FIG. 9B shows an example of a touch sensor unit. The sensing group 910 may include at least one touch sensor 900S arranged as a touch sensor unit. In FIG. 9B, the touch sensor unit may be the sensing group 910.

A panel may include the plurality of touch sensors 900. The touch sensors 900S of the touch sensor unit 910 may not belong to the same column. The touch sensors 900S of the touch sensor unit 910 may not belong to the same row. The touch sensors 900S of the touch sensor unit 910 may belong to the same diagonal. Thus, the extension direction of the touch sensor unit 910 may be non-parallel with a column or row direction of the panel.

Figure 10A:
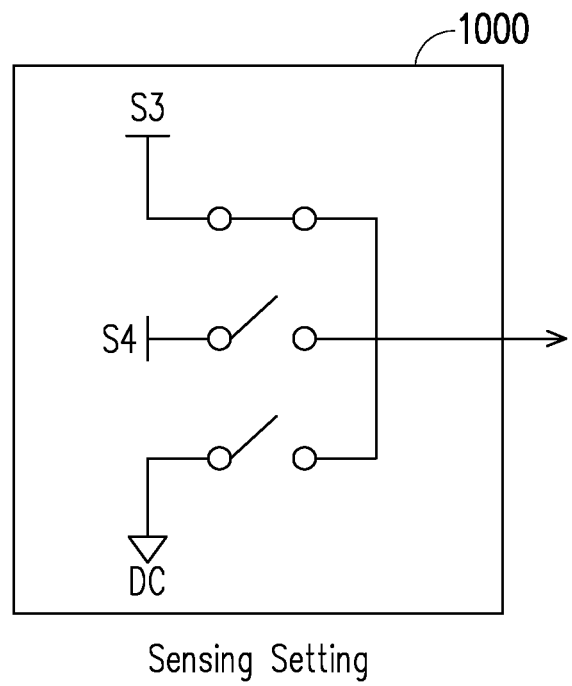
FIGS. 10A and 10B illustrate a sensing setting and a floating setting for touch sensors according to an embodiment of the disclosure.

In FIG. 9B, a non-sensing group may include one or more touch sensors 900F. The one or more touch sensors 900F may not be included in the sensing group 910. The non-sensing group may be not controlled to perform a proximity sensing operation when the sensing group 910 is controlled to perform the proximity sensing operation. There are different embodiments capable of increasing sensing sensitivity of proximity sensing. For example, a first part or all of the touch sensors 900F adjacent to the touch sensor unit 910 may be set to the floating state. A second part of the touch sensors 900F may be set to the simultaneously-driven state. A first part or all of the touch sensors 900F surrounding the touch sensor unit 910 may be set to the floating state. A second part of the touch sensors 700F surrounding the touch sensor unit 710 may be set to the simultaneously-driven state. A part or all of the touch sensors 900F farther away from the touch sensor unit 910 may be set to the floating state. The touch sensors 900F of the non-sensing group may be set to the floating state in order to increase sensing sensitivity. In an embodiment, part or all of the touch sensors 900F farther away from the touch sensor unit 910 may be set to the simultaneously-driven state. In another embodiment, all of the touch sensors other than the touch sensors surrounding the touch sensor unit 910 may be set to the simultaneously-driven state. In another embodiment, a first part of the touch sensors other than the touch sensors surrounding the touch sensor unit 910 may be set to the floating state. A second part of the touch sensors other than the touch sensors surrounding the touch sensor unit 910 may be set to the simultaneously-driven state. In the simultaneously-driven state, the sensing touch sensor is driven by a touch driving signal S3 as depicted in FIG. 10A for the proximity or hover sensing operation. In the simultaneously-driven state, the non-sensing touch sensor is driven by a simultaneously-driven signal which has the same waveform, frequency and phase as that of the touch driving signal S3 for reducing the parasitic capacitance but not for the proximity or hover sensing operation.

In an embodiment of the disclosure, the touch controller 110 may control the plurality of touch sensors 900. The touch controller 110 may group the plurality of touch sensors 900 into the sensing group 910 and a non-sensing group. The touch controller 110 may control the sensing group 910 to perform a proximity sensing operation during a first sensing period. The proximity sensing operation may be a self-sensing operation. The touch controller 110 may not control the non-sensing group to perform a proximity sensing operation during the first sensing period. The touch controller 110 may further control the plurality of touch sensors 900 to perform a mutual-sensing operation in a second sensing period.

Figure 10B:
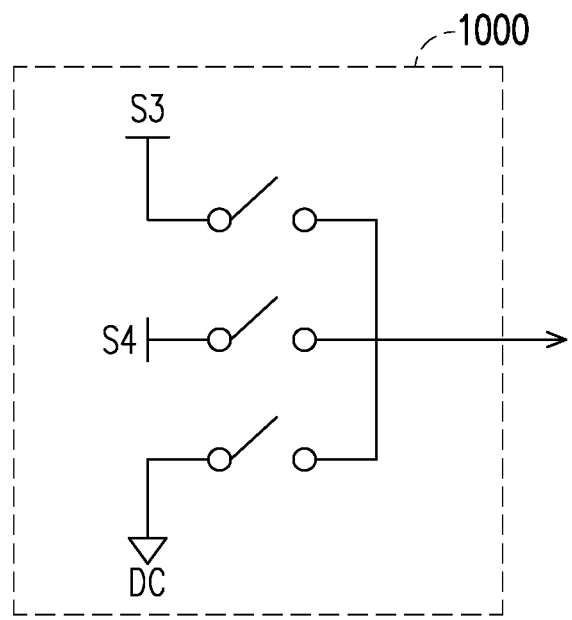

FIGS. 10A and 10B illustrate a sensing setting and a floating setting for touch sensors according to an embodiment of the disclosure. FIGS. 10A and 10B show a switch circuit 1000. The switch circuit 1000 may connect a touch sensor to a proximity touch signal S3, a mutual touch signal S4, and a DC voltage. For example, the touch controller 110 of FIG. 1 or the touch controller 210 of FIG. 2 may control the switch circuit 1000. The touch sensor may be driven by the proximity touch signal S3 to perform proximity sensing. Alternatively, the touch sensor may be driven by the DC voltage for displaying. Alternatively, the touch sensor may be driven by the mutual touch signal S4. In FIGS. 10A and 10B, the touch sensor may not be coupled to the DC voltage. The touch sensor may also not be coupled to the mutual touch signal S4.

FIG. 10A illustrates a sensing setting. In FIG. 10A, the touch sensor may be coupled to the proximity touch signal S3 since the corresponding switch is turned on. Thus, the touch sensor may perform proximity sensing.

FIG. 10B illustrates a floating setting. Different from FIG. 10A, the touch sensor may not be coupled to the proximity touch signal S3 since the corresponding switch is turned off. The touch sensor may not be driven by the proximity touch signal S3. The touch sensor may also not be coupled to the DC voltage. The touch sensor may also not be coupled to the mutual touch signal S4. Thus, the touch sensor may be in a floating state.

Figure 11A:
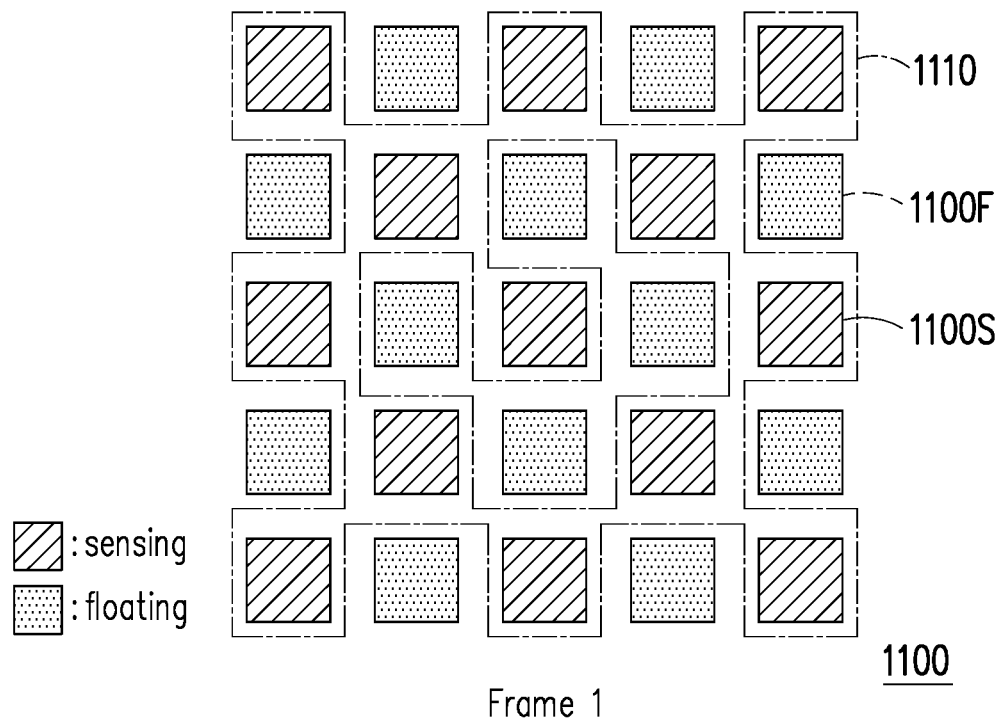
FIGS. 11A and 11B illustrate a plurality of touch sensors which may perform proximity sensing according to an embodiment of the disclosure.
Figure 11B:
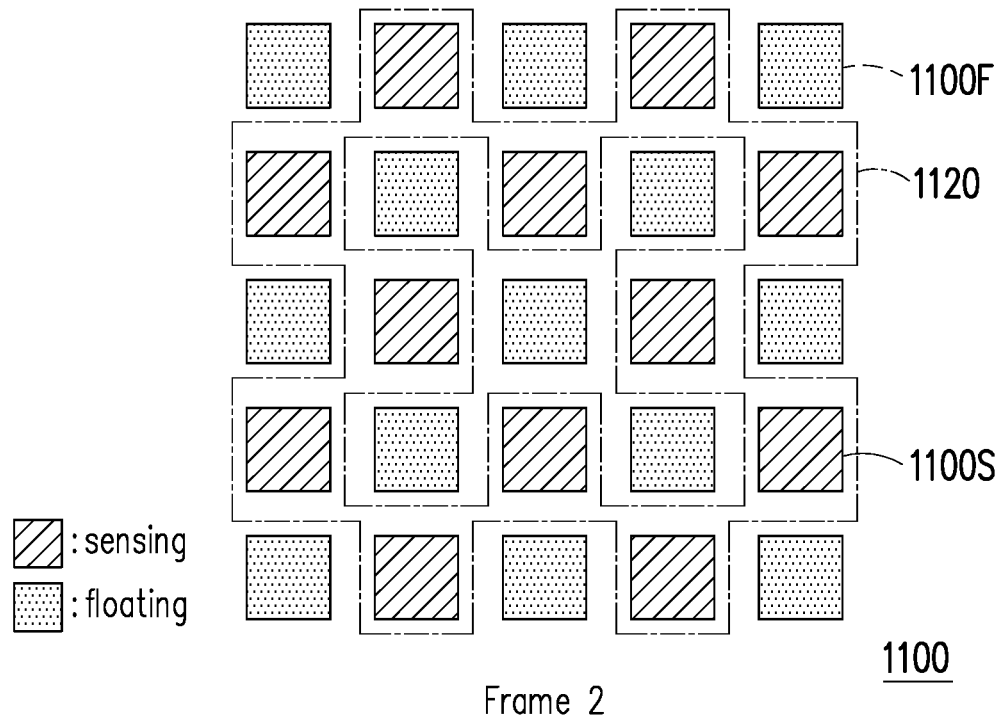

FIGS. 11A and 11B illustrate a plurality of touch sensors which may perform proximity sensing according to an embodiment of the disclosure. FIGS. 11A and 11B show a plurality of touch sensors 1100. The touch sensors 1100 may be arranged in a configuration similar to a checkerboard. FIGS. 11A and 11B show two groups of touch sensors 1110 and 1120. In FIG. 11A, the group of touch sensors 1110 is the sensing group, and the group of touch sensors 1120 is the non-sensing group. In FIG. 11B, the group of touch sensors 1120 is the sensing group, and the group of touch sensors 1110 is the non-sensing group.

FIG. 11A shows a Frame 1. FIG. 11A shows that the touch sensors 1100 may be grouped into a sensing group 1110 and a non-sensing group 1120. The sensing group 1110 may include one or more touch sensors 1100S. The sensing group 1110 may be controlled to perform a proximity sensing operation. The touch sensors 1100S are represented as being filled with lines. The non-sensing group 1120 may include one or more touch sensors 1100F. A part or all of the touch sensors 1100F may be set to the floating state. The touch sensors 1100F are represented as being filled with dots. The part or all of the touch sensors 1100F may be set to the floating state in order to increase sensing sensitivity.

In other words, in some implementations, all touch sensors of the non-sensing group can be set to a floating state. Alternatively, some (closer to the sensing group) touch sensors of the non-sensing group can be set to a floating state and some other (farther to the sensing group) touch sensors of the non-sensing group can be set to a simultaneously-driven state.

FIG. 11B shows a Frame 2. Difference between FIGS. 11A and 11B is that FIG. 11B shows a sensing group 1120 and a non-sensing group 1110. Further description of FIG. 11B is similar to the description of FIG. 11A.

A touch controller may control the plurality of touch sensors 1100. For example, the touch controller 210 of FIG. 2 may control the plurality of touch sensors 1100. FIGS. 11A and 11B show Frame 1 and Frame 2. The sensing group 1110 of Frame 1 may be the non-sensing group of Frame 2. Similarly, the non-sensing group of Frame 1 may be the sensing group 1120 of Frame 2. Frame 1 may define the sensing group and the non-sensing group of a first sensing period. Frame 2 may define the sensing group and the non-sensing group of a second sensing period. For example, the touch controller 210 may control the sensing group 1110 to perform proximity sensing during the first sensing period. The touch controller 210 may not control the non-sensing group 1120 during the first sensing period. The touch controller 210 may control the non-sensing group 1120 to perform proximity sensing during the second sensing period. The touch controller 210 may not control the sensing group 1110 during the second sensing period. However, the number of frames does not intend to limit the disclosure. A sensing period may include one or more frames.

Figure 12A:
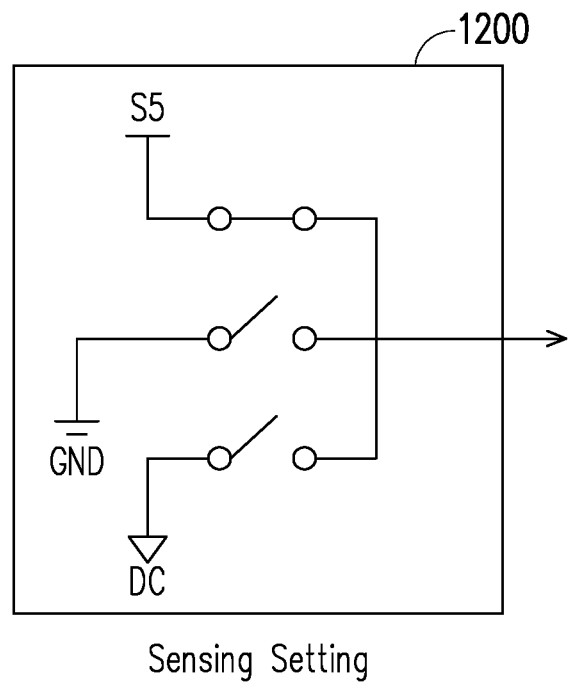
FIGS. 12A and 12B illustrate a sensing setting and a floating setting for touch sensors according to an embodiment of the disclosure.
Figure 12B:
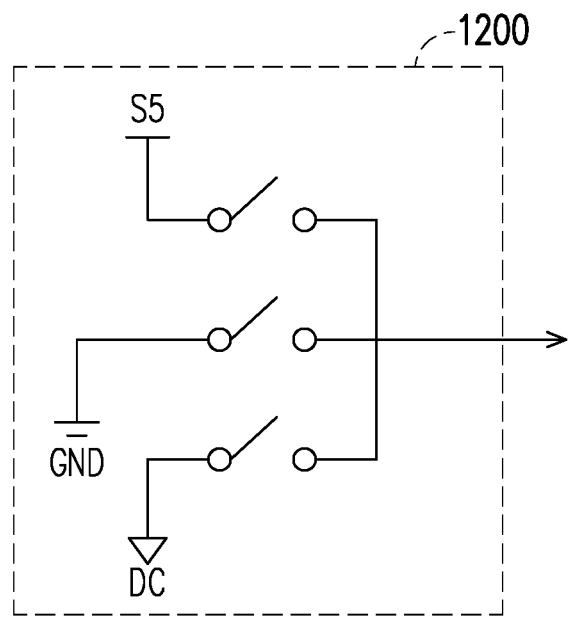

FIGS. 12A and 12B illustrate a sensing setting and a floating setting for touch sensors according to an embodiment of the disclosure. FIGS. 12A and 12B show a switch circuit 1200. The switch circuit 1200 may connect a touch sensor to a proximity touch signal S5, to ground GND, and a DC voltage. For example, the touch controller 110 of FIG. 1 or the touch controller 210 of FIG. 2 may control the switch circuit 1200. The touch sensor may be driven by the proximity touch signal S5 to perform proximity sensing. Alternatively, the touch sensor may be driven by the DC voltage for displaying. Alternatively, the touch sensor may be connected to ground GND. In FIGS. 12A and 12B, the touch sensor may not be coupled to the DC voltage. The touch sensor may also not be connected to ground GND.

FIG. 12A illustrates a sensing setting. In FIG. 12A, the touch sensor may be coupled to the touch driving signal S5 since the corresponding switch is turned on. Thus, the touch sensor may perform proximity sensing.

FIG. 12B illustrates a floating setting. Different from FIG. 12A, the touch sensor may not be coupled to the touch driving signal S5 since the corresponding switch is turned off. The touch sensor may not be driven by the proximity touch signal S5. The touch sensor may also not be coupled to the DC voltage. The touch sensor may also not be coupled to ground GND. Thus, the touch sensor may be in a floating state.

Figure 13A:
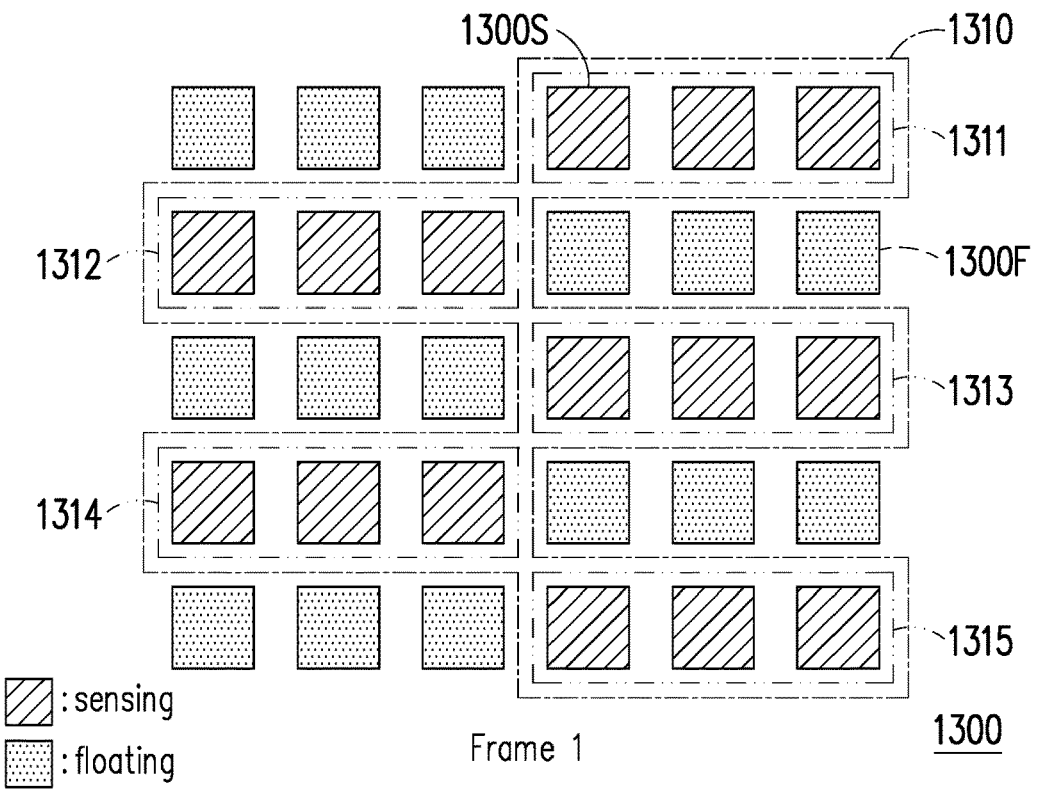
FIGS. 13A and 13B illustrate a plurality of touch sensors which may perform proximity sensing according to an embodiment of the disclosure.
Figure 13B:
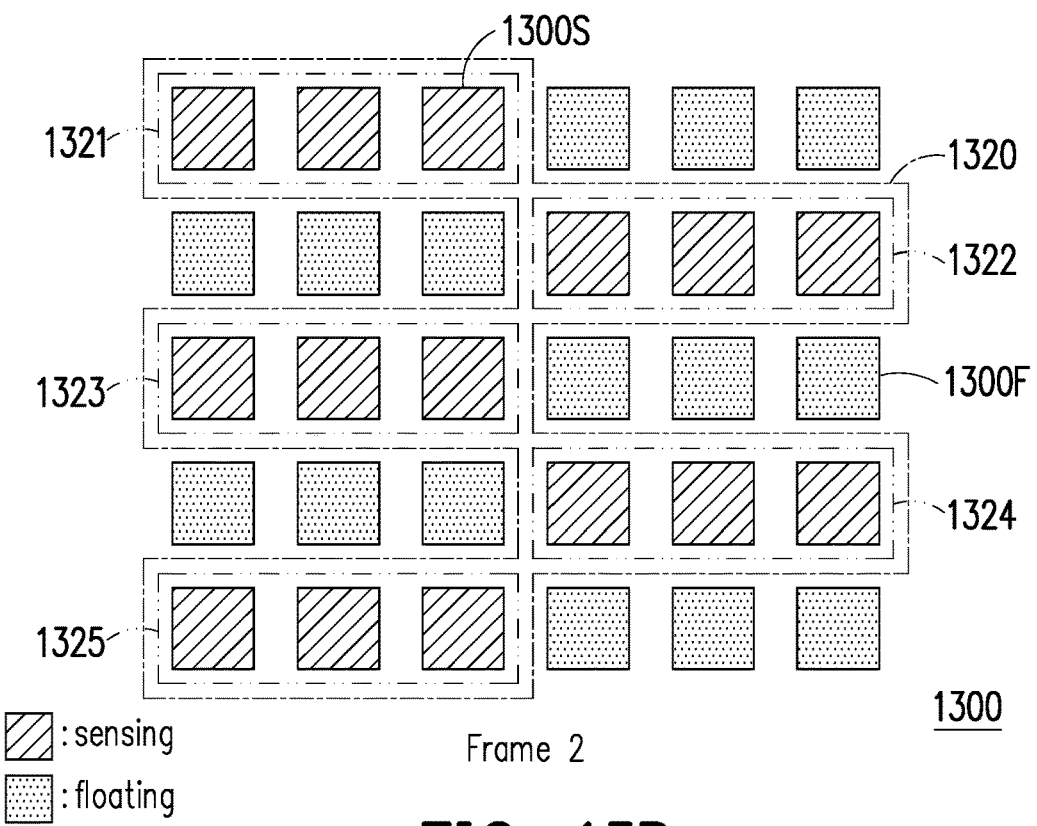

FIGS. 13A and 13B illustrate a plurality of touch sensors which may perform proximity sensing according to an embodiment of the disclosure. FIGS. 13A and 13B show a plurality of touch sensors 1300. The touch sensors 1300 may be arranged in a configuration similar to a checkerboard. FIGS. 13A and 13B show two groups of touch sensors 1310 and 1320. In FIG. 13A, the group of touch sensors 1310 is the sensing group, and the group of touch sensors 1320 is the non-sensing group. In FIG. 13B, the group of touch sensors 1320 is the sensing group, and the group of touch sensors 1310 is the non-sensing group.

FIG. 13A shows a Frame 1. FIG. 13A shows that the touch sensors 1300 may be grouped into a sensing group 1310 and a non-sensing group 1320. The sensing group 1310 may include touch sensor units 1311 to 1315. Each touch sensor unit 1311 to 1315 may include one or more touch sensors 1300S. The touch sensors 1300S are filled with lines. The sensing group 1310 may be controlled to perform a proximity sensing operation. The non-sensing group 1320 may include touch sensor units 1321 to 1325. Each touch sensor unit 1321 to 1325 may include one or more touch sensors 1300F. The touch sensors 1300F are filled with dots. The non-sensing group 1320 may not be controlled to perform a proximity sensing operation.

FIG. 13B shows a Frame 2. Difference between FIGS. 13A and 13B is that FIG. 13B shows a sensing group 1320 and a non-sensing group 1310. Further description of FIG. 13B is similar to the description of FIG. 13A.

FIGS. 13A and 13B show that the touch sensor units 1311 to 1315 and 1321 to 1325 may be arranged in an array. The touch sensor units 1311 to 1315 and 1321 to 1325 may be alternately disposed in each column and each row of the array.

A touch controller may control the plurality of touch sensors 1300. For example, the touch controller 210 of FIG. 2 may control the plurality of touch sensors 1300. FIGS. 13A and 13B show Frame 1 and Frame 2. The sensing group 1310 of Frame 1 may be the non-sensing group of Frame 2. Similarly, the non-sensing group of Frame 1 may be the non-sensing group 1320 of Frame 2. Frame 1 may define the sensing group and the non-sensing group of a first sensing period. Frame 2 may define the sensing group and the non-sensing group of a second sensing period. Further description of the first sensing period and the second sensing period is similar to the description of the first sensing period and the second sensing period of FIGS. 11A and 11B.

FIGS. 13A and 13B show that the touch sensors 1300F may be set to the floating state in order to increase sensing sensitivity.

FIGS. 13A and 13B also show that the touch sensor units 1311 to 1315 and 1321 to 1325 may include three touch sensors. Thus, the touch sensor units of the sensing group and the touch sensor units of the non-sensing group may include a same number of touch sensors.

Additionally, a panel may include the plurality of touch sensors 1300. The touch sensors of the touch sensor units 1311 to 1315 and 1321 to 1325 may belong to the same row. Thus, the extension direction of the touch sensor unit may be parallel with a row direction of the panel.

Figure 14A:
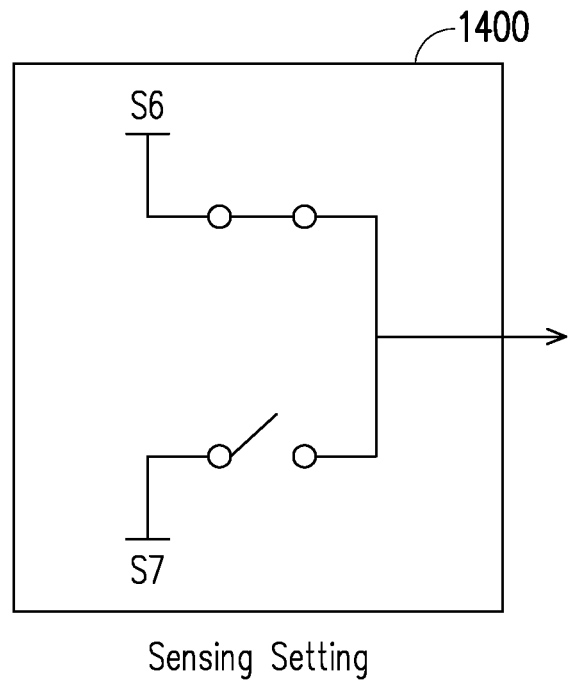
FIGS. 14A and 14B illustrate a sensing setting and a floating setting for touch sensors according to an embodiment of the disclosure.
Figure 14B:
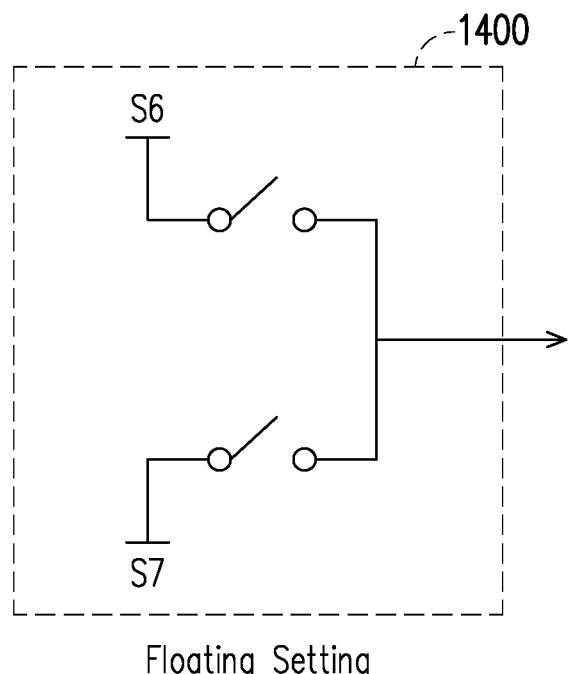

FIGS. 14A and 14B illustrate a sensing setting and a floating setting for touch sensors according to an embodiment of the disclosure. FIGS. 14A and 14B show a switch circuit 1400. The switch circuit 1400 may connect a touch sensor to a touch driving signal S6. The switch circuit 1400 may also connect a touch sensor to a touch driving signal S7. For example, the touch controller 110 of FIG. 1 or the touch controller 210 of FIG. 2 may control these switches. FIGS. 14A and 14B show that the touch sensor may not be coupled to the touch driving signal S7 since the corresponding switch is turned off. Thus, in both sensing setting and floating setting, the touch sensor may not be coupled to the touch driving signal S7.

FIG. 14A illustrates a sensing setting. The touch sensor may be coupled to the touch driving signal S6 since the corresponding switch is turned on. Thus, the touch sensor may perform proximity sensing.

FIG. 14B illustrates a floating setting. Different from FIG. 14A, the touch sensor may not be coupled to the touch driving signal S6 since the corresponding switch is turned off. The touch sensor may not be driven by the touch driving signal S6. The touch sensor may also be not coupled to the touch driving signal S7. Thus, the touch sensor may be in a floating state.

FIGS. 15A, 15B, 15C, 15D, 15E and 15F illustrate a plurality of touch sensors which may perform proximity sensing according to an embodiment of the disclosure. FIGS. 15A, 15B, 15C, 15D, 15E and 15F show a plurality of touch sensors 1500. The plurality of touch sensors 1500 show touch sensors 1500S and 1500F. A touch controller, like touch controller 110, may control the plurality of touch sensors 1500. Touch sensors 1500S may perform proximity sensing. Touch sensors 1500S are filled with lines. Touch sensors 1500F may not perform proximity sensing. Touch sensors 1500F are filled with dots. Touch sensors 1500S may be grouped into a sensing group. Touch sensors 1500F may be grouped into a non-sensing group. Touch sensors 1500F may be set to the floating state in order to increase sensing sensitivity.

FIGS. 15A, 15B, 15C, 15D, 15E and 15F show that the touch sensors surrounding a touch sensor 1500S may be set to the floating state. A column of touch sensors may be selected to perform proximity sensing. However, not all touch sensors of the column may be controlled to perform proximity sensing simultaneously. The touch sensors of the column which do not perform proximity sensing may be set to the floating state.

In the example of FIGS. 15A, 15B, 15C, 15D, 15E and 15F, two columns of touch sensors are selected to perform proximity sensing. In a first frame, the touch sensors of a first selected column and located in odd-numbered rows may be controlled to perform proximity sensing. In the first frame, the touch sensors of a second selected column located in even-numbered rows may be controlled to perform proximity sensing. In a second frame, the touch sensors of the first selected column and located in even-numbered rows may be controlled to perform proximity sensing. In the second frame, the touch sensors of the second selected column located in odd-numbered rows may be controlled to perform proximity sensing. Since the touch sensors in a selected column may perform proximity sensing in two frames, time required for proximity sensing may be doubled. However, at least one of the touch sensors of the non-sensing group is adjacent to a touch sensor performing proximity sensing. Thus, increased sensing sensitivity is attained.

Figure 15A:
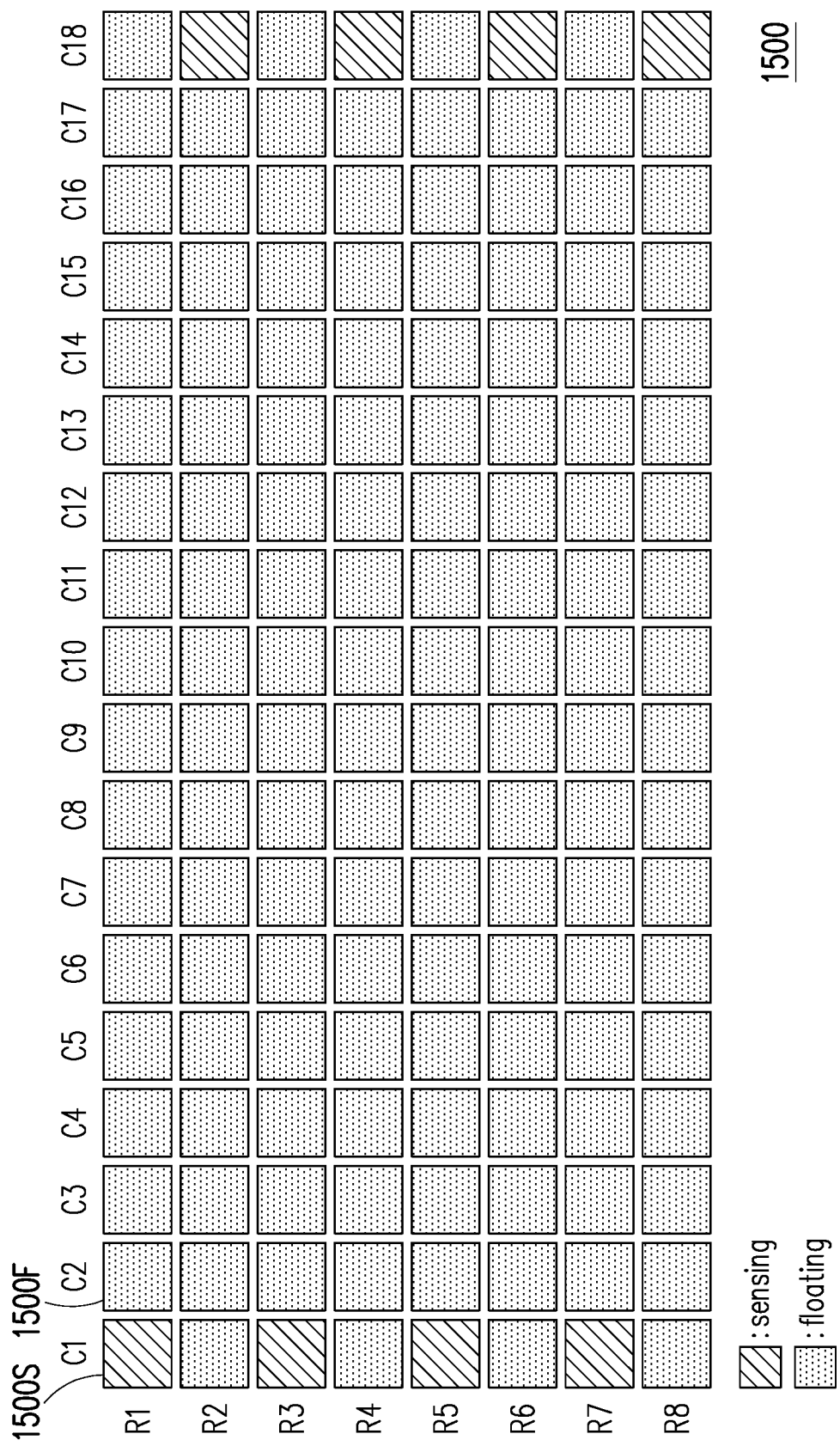
FIGS. 15A, 15B, 15C, 15D, 15E and 15F illustrate a plurality of touch sensors which may perform proximity sensing according to an embodiment of the disclosure.
Figure 15B:
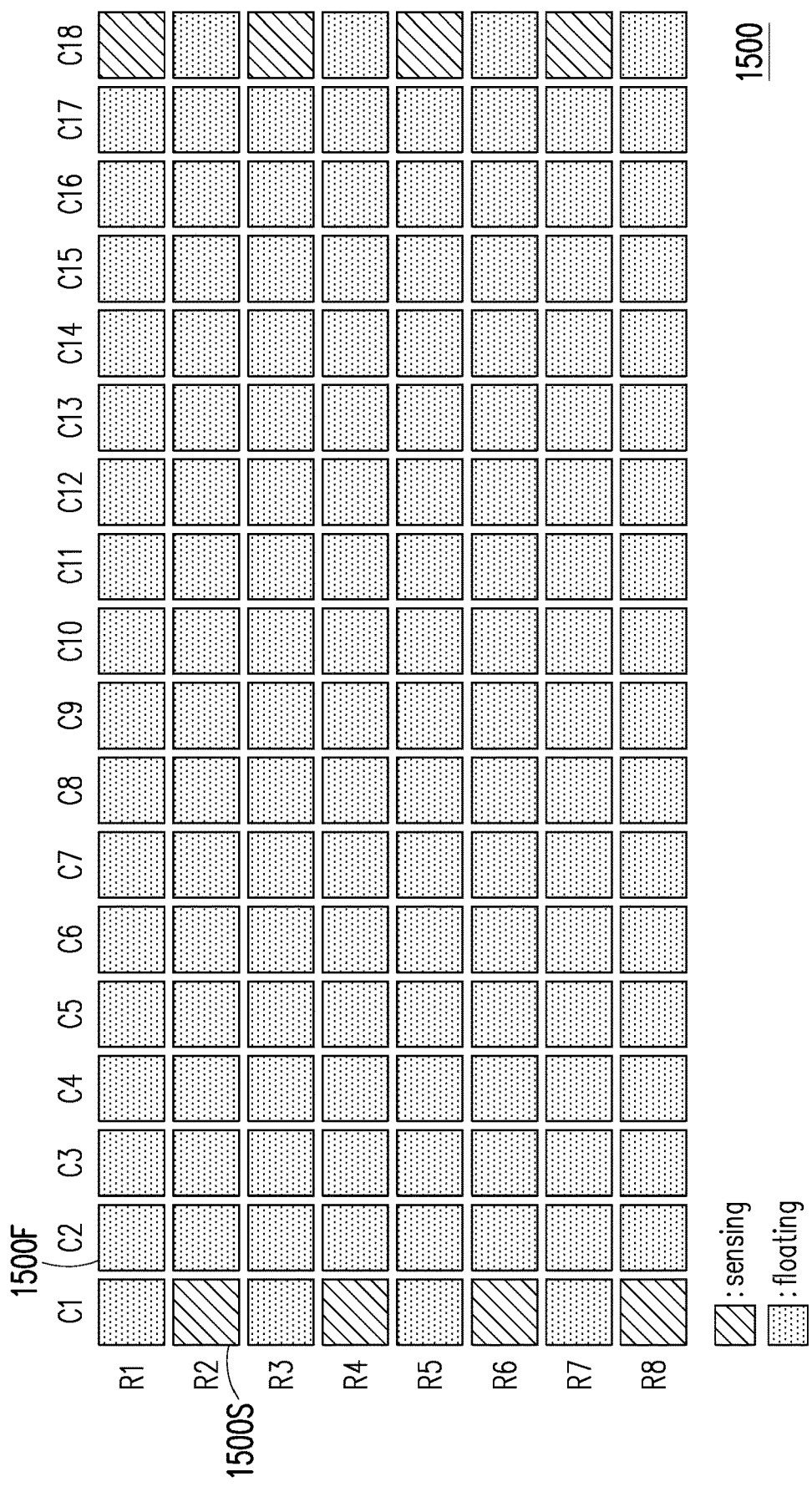

FIGS. 15A and 15B show frames where columns C1 and C18 are selected. FIG. 15A shows a frame where the touch sensors in odd-numbered rows R1, R3, R5 and R7 of column C1 may be driven to perform proximity sensing. FIG. 15A shows that the touch sensors in even-numbered rows R2, R4, R6 and R8 of column C18 may be driven to perform proximity sensing.

FIG. 15B is complementary to FIG. 15A. FIG. 15B shows a frame where the touch sensors in even-numbered rows R2, R4, R6 and R8 of column C1 may be driven to perform proximity sensing. FIG. 15B shows that the touch sensors in odd-numbered rows R1, R3, R5 and R7 of column C18 may be driven to perform proximity sensing.

Figure 15C:
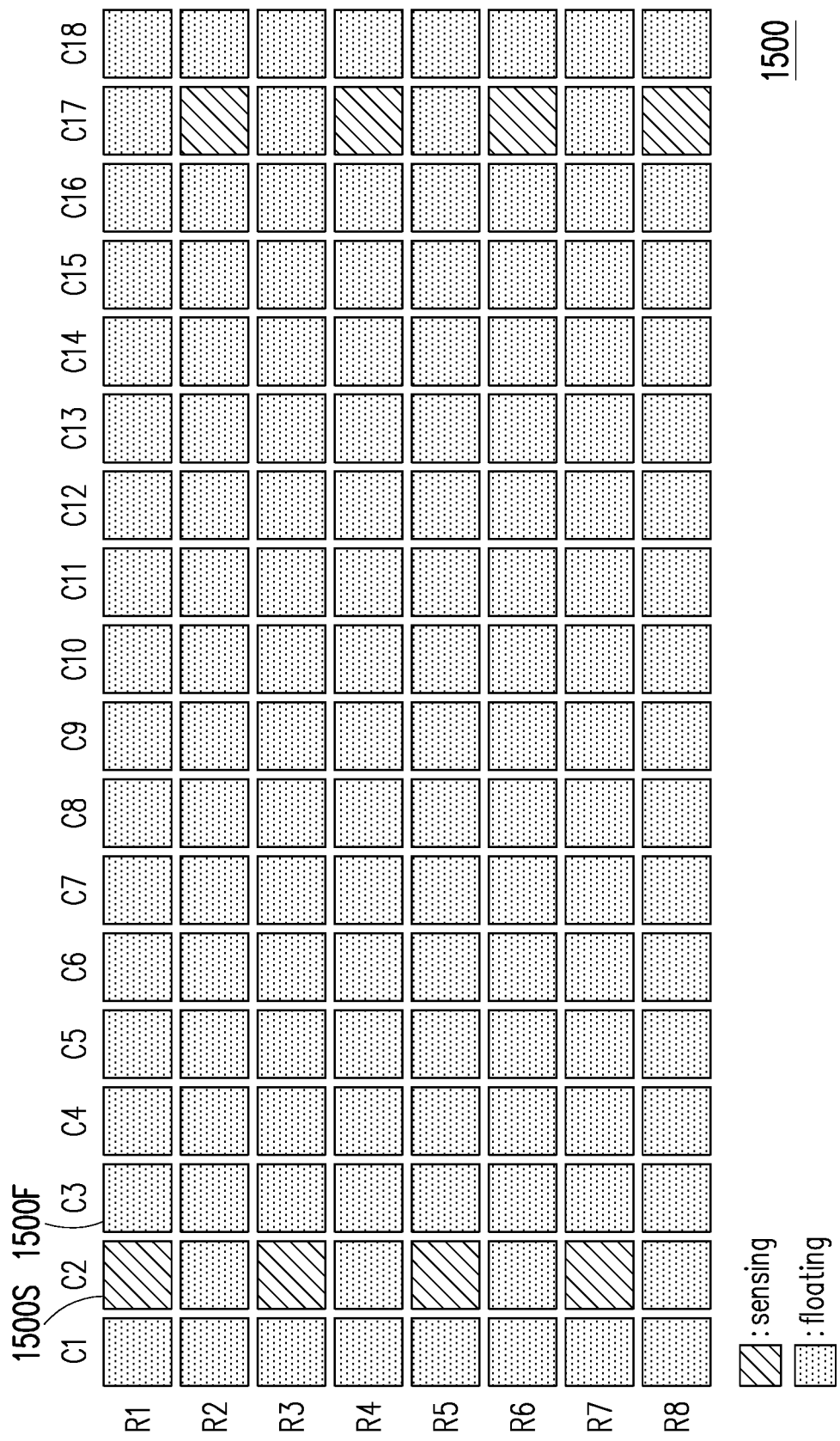
Figure 15D:
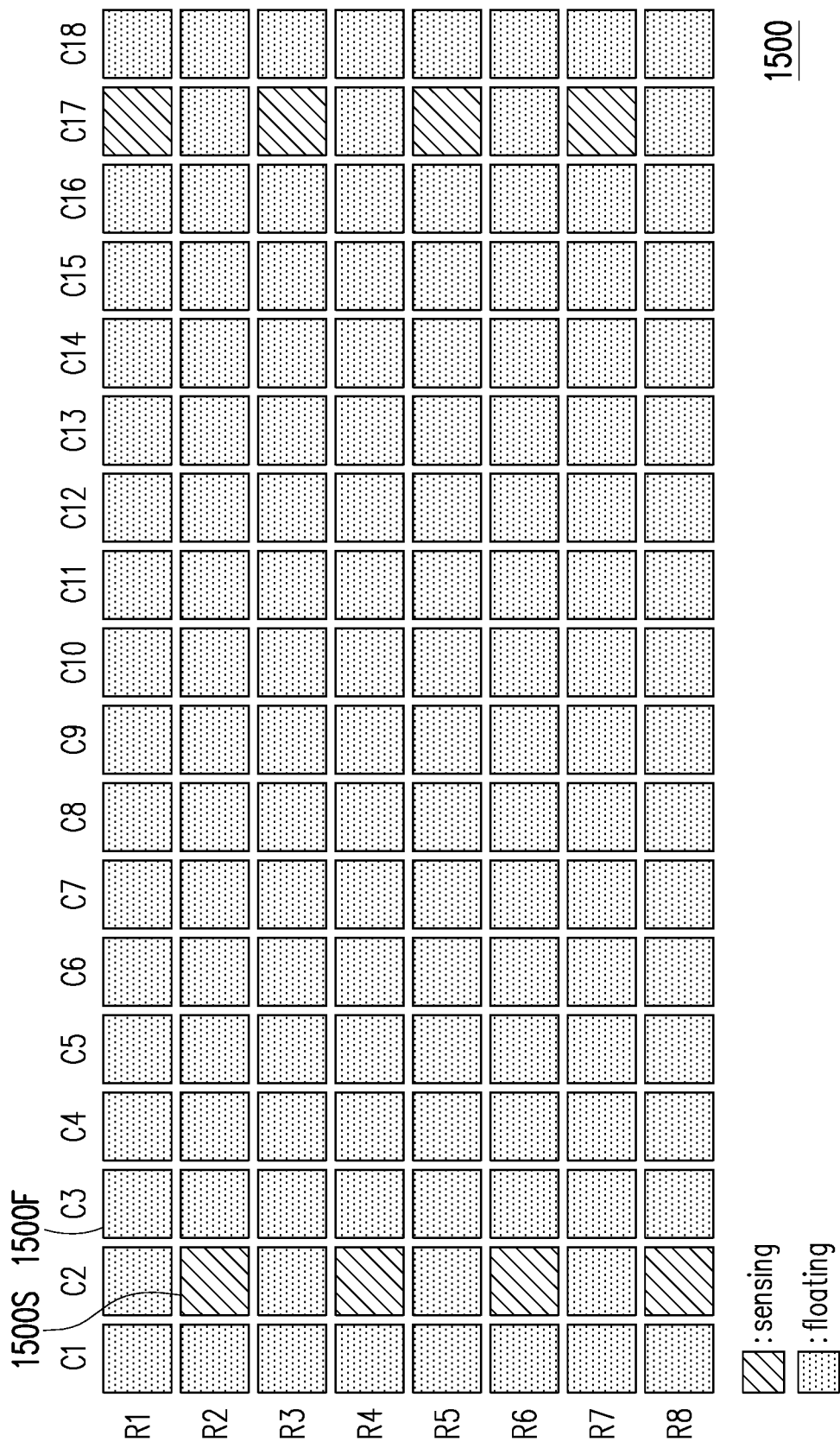

FIGS. 15C and 15D show frames where columns C2 and C17 are selected. FIG. 15C shows a frame where the touch sensors in odd-numbered rows R1, R3, R5 and R7 of column C2 may be driven to perform proximity sensing. FIG. 15C shows that the touch sensors in even-numbered rows R2, R4, R6 and R8 of column C17 may be driven to perform proximity sensing.

FIG. 15D is complementary to FIG. 15C. FIG. 15D shows a frame where the touch sensors in even-numbered rows R2, R4, R6 and R8 of column C2 may be driven to perform proximity sensing. FIG. 15D shows that the touch sensors in odd-numbered rows R1, R3, R5 and R7 of column C17 may be driven to perform proximity sensing.

In FIGS. 15A, 15B, 15C and 15D, all of the touch sensors surrounding a touch sensor 1500S belong to the non-sensing group.

Figure 15E:
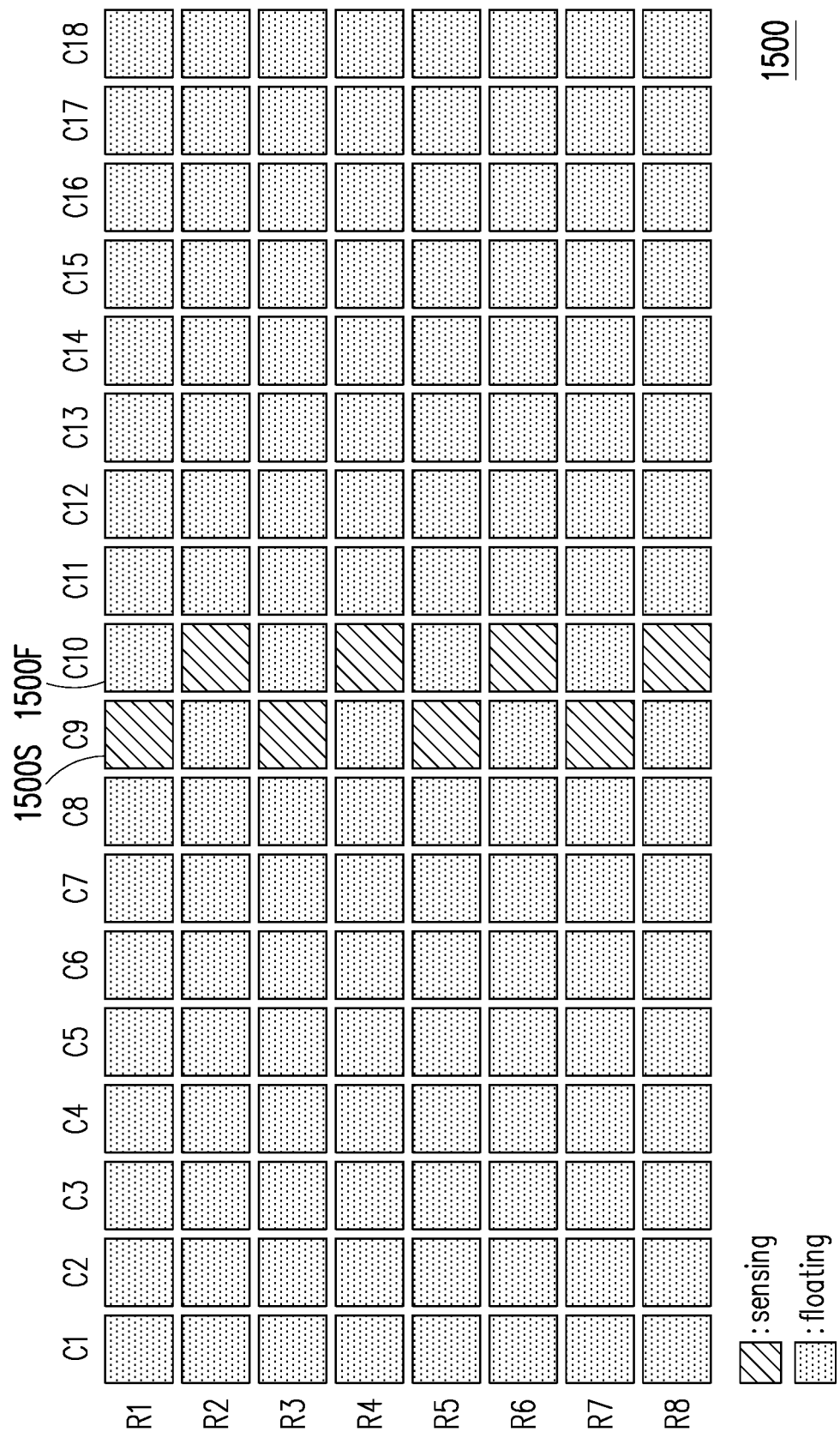
Figure 15F:
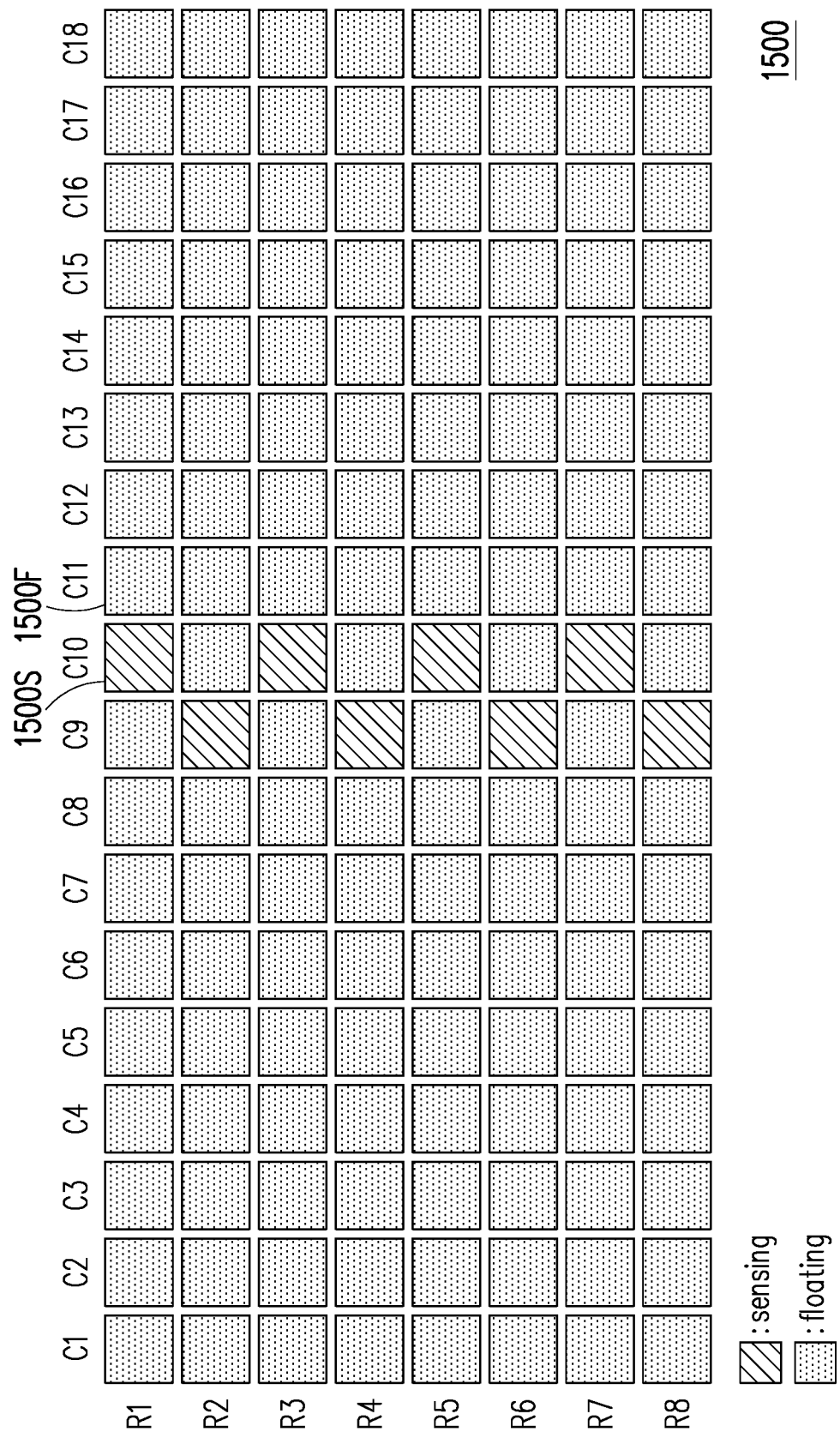

FIGS. 15E and 15F show frames where columns C9 and C10 are selected. FIG. 15E shows a frame where the touch sensors in odd-numbered rows R1, R3, R5 and R7 of column C9 may be driven to perform proximity sensing. FIG. 15E shows that the touch sensors in even-numbered rows R2, R4, R6 and R8 of column C10 may be driven to perform proximity sensing.

FIG. 15F is complementary to FIG. 15E. FIG. 15F shows a frame where the touch sensors in even-numbered rows R2, R4, R6 and R8 of column C9 may be driven to perform proximity sensing. FIG. 15F shows that the touch sensors in odd-numbered rows R1, R3, R5 and R7 of column C10 may be driven to perform proximity sensing.

In some implementations, all touch sensors of the non-sensing group can be set to a floating state. Alternatively, some (closer to the sensing group) touch sensors of the non-sensing group can be set to a floating state and some other (farther to the sensing group) touch sensors of the non-sensing group can be set to a simultaneously-driven state.

FIGS. 16A, 16B, 16C, 16D, 16E and 16F illustrate a plurality of touch sensors which may perform proximity sensing according to an embodiment of the disclosure. FIGS. 16A, 16B, 16C, 16D, 16E and 16F show a plurality of touch sensors 1600. The plurality of touch sensors 1600 show touch sensors 1600S, 1600F and 1600D. For example, touch controller 110 may control the plurality of touch sensors 1600. Touch sensors 1600S may perform proximity sensing. Touch sensors 1600S are marked with diagonal lines of bottom-left-to-top-right orientation. Touch sensors 1600F may not perform proximity sensing. Touch sensors 1600F may be set to a floating state in order to increase sensing sensitivity. Touch sensors 1600F are marked with dots. Touch sensors 1600D may not perform proximity sensing. Touch sensors 1600D may be set to a simultaneously-driven state. Touch sensors 1600D are marked with diagonal lines of top-left-to-bottom-right orientation. Touch sensors 1600S may be grouped into a sensing group. Touch sensors 1600F and 1600D may be grouped into a non-sensing group.

In FIGS. 16A, 16B, 16C, 16D, 16E and 16F, the touch sensors 1600F may surround the touch sensors 1600S in order to increase sensing sensitivity. The touch sensors 1600D may not surround the touch sensors 1600S. In other words, the touch sensors 1600D may be farther away from the touch sensors 1600S. At least one of the touch sensors 1600F is adjacent to a touch sensor 1600S.

In FIGS. 16A, 16B, 16C, 16D, 16E and 16F, two columns of touch sensors are selected to perform proximity sensing. In a first frame, the touch sensors of a first selected column located in odd-numbered rows may be controlled to perform proximity sensing. In a second frame, the touch sensors of the first selected column located in even-numbered rows may be controlled to perform proximity sensing. Since the touch sensors in a selected column perform proximity sensing in two frames, time required for proximity sensing is doubled. However, increased sensing sensitivity is attained.

Figure 16A:
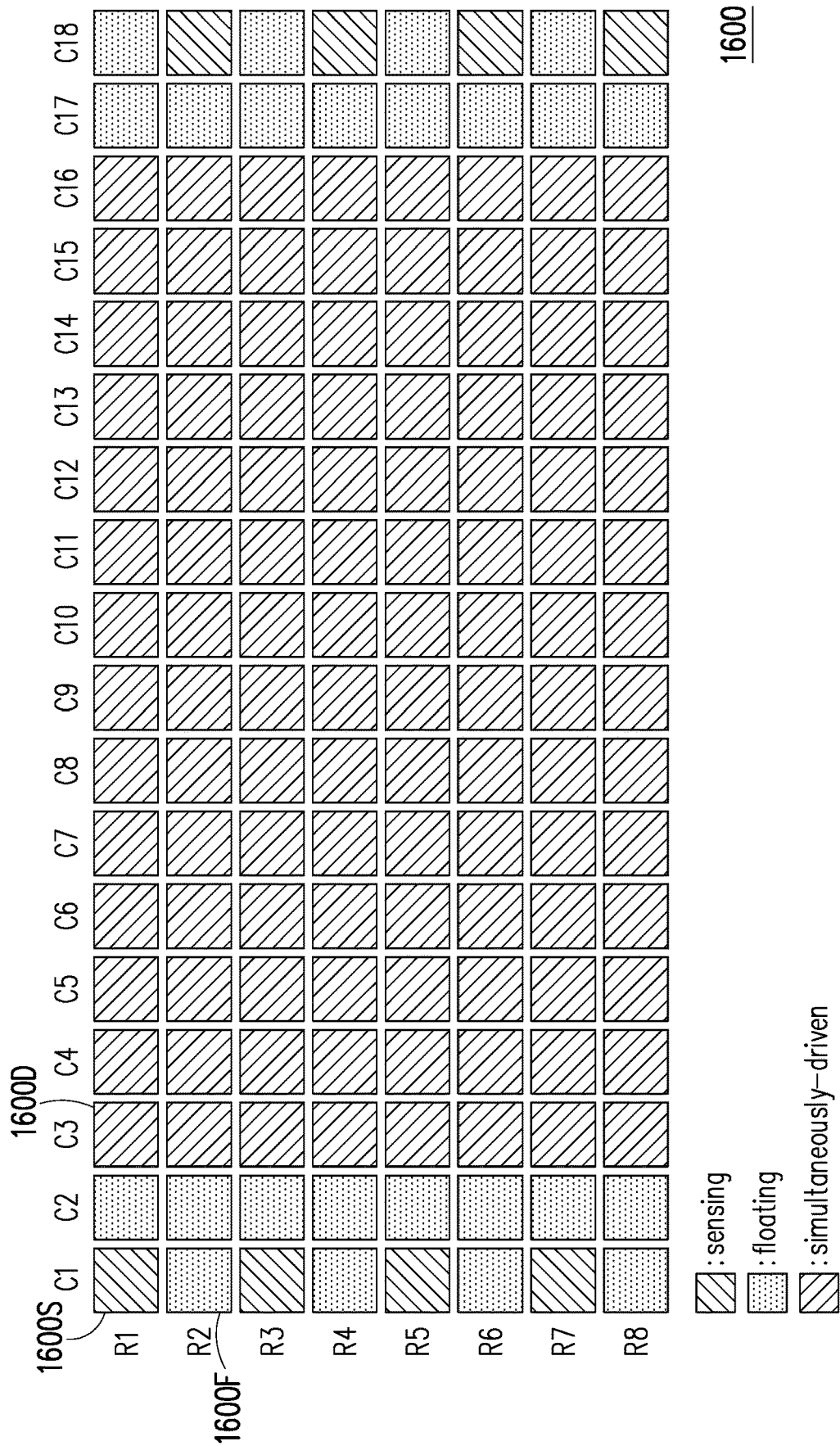
FIGS. 16A, 16B, 16C, 16D, 16E and 16F illustrate a plurality of touch sensors which may perform proximity sensing according to an embodiment of the disclosure.
Figure 16B:
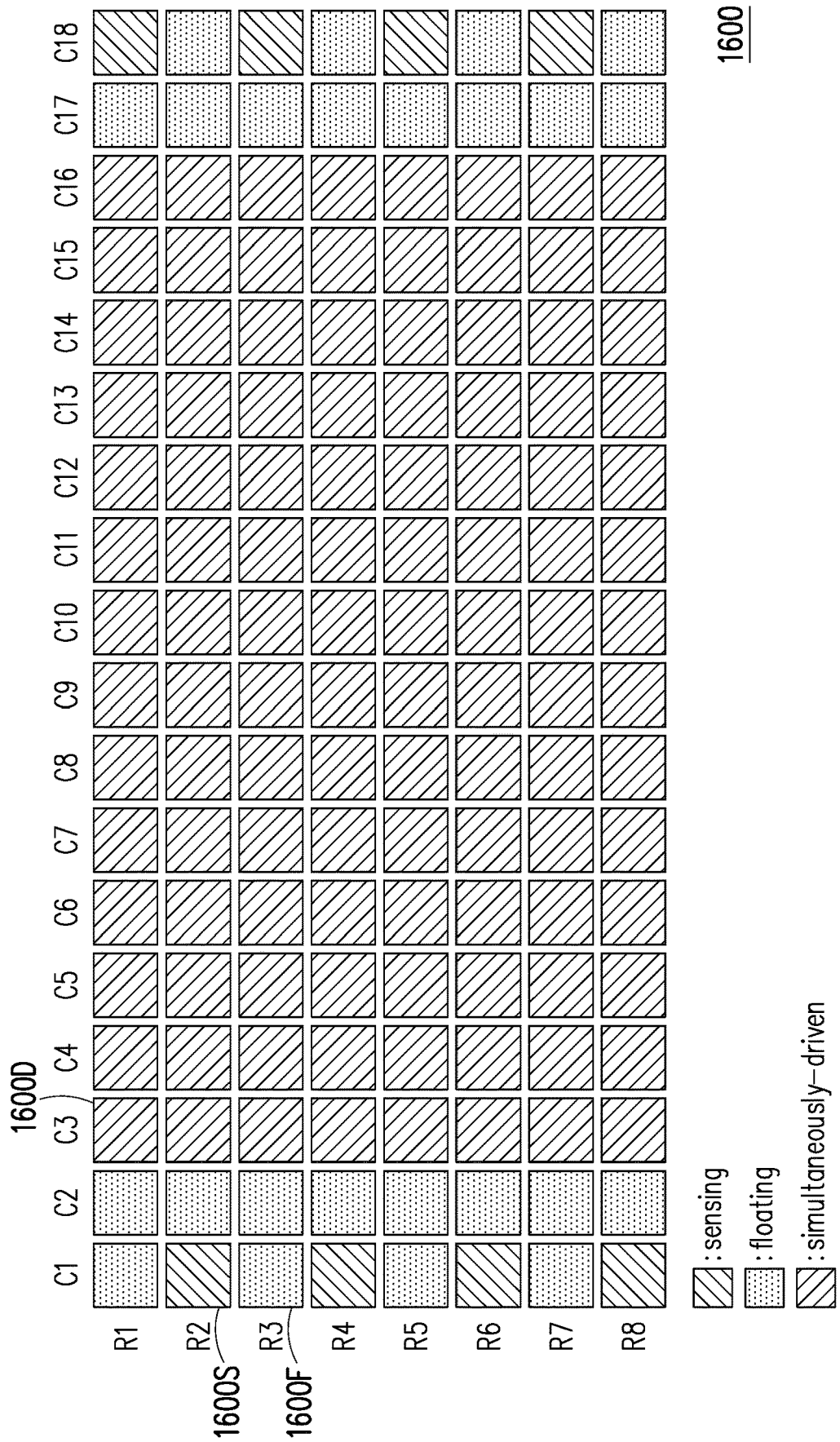

FIGS. 16A and 16B show frames where columns C1 and C18 are selected. FIG. 16A shows a frame where the touch sensors in odd-numbered rows R1, R3, R5 and R7 of column C1 may be controlled to perform proximity sensing. FIG. 16A shows that the touch sensors in even-numbered rows R2, R4, R6 and R8 of column C18 may be controlled to perform proximity sensing. The touch sensors 1600F may surround the touch sensors 1600S. The touch sensors 1600D may be farther away from the touch sensors 1600S. Thus, the touch sensors of columns C3 to C16 may be set to the simultaneously-driven state.

FIG. 16B is complementary to FIG. 16A. FIG. 16B shows a frame where the touch sensors in even-numbered rows R2, R4, R6 and R8 of column C1 may be controlled to perform proximity sensing. FIG. 16B shows that the touch sensors in odd-numbered rows R1, R3, R5 and R7 of column C18 may be controlled to perform proximity sensing.

Figure 16C:
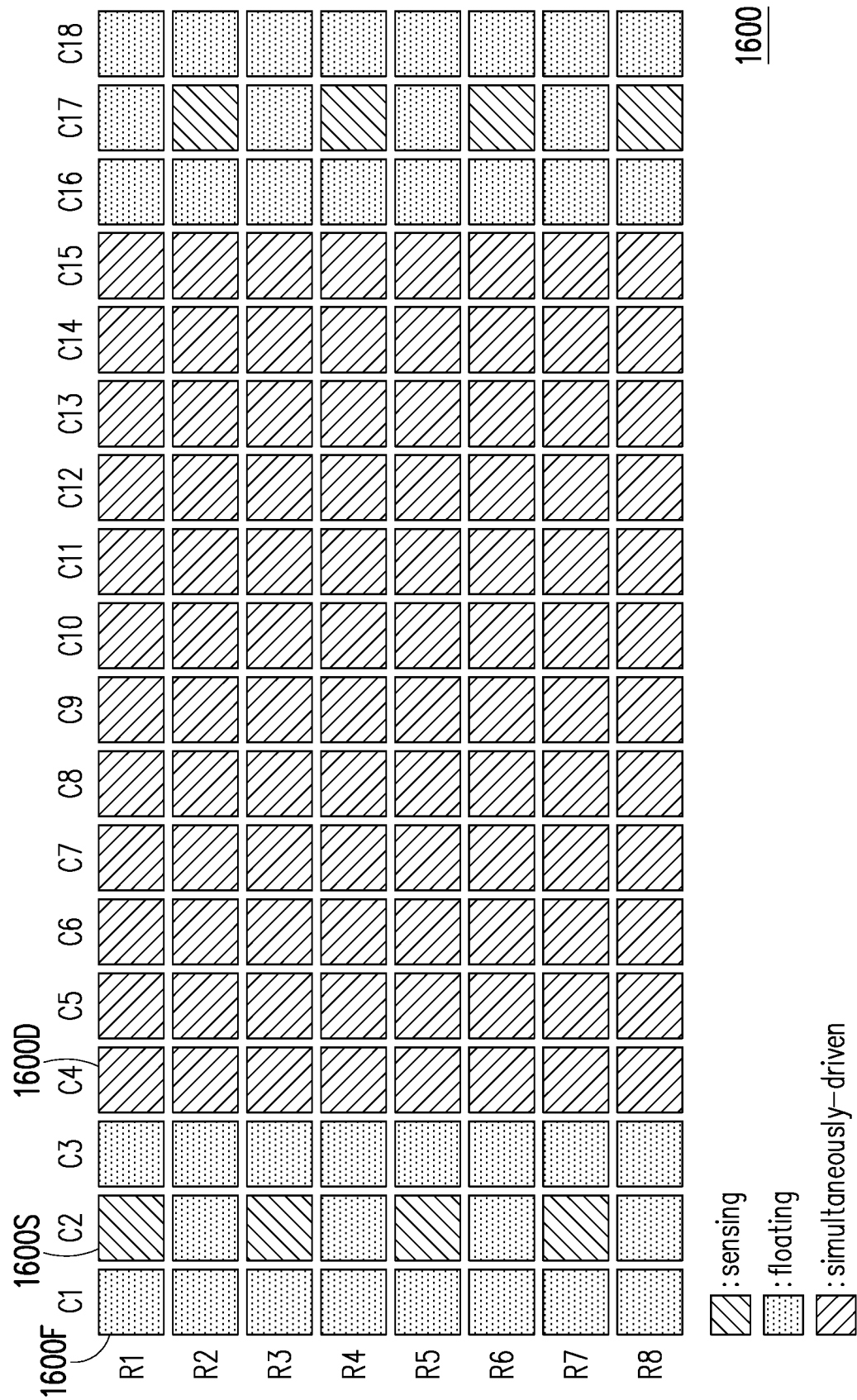
Figure 16D:
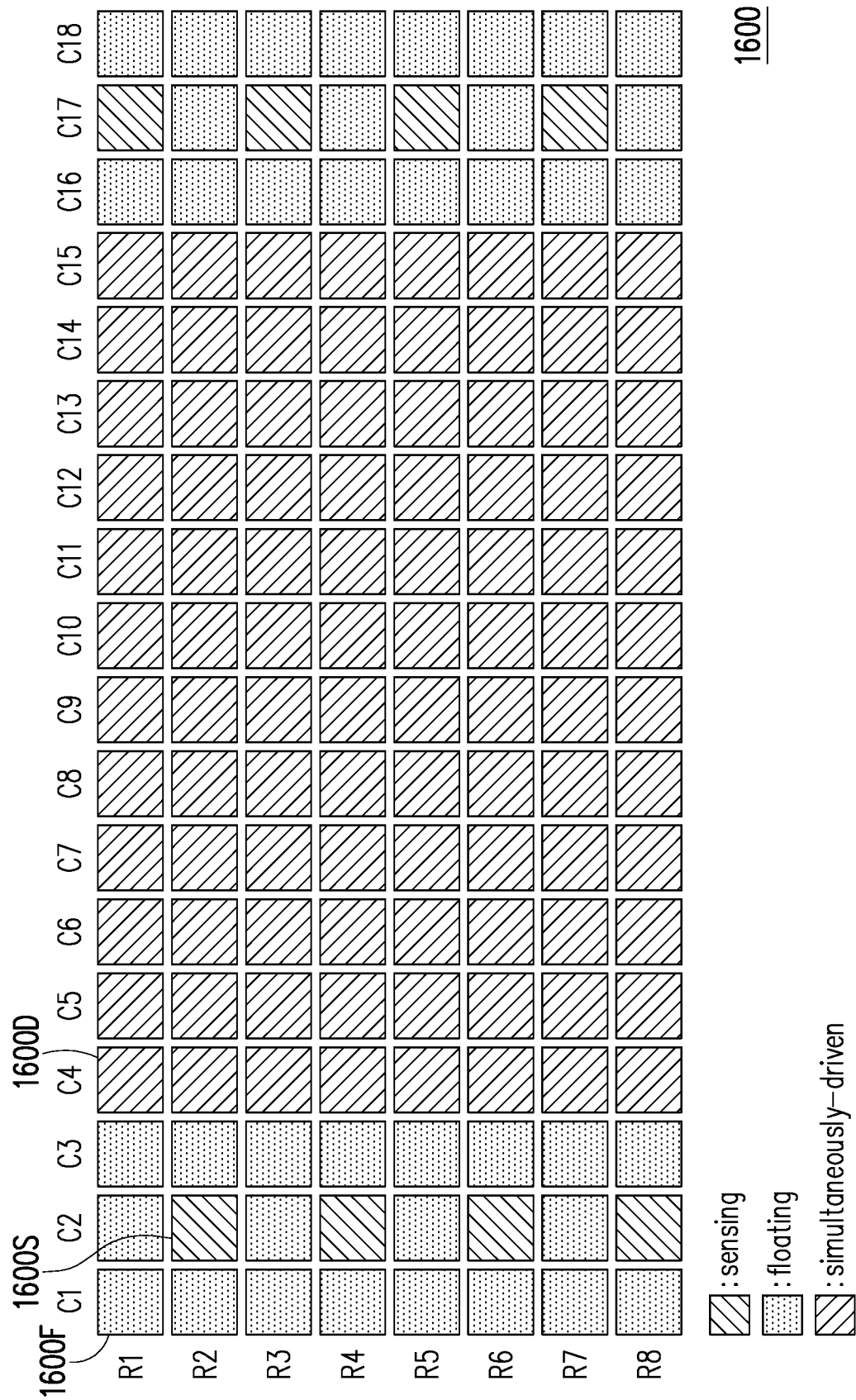

FIGS. 16C and 16D show frames where columns C2 and C17 may be selected. FIG. 16C shows a frame where the touch sensors in odd-numbered rows R1, R3, R5 and R7 of column C2 may be controlled to perform proximity sensing. FIG. 16C shows that the touch sensors in even-numbered rows R2, R4, R6 and R8 of column C17 may be controlled to perform proximity sensing. The touch sensors 1600F may surround the touch sensors 1600S. The touch sensors 1600D may be farther away from the touch sensors 1600S. Thus, the touch sensors of columns C4 to C15 may be set to the simultaneously-driven state.

FIG. 16D is complementary to FIG. 16C. FIG. 16D shows a frame where the touch sensors in even-numbered rows R2, R4, R6 and R8 of column C2 may be controlled to perform proximity sensing. FIG. 16D shows that the touch sensors in odd-numbered rows R1, R3, R5 and R7 of column C17 may be controlled to perform proximity sensing.

Figure 16E:
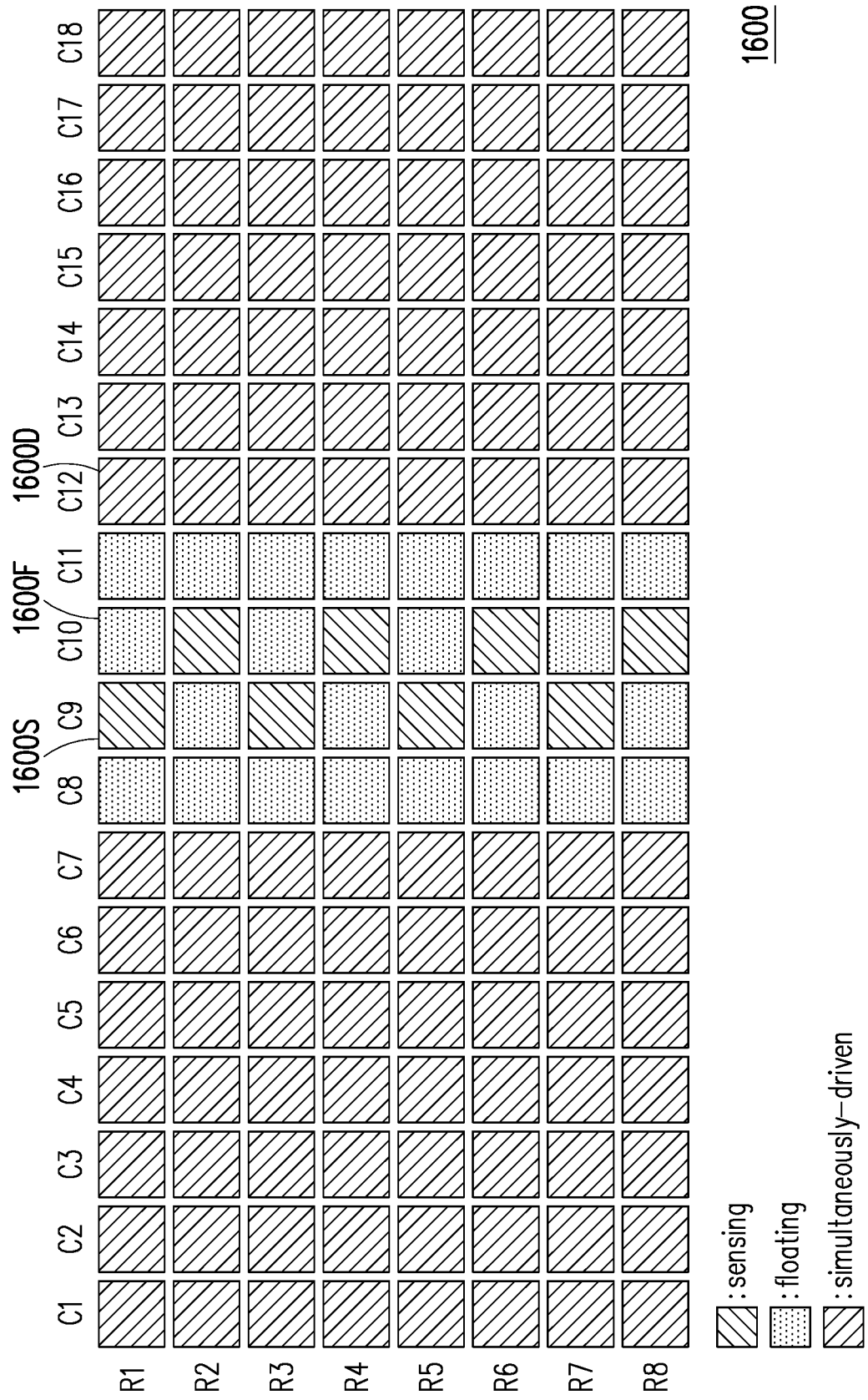
Figure 16F:
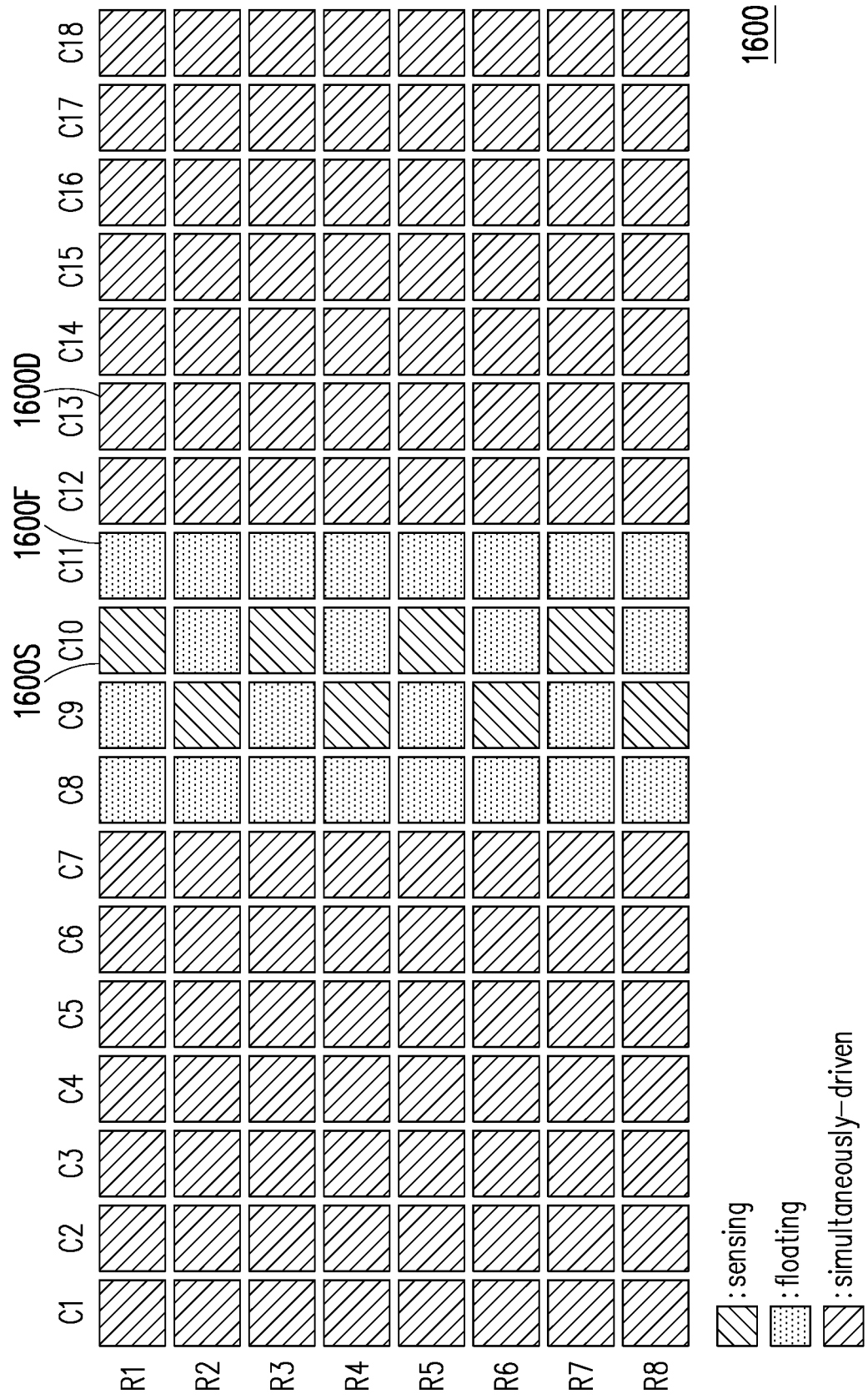

FIGS. 16E and 16F show frames where columns C9 and C10 are selected. FIG. 16E shows a frame where the touch sensors in odd-numbered rows R1, R3, R5 and R7 of column C9 may be controlled to perform proximity sensing. FIG. 16E shows that the touch sensors in even-numbered rows R2, R4, R6 and R8 of column C10 may be controlled to perform proximity sensing. Several of the touch sensors surrounding the touch sensors 1600S may not be touch sensors 1600F or 1600D. The touch sensors 1600F may surround the touch sensors 1600S. The touch sensors 1600D may be farther away from the touch sensors 1600S. Thus, the touch sensors of columns C1 to C7 and C12 to C18 may be set to the simultaneously-driven state.

FIG. 16F is complementary to FIG. 16E. FIG. 16F shows a frame where the touch sensors in even-numbered rows R2, R4, R6 and R8 of column C9 may be controlled to perform proximity sensing. FIG. 16F shows that the touch sensors in odd-numbered rows R1, R3, R5 and R7 of column C10 may be controlled to perform proximity sensing.

FIGS. 17A, 17B, 17C and 17D illustrate an array of a plurality of touch sensors which may perform proximity sensing according to an embodiment of the disclosure. FIGS. 17A, 17B, 17C and 17D show an array of a plurality of touch sensors 1700. The plurality of touch sensors 1700 show touch sensors 1700S, 1700F and 1700D. For example, the touch controller 110 of FIG. 1 may control the plurality of touch sensors 1700. Touch sensors 1700S may perform proximity sensing. Touch sensors 1700S are marked with diagonal lines of bottom-left-to-top-right orientation. Touch sensors 1700F that are adjacent and surrounding the touch sensors 1700S may not perform proximity sensing. Touch sensors 1700F may be set to a floating state in order to increase sensing sensitivity. Touch sensors 1700F are marked with dots. Touch sensors 1700D may not perform proximity sensing. Touch sensors 1700D that are farther away from the touch sensors 1700S may be set to a simultaneously-driven state. Touch sensors 1700D are marked with diagonal lines of top-left-to-bottom-right orientation.

Figure 17A:
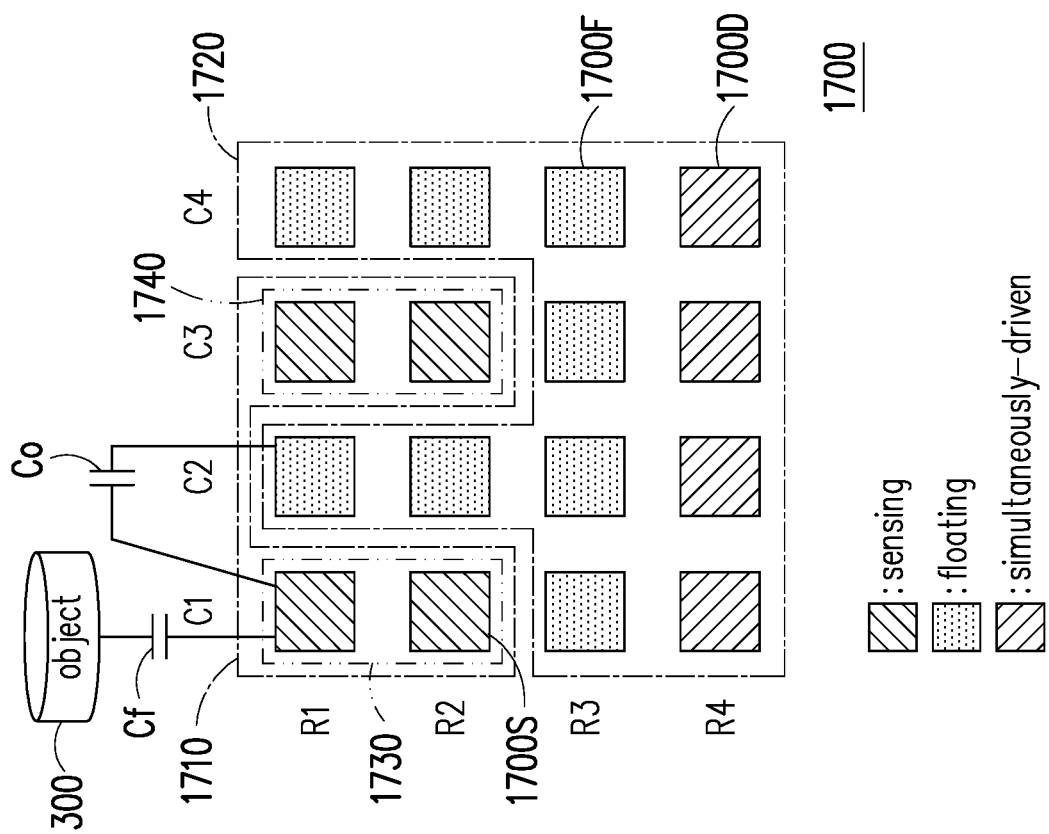
FIGS. 17A, 17B, 17C and 17D illustrate an array of a plurality of touch sensors which may perform proximity sensing according to an embodiment of the disclosure.

FIG. 17A shows a sensing group 1710 and a non-sensing group 1720. The sensing group 1710 may include one or more touch sensors 1700S. The non-sensing group 1720 may include one or more touch sensors 1700F and 1700D. The touch controller 110 may control the sensing group 1710 to perform a proximity sensing operation. The touch controller 110 may not control the non-sensing group 1720 to perform a proximity sensing operation. The touch controller 110 may be configured to set one or more touch sensors 1700F of the non-sensing group 1720 to a floating state. At least one of the touch sensors 1700F of the non-sensing group 1720 may be adjacent to the sensing group 1710. The touch controller 110 may be configured to set one or more touch sensors 1700D of the non-sensing group 1720 to a simultaneously-driven state.

The sensing group 1710 may include touch sensor units 1730 and 1740. At least one touch sensor 1700S may be arranged as a touch sensor unit. FIG. 17A shows that two touch sensors 1700S may be arranged as the touch sensor unit 1730. Similarly, two touch sensors 1700S may be arranged as the touch sensor unit 1740. One or more touch sensors 1700F of the non-sensing group 1720 may be adjacent to the touch sensor units 1730 and 1740. The touch sensors 1700D may located in row R4. The touch sensors 1700D may be located in a row which is not adjacent to the touch sensor units 1730 and 1740. Thus, the touch sensors 1700D may be farther away from the touch sensor units 1730 and 1740.

FIG. 17A shows that all the touch sensors surrounding the touch sensor units 1730 and 1740 may be touch sensors 1700F of the non-sensing group 1720. However, the example of FIG. 17A does not intend to limit the disclosure. The touch controller 110 may control a first part of the touch sensors surrounding a touch sensor unit to be one or more touch sensors 1700F of the non-sensing group 1720. The touch controller 110 may control a second part of the touch sensors surrounding the touch sensor unit to be one or more touch sensors 1700D of the non-sensing group 1720.

FIG. 17A shows that all the touch sensors which are not on adjacent columns or adjacent rows of the touch sensor units 1730 and 1740 may be touch sensors 1700D. FIG. 17A shows that all the touch sensors on row R4 may be touch sensors 1700D. Thus, all the touch sensors other than the touch sensors surrounding the touch sensor units 1730 and 1740 may be touch sensors 1700D of the non-sensing group 1720. However, the example of FIG. 17A does not intend to limit the disclosure. The touch controller 110 may control a first part of the touch sensors other than the touch sensors surrounding the touch sensor units 1730 and 1740 to be touch sensors 1700F of the non-sensing group 1720. The touch controller 110 may control a second part of the touch sensors other than the touch sensors surrounding the touch sensor units 1730 and 1740 to be touch sensors 1700D of the non-sensing group 1720.

The touch controller 110 may control the sensing group 1710 to perform a proximity sensing operation during a first sensing period. The touch controller 110 may not control the non-sensing group 1720 to perform the proximity sensing operation during the first sensing period. In an embodiment of the disclosure, the touch controller 110 may control the plurality of touch sensors 1700 to perform a mutual-sensing operation in a second sensing period. The proximity sensing operation may be a self-sensing operation.

FIG. 17A shows an object 300. The object 300 may be in proximity to the plurality of touch sensors 1700. FIG. 17A shows a sensing capacitor Cf. The sensing capacitor Cf may be the capacitance in between the object 300 and the sensing group 1710. FIG. 17A shows a parasitic capacitor Co. The parasitic capacitor Co may be the capacitance between the sensing group 710 and at least one of the touch sensors 1700F of the non-sensing group 1720. The touch controller 110 may obtain a summation value of a first capacitance variation value of the sensing capacitor Cf and a second capacitance variation value of the parasitic capacitor Co. The second capacitance variation value may increase sensing sensitivity of the proximity sensing operation.

Figure 17B:
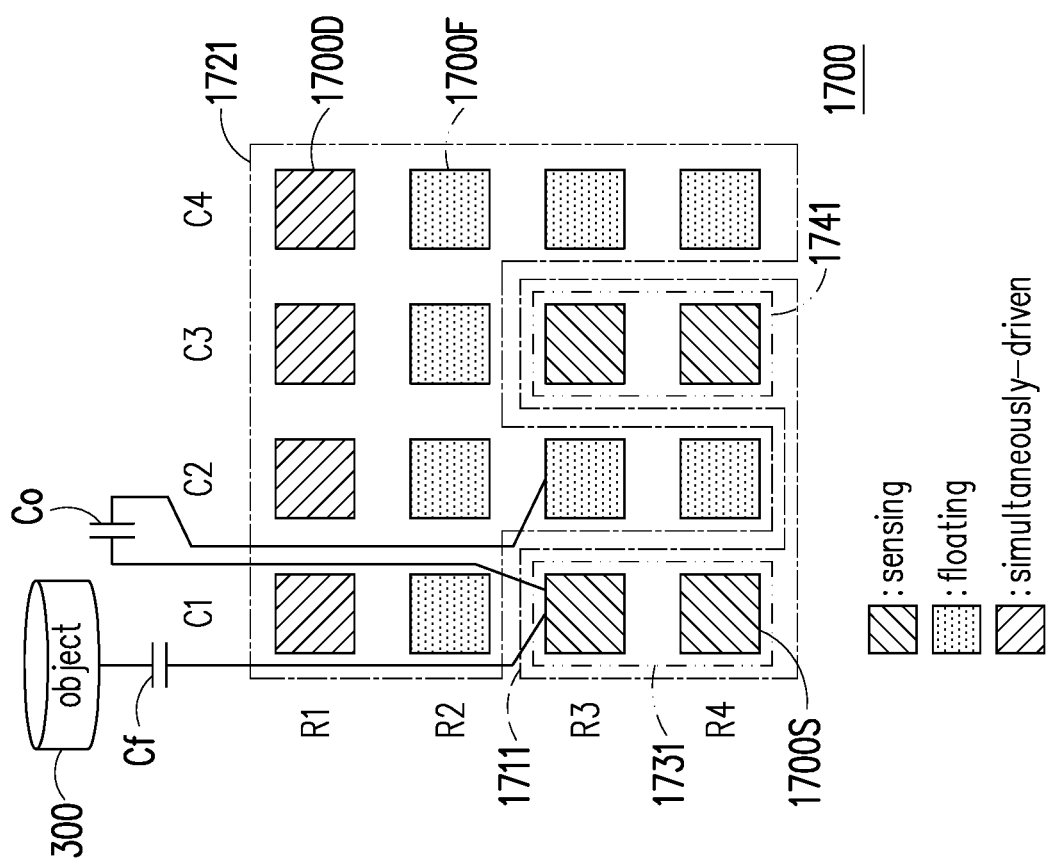
Figure 17C:
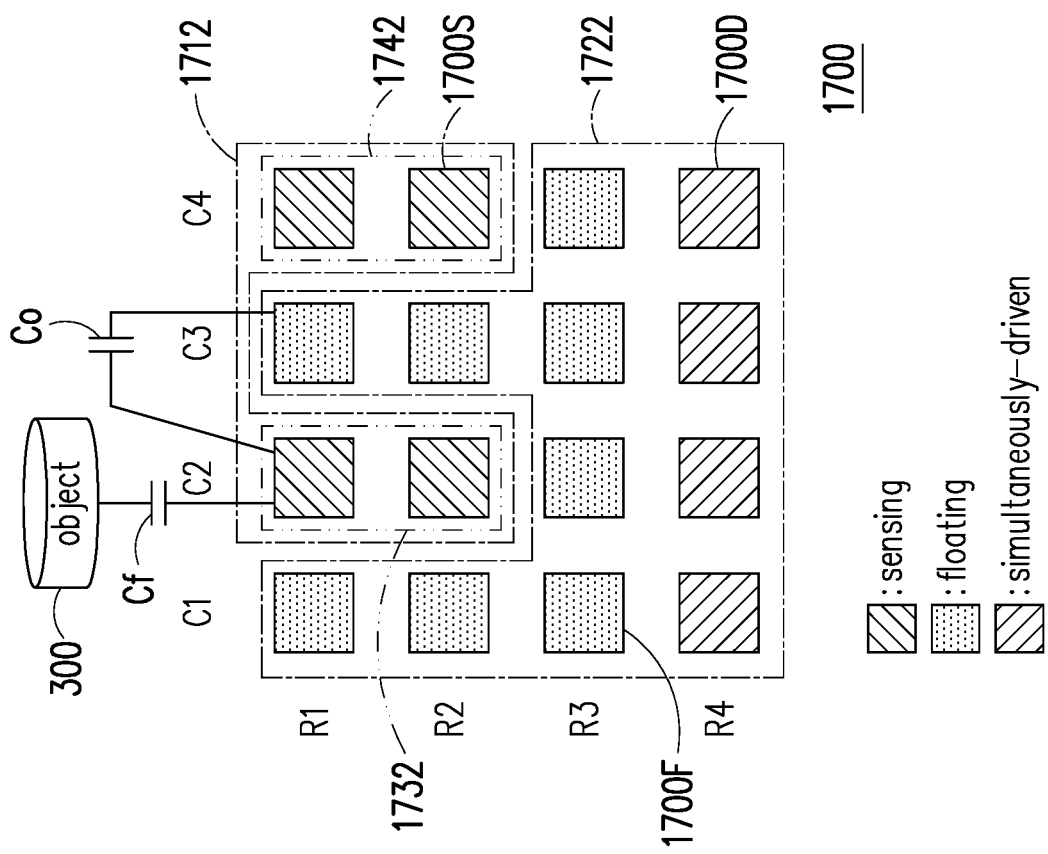
Figure 17D:
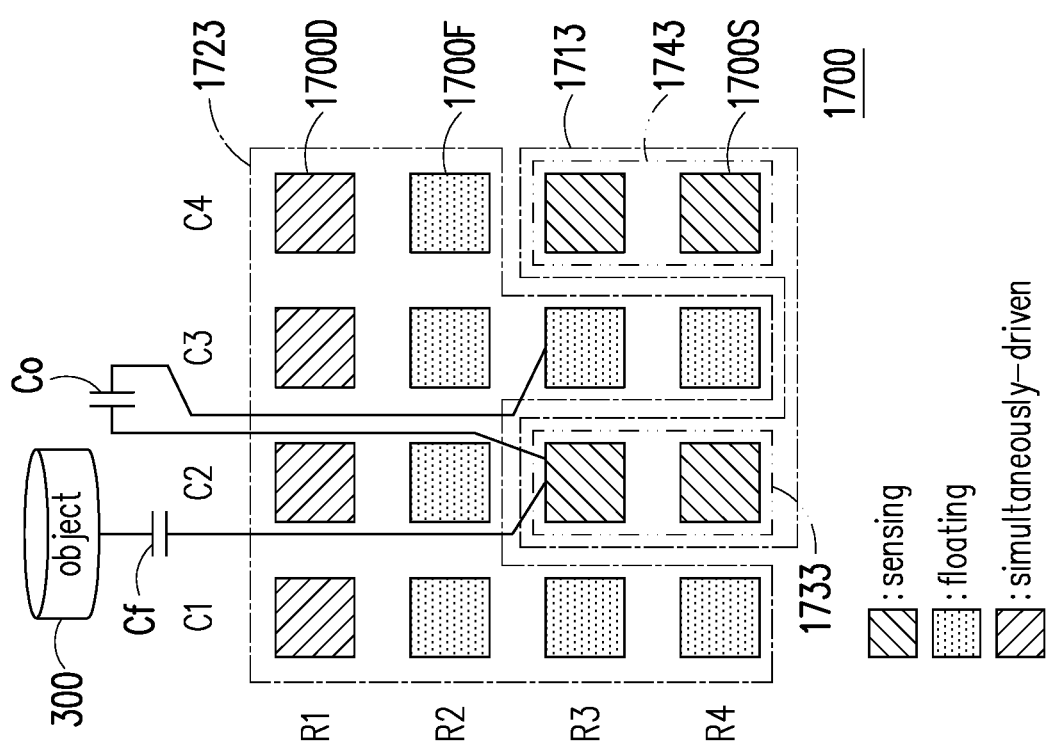

FIG. 17B shows a sensing group 1711 and a non-sensing group 1721. The sensing group 1711 may include touch sensor units 1731 and 1741. FIG. 17C shows a sensing group 1712 and a non-sensing group 1722. The sensing group 1712 may include touch sensor units 1732 and 1742. FIG. 17D shows a sensing group 1713 and a non-sensing group 1723. The sensing group 1713 may include touch sensor units 1733 and 1743. FIGS. 17B, 17C and 17D are similar to FIG. 17A. Thus, description of FIGS. 17B, 17C and 17D is similar to the description of FIG. 17A.

In an embodiment of the disclosure, the touch controller 110 may control the sensing group 1710 to perform a proximity sensing operation during a first sensing period. The touch controller 110 may control the sensing group 1711 to perform a proximity sensing operation during a second sensing period. The touch controller 110 may control the sensing group 1712 to perform a proximity sensing operation during a third sensing period. The touch controller 110 may control the sensing group 1713 to perform a proximity sensing operation during a fourth sensing period. Thus, the touch controller 110 may perform proximity sensing with all the touch sensors of the plurality of touch sensors 1700. Furthermore, the touch controller 110 may control the plurality of touch sensors 1700 to perform a mutual-sensing operation in a fifth sensing period. The proximity sensing operation may be a self-sensing operation.

Additionally, in other embodiments, the touch controller 210 of FIG. 2 may control the plurality of touch sensors 1700 depicted in FIGS. 17A, 17B, 17C and 17D.

A touch panel may include the array of the plurality of touch sensors 1700. For example, the touch panel 120 of FIG. 1 or the touch panel 220 of FIG. 2 may include the array of the plurality of touch sensors 1700. FIGS. 17A, 17B, 17C and 17D show touch sensor units 1730 to 1733 and 1740 to 1743. The extension direction of the touch sensor units 1730 to 1733 and 1740 to 1743 may be parallel to a column direction of the panel.

FIGS. 18A, 18B, 18C and 18D illustrate an array of a plurality of touch sensors which may perform proximity sensing according to an embodiment of the disclosure. FIGS. 18A, 18B, 18C and 18D show an array of a plurality of touch sensors 1800. The plurality of touch sensors 1800 show touch sensors 1800S, 1800F and 1800D. Touch sensors 1800S may perform proximity sensing. Touch sensors 1800F may not perform proximity sensing. Touch sensors 1800F may be set to a floating state in order to increase sensing sensitivity. Touch sensors 1800D may not perform proximity sensing. Touch sensors 1800D may be set to a simultaneously-driven state.

Figure 18A:
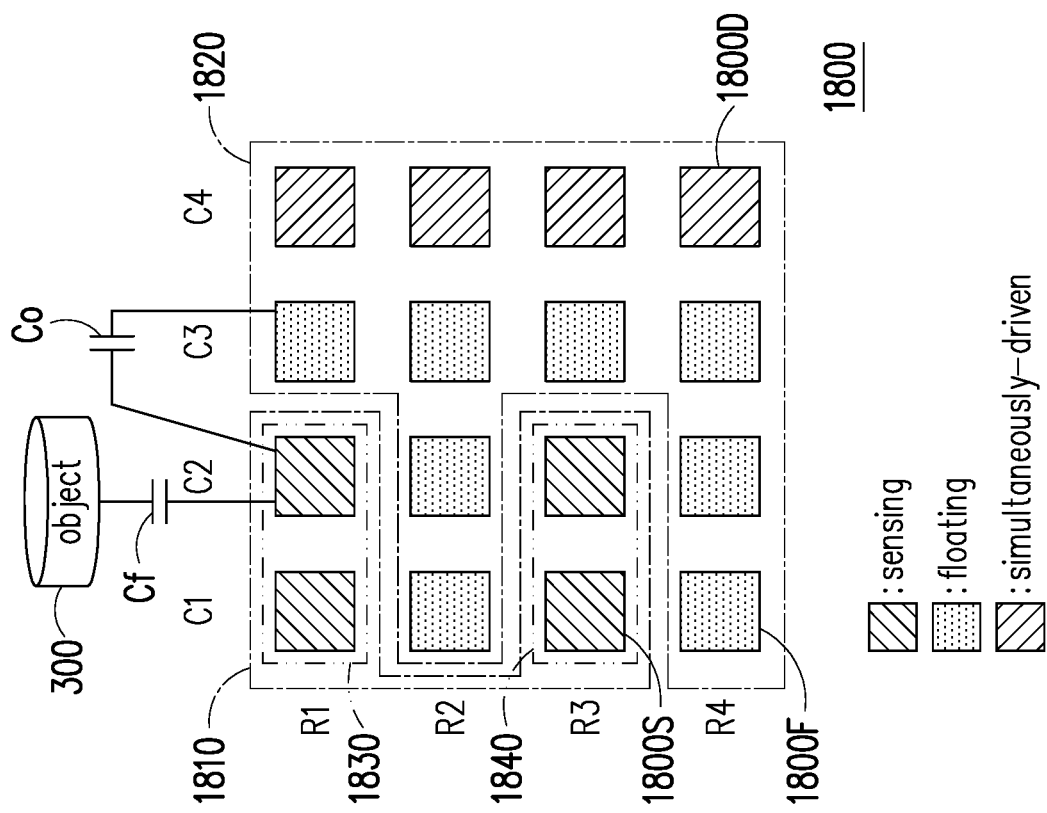
FIGS. 18A, 18B, 18C and 18D illustrate an array of a plurality of touch sensors which may perform proximity sensing according to an embodiment of the disclosure.
Figure 18B:
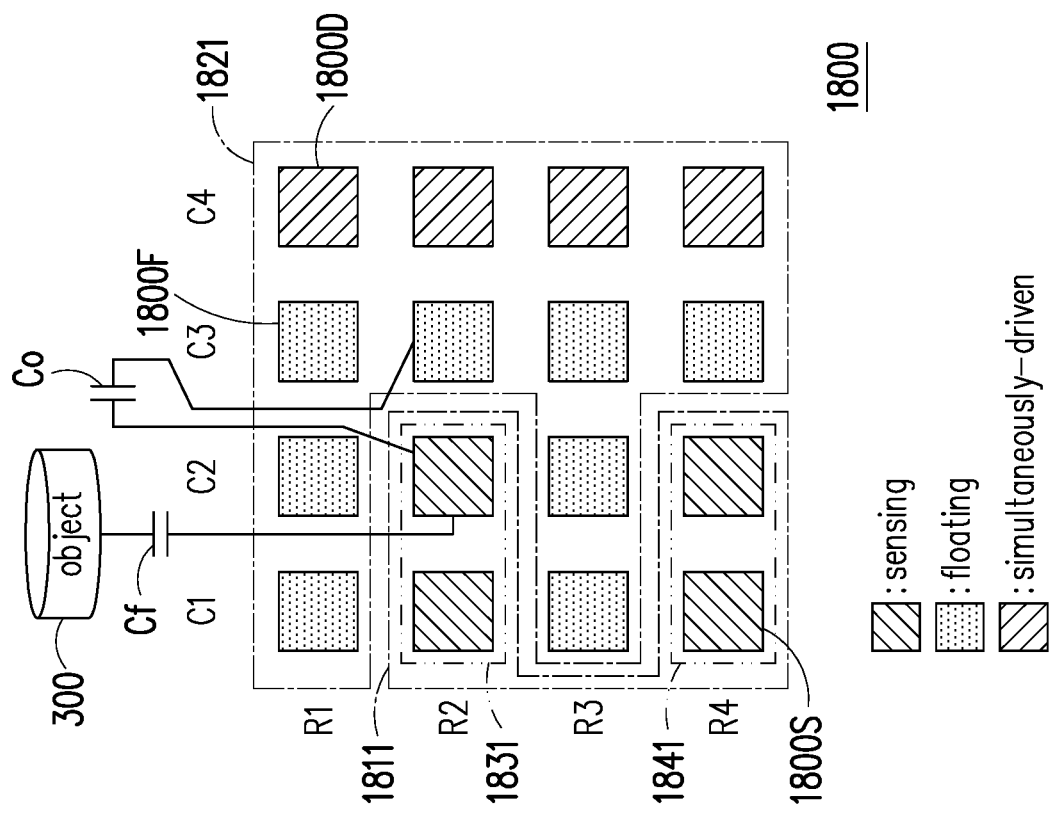
Figure 18C:
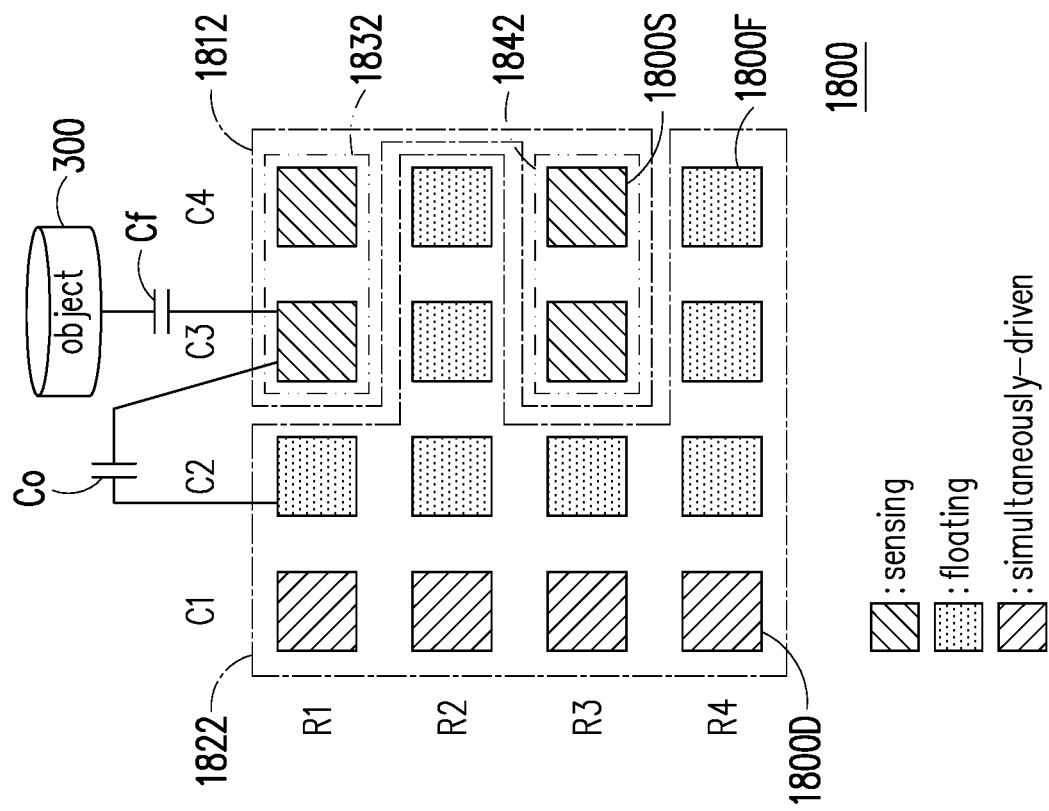
Figure 18D:
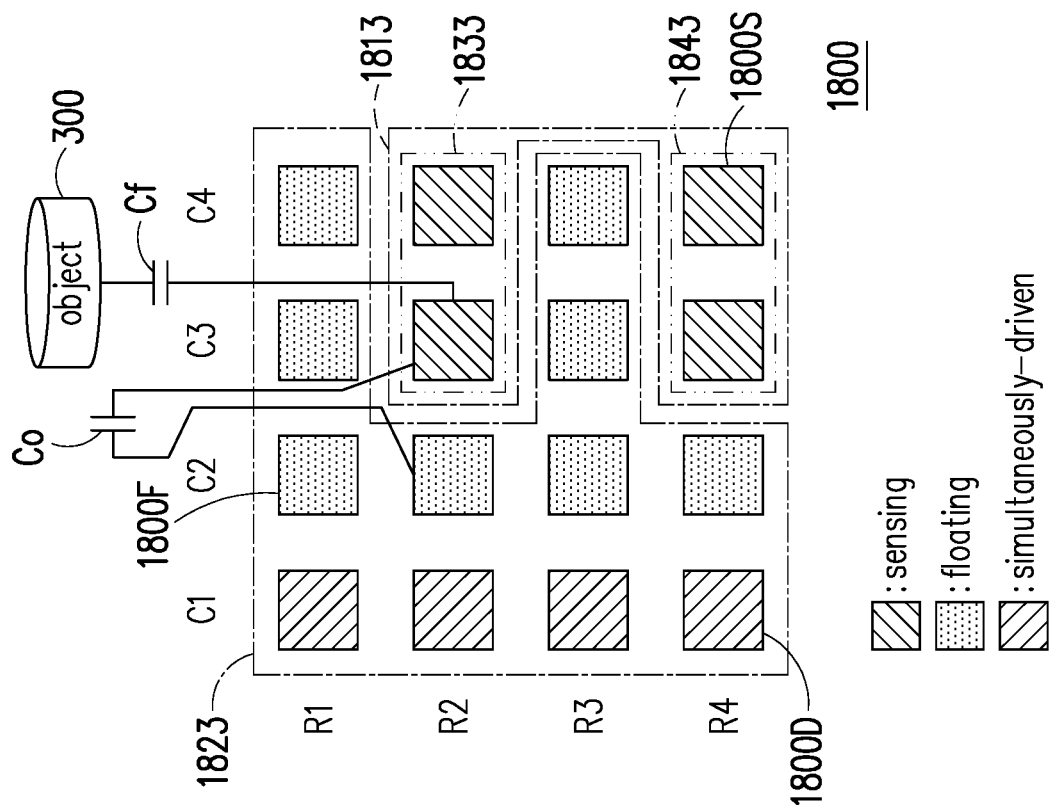

FIG. 18A shows a sensing group 1810 and a non-sensing group 1820. The sensing group 1810 may include touch sensor units 1830 and 1840. FIG. 18B shows a sensing group 1811 and a non-sensing group 1821. The sensing group 1811 may include touch sensor units 1831 and 1841. FIG. 18C shows a sensing group 1812 and a non-sensing group 1822. The sensing group 1812 may include touch sensor units 1832 and 1842. FIG. 18D shows a sensing group 1813 and a non-sensing group 1823. The sensing group 1813 may include touch sensor units 1833 and 1843.

FIGS. 18A, 18B, 18C and 18D are similar to FIGS. 17A, 17B, 17C and 17D. A difference is that the extension direction of the touch sensor units 1830 to 1833 and 1840 to 1843 may be parallel to a row direction of a panel. Further description of FIGS. 18A, 18B, 18C and 18D is similar to the description of FIGS. 17A, 17B, 17C and 17D.

FIGS. 19A, 19B, 19C and 19D illustrate an array of a plurality of touch sensors which may perform proximity sensing according to an embodiment of the disclosure. FIGS. 19A, 19B, 19C and 19D show an array of a plurality of touch sensors 1900. The plurality of touch sensors 1900 show touch sensors 1900S, 1900F and 1900D. Touch sensors 1900S may perform proximity sensing. Touch sensors 1900F may not perform proximity sensing. Touch sensors 1900F may be set to a floating state in order to increase sensing sensitivity. Touch sensors 1900D may not perform proximity sensing. Touch sensors 1900D may be set to a simultaneously-driven state.

Figure 19A:
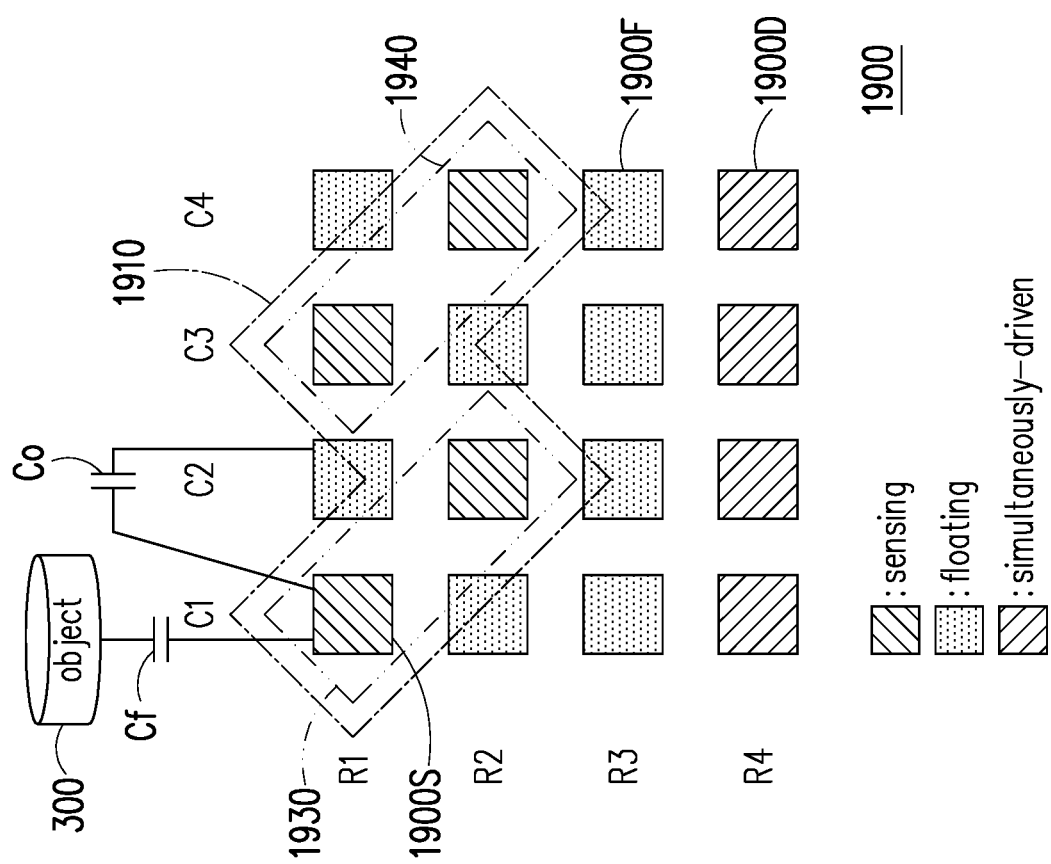
FIGS. 19A, 19B, 19C and 19D illustrate an array of a plurality of touch sensors which may perform proximity sensing according to an embodiment of the disclosure.
Figure 19B:
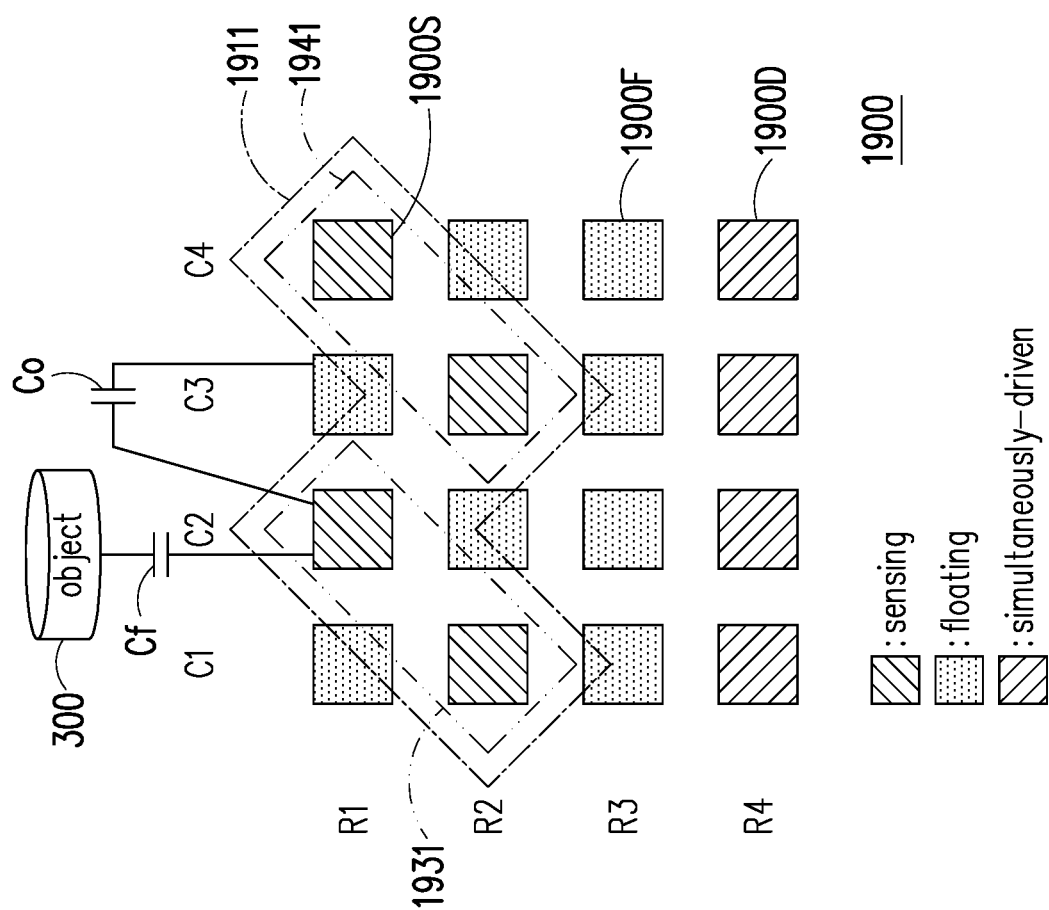
Figure 19C:
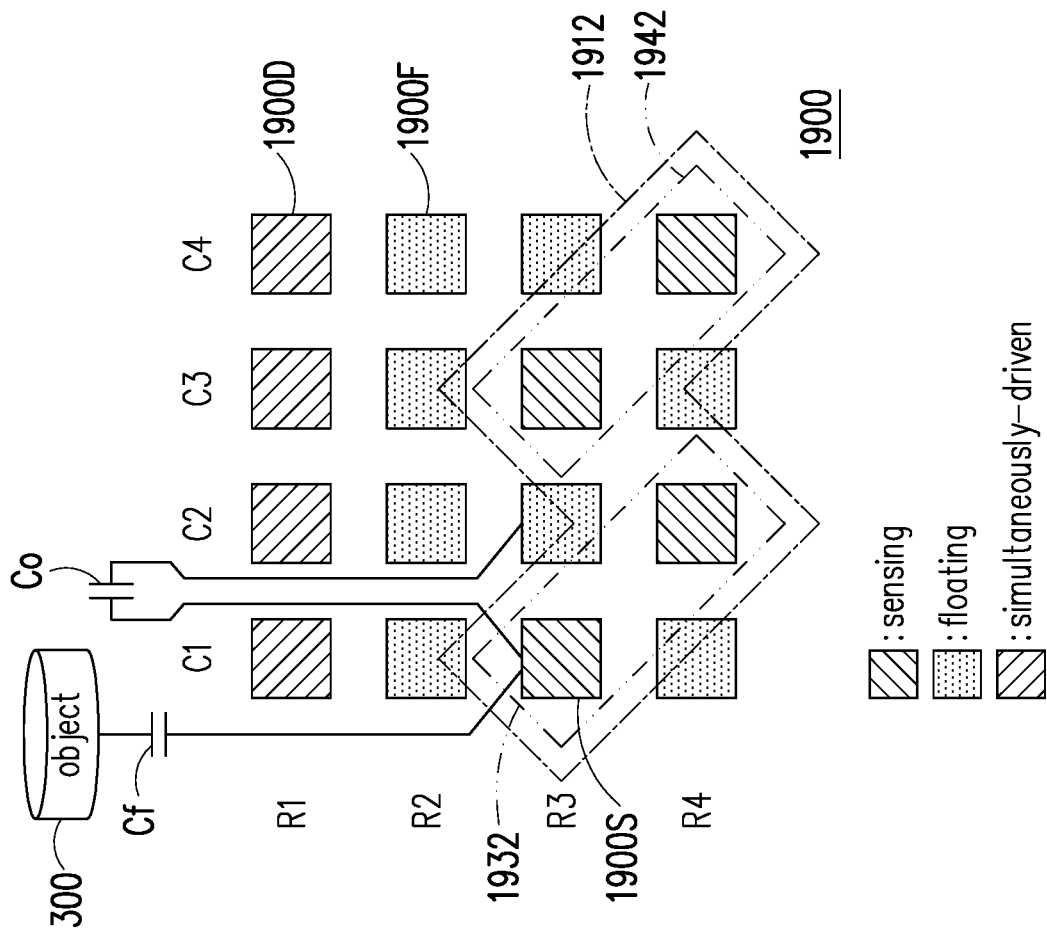
Figure 19D:
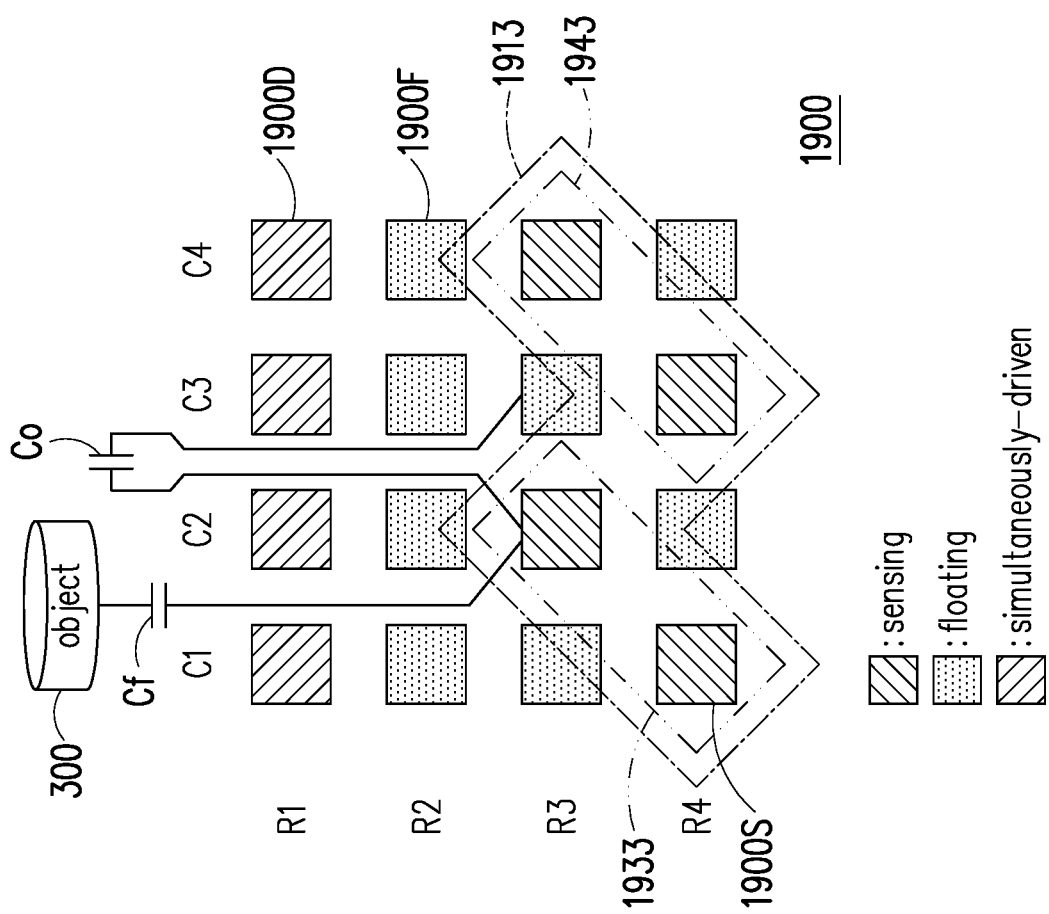

FIG. 19A shows a sensing group 1910. The sensing group 1910 may include touch sensor units 1930 and 1940. FIG. 18B shows a sensing group 1911. The sensing group 1911 may include touch sensor units 1931 and 1941. FIG. 18C shows a sensing group 1912. The sensing group 1912 may include touch sensor units 1932 and 1942. FIG. 18D shows a sensing group 1913. The sensing group 1913 may include touch sensor units 1933 and 1943. FIGS. 19A, 19B, 19C and 19D also show non-sensing groups. The non-sensing groups include the touch sensors 1900F and 1900D.

FIGS. 19A, 19B, 19C and 19D are similar to FIGS. 17A, 17B, 17C and 17D. A difference is that the extension direction of the touch sensor units 1930 to 1933 and 1940 to 1943 may be non-parallel to a column or row direction of a panel. Further description of FIGS. 19A, 19B, 19C and 19D is similar to the description of FIGS. 17A, 17B, 17C and 17D.

Figure 20A:
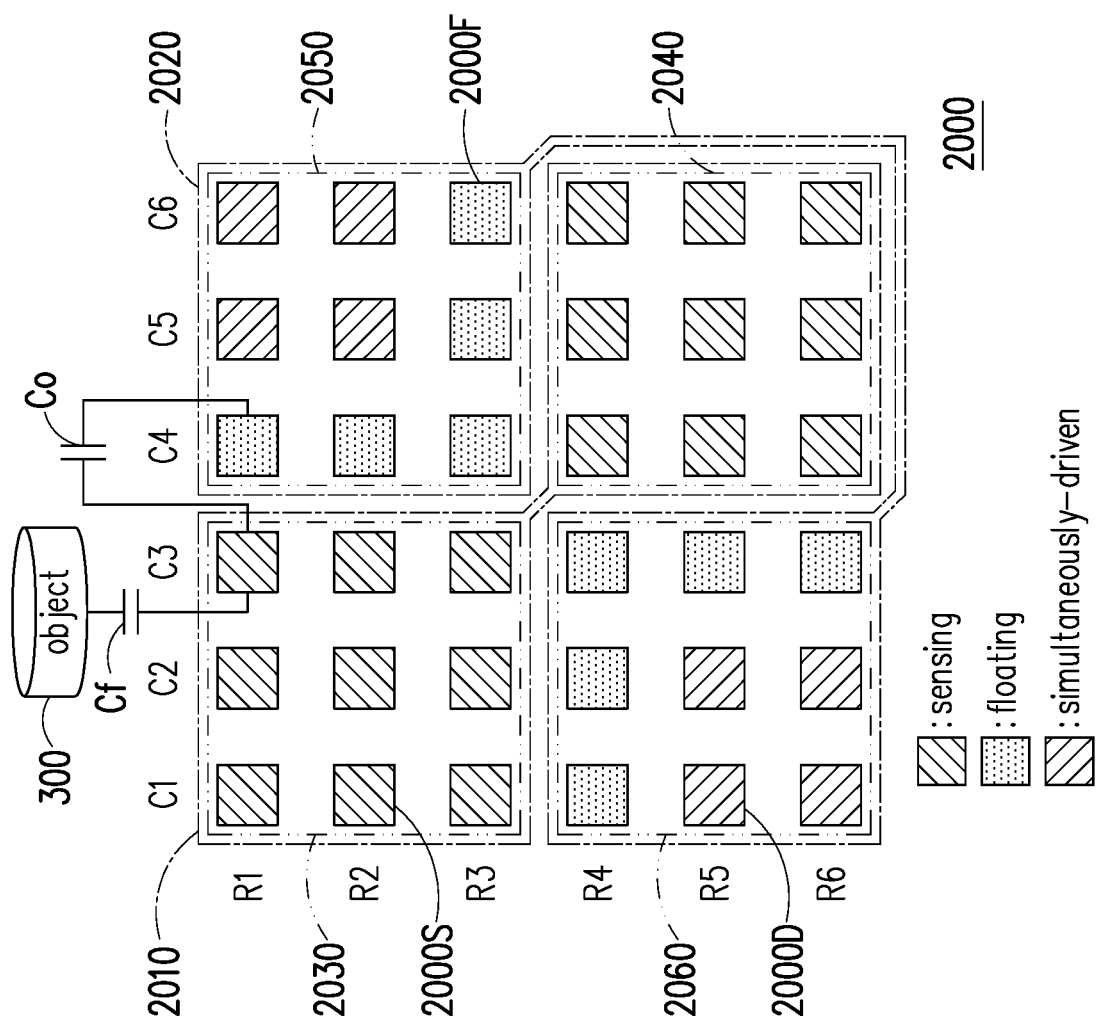
FIGS. 20A and 20B illustrate an array of a plurality of touch sensors which may perform proximity sensing according to an embodiment of the disclosure.
Figure 20B:
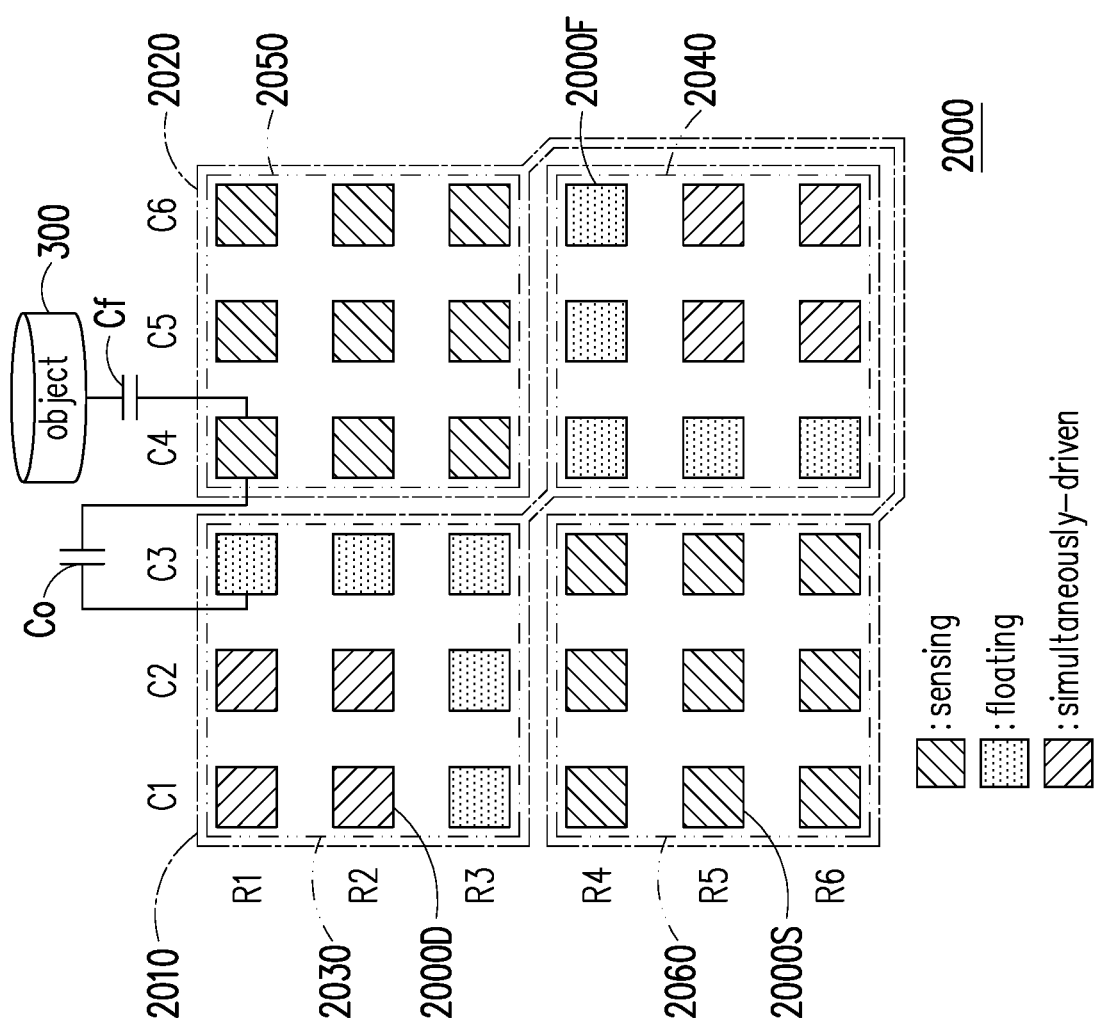

FIGS. 20A and 20B illustrate an array of a plurality of touch sensors which may perform proximity sensing according to an embodiment of the disclosure. FIGS. 20A and 20B show an array of a plurality of touch sensors 2000. The plurality of touch sensors 2000 show touch sensors 2000S, 2000F and 2000D. For example, the touch controller 110 of FIG. 1 may control the plurality of touch sensors 2000. Touch sensors 2000S may perform proximity sensing. Touch sensors 2000S are marked with diagonal lines of bottom-left-to-top-right orientation. Touch sensors 2000F may not perform proximity sensing. Touch sensors 2000F may be set to a floating state in order to increase sensing sensitivity. Touch sensors 2000F are marked with dots. Touch sensors 2000D may not perform proximity sensing. Touch sensors 2000D may be set to a simultaneously-driven state. Touch sensors 2000D are marked with diagonal lines of top-left-to-bottom-right orientation.

FIG. 20A shows a sensing group 2010 and a non-sensing group 2020. The sensing group 2010 may include one or more touch sensors 2000S. The non-sensing group 2020 may include one or more touch sensors 2000F and 2000D. The touch controller 110 may control the sensing group 2010 to perform a proximity sensing operation. The touch controller 110 may not control the non-sensing group 2020 to perform a proximity sensing operation. At least one of the touch sensors 2000F may be adjacent to the sensing group 2010.

The sensing group 2010 may include touch sensor units 2030 and 2040. Each touch sensor unit 2030 and 2040 may include one or more touch sensors 2000S. FIG. 20A shows that nine touch sensors 2000S may be arranged as the touch sensor unit 2030. Similarly, nine touch sensors 2000S may be arranged as the touch sensor unit 2040.

The non-sensing group 2020 may include touch sensor units 2050 and 2060. Each touch sensor unit 2050 and 2060 may include one or more touch sensors 2000F and 2000D. FIG. 20A shows that nine touch sensors 2000F and 2000D may be arranged as the touch sensor unit 2050. Similarly, nine touch sensors 2000F and 2000D may be arranged as the touch sensor unit 2060. Thus, the touch sensor units 2030 and 2040 of the sensing group 2010 and the touch sensor units 2050 and 2060 of the non-sensing group 2020 may include a same number of one or more touch sensors.

The touch sensor units 2030, 2040, 2050 and 2060 may be arranged in an array and alternately disposed in each column and each row of the array. The touch sensors 2000F of the non-sensing group 2020 may be adjacent to the touch sensor units 2030 and 2040.

FIG. 20A shows an object 300, a sensing capacitor Cf and a parasitic capacitor Co. Description of these elements of FIG. 20A is similar to the description of FIG. 17A.

FIG. 20B is similar to FIG. 20A. Difference from FIG. 20A is that FIG. 20B shows a sensing group 2020 and a non-sensing group 2010. Thus, the sensing group of FIG. 20A may be the non-sensing group of FIG. 20B. Similarly, the non-sensing group of FIG. 20A may be the sensing group of FIG. 20B. Description of FIG. 20B is similar to description of FIG. 20A.

For example, the touch controller 110 may control the sensing group 2010 to perform proximity sensing during a first sensing period. The touch controller 110 may not control the non-sensing group 2020 during the first sensing period. The touch controller 110 may control the non-sensing group 2020 to perform proximity sensing during a second sensing period. The touch controller 110 may not control the sensing group 2010 during the second sensing period.

The touch controller 110 may perform a touch sensing operation and a proximity sensing operation with the array of the plurality of touch sensors 2000. In a touch sensing operation, the touch controller 110 may set one or more of the touch sensors 2000F to a simultaneously-driven state during a touch sensing period. FIGS. 20A and 20B show a proximity sensing operation. In the proximity sensing operation, the touch controller 110 may set one or more of the touch sensors 2000F to the floating state during a proximity sensing period. In another embodiment, the touch controller 110 may set one or more touch sensors 2000D to the simultaneously-driven state during the touch sensing period and the proximity sensing period.

Additionally, in other embodiments, the touch controller 210 of FIG. 2 may control the plurality of touch sensors 2000 depicted in FIGS. 20A and 20B.

Figure 21:
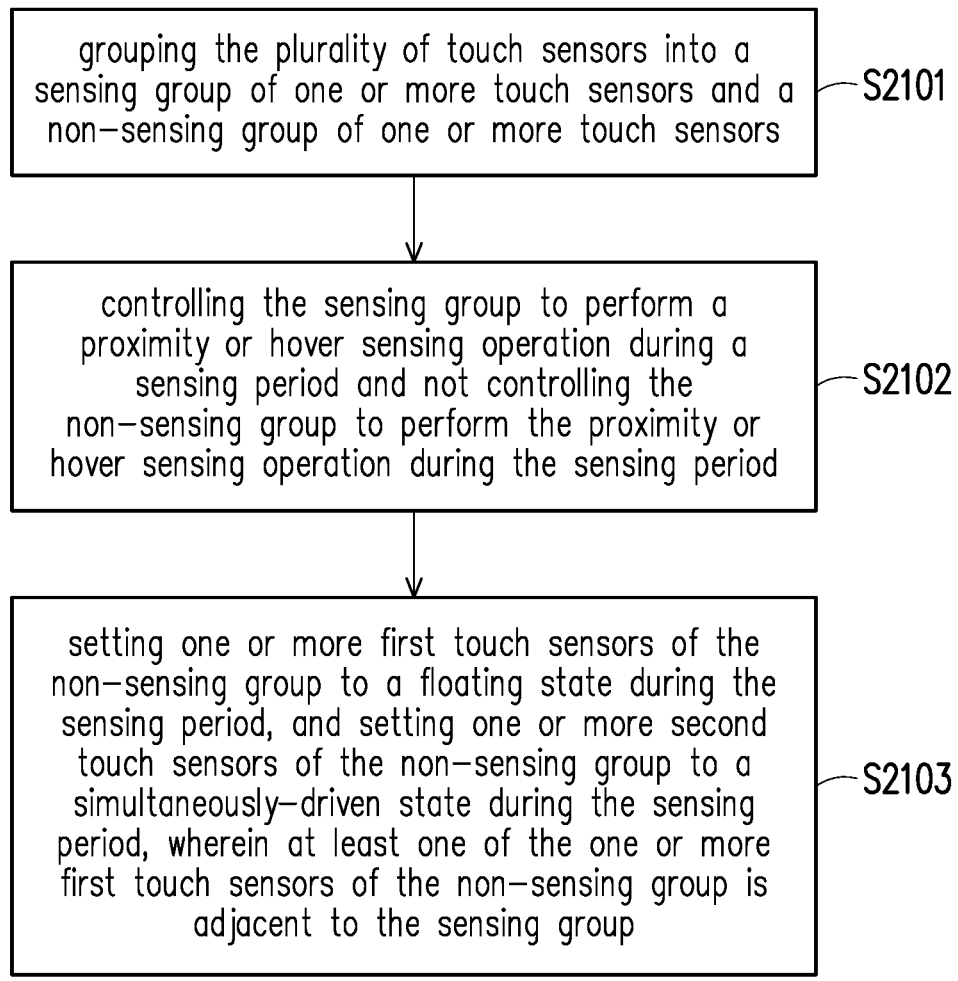
FIG. 21 is a flow chart illustrating a method for driving a touch panel comprising a plurality of touch sensors according to an embodiment of the disclosure.

FIG. 21 is a flow chart illustrating a method for driving a touch panel comprising a plurality of touch sensors according to an embodiment of the disclosure. In an embodiment of the disclosure, the method described in FIG. 21 may be implemented by the electronic device 100 of FIG. 1. In another embodiment of the disclosure, the method described in FIG. 21 may be implemented by the electronic device 200 of FIG. 2. Step S2101 is grouping the plurality of touch sensors into a sensing group of one or more touch sensors and a non-sensing group of one or more touch sensors. Step S2102 is controlling the sensing group to perform a proximity or hover sensing operation during a sensing period and not controlling the non-sensing group to perform the proximity or hover sensing operation during the sensing period. Step S2103 is setting one or more first touch sensors of the non-sensing group to a floating state during the sensing period. Step S2013 may further include setting one or more second touch sensors of the non-sensing group to a simultaneously-driven state during the sensing period. At least one of the one or more first touch sensors of the non-sensing group can be adjacent to the sensing group.

In an embodiment of the disclosure, the method of FIG. 21 may be implemented by the electronic device 100 of FIG. 1. In this embodiment, the sensing group may include at least one touch sensor arranged as a touch sensor unit, and the one or more first touch sensors of the non-sensing group set in the floating state may be adjacent to the touch sensor unit, and the one or more second touch sensors of the non-sensing group set in the simultaneously-driven state may be farther away from the touch sensor unit.

In some implementations, the touch controller may be further configured to control all of the touch sensors surrounding the touch sensor unit to be the one or more first touch sensors of the non-sensing group.

In some implementations, the touch controller may be configured to control a first part of the touch sensors surrounding the touch sensor unit to be the one or more first touch sensors of the non-sensing group and control a second part of the touch sensors surrounding the touch sensor unit to be the one or more second touch sensors of the non-sensing group.

In some implementations, the touch controller may be configured to control all of the touch sensors other than the touch sensors surrounding the touch sensor unit to be the one or more second touch sensors of the non-sensing group.

In some implementations, the touch controller may be configured to control a first part of the touch sensors other than the touch sensors surrounding the touch sensor unit to be the one or more first touch sensors of the non-sensing group and control a second part of the touch sensors other than the touch sensors surrounding the touch sensor unit to be the one or more second touch sensors of the non-sensing group.

In some implementations, the touch sensor unit may be a square shape.

In some implementations, an extension direction may be parallel with a column or row direction of the panel.

In some implementations, an extension direction may be non-parallel with a column or row direction of the panel.

In an embodiment of the disclosure, the method of FIG. 21 may be implemented by the electronic device 100 of FIG. 1. In this embodiment, the proximity or hover sensing may be a self-sensing operation and the touch controller may be further configured to control the plurality of touch sensors to perform a mutual-sensing operation in a second sensing period.

Figure 22:
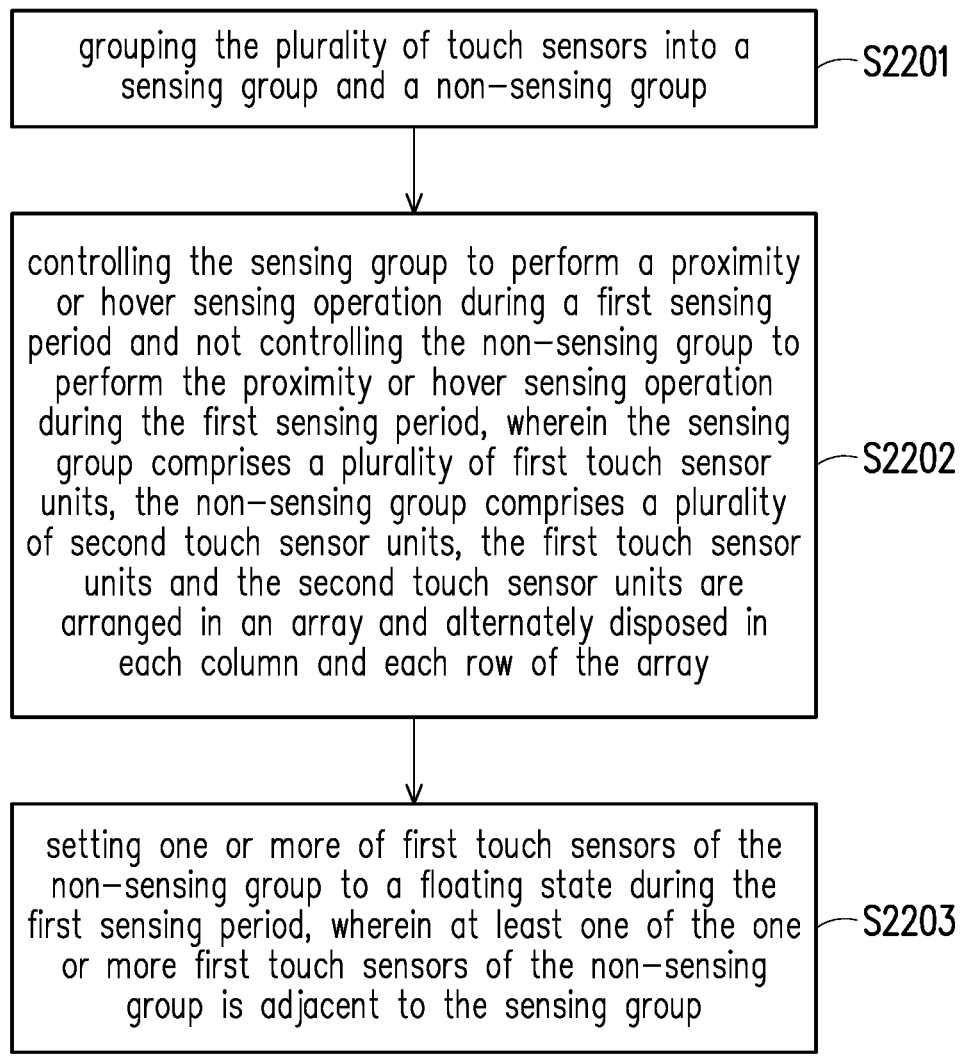
FIG. 22 is a flow chart illustrating a method for driving a touch panel comprising a plurality of touch sensors according to an embodiment of the disclosure.

FIG. 22 is a flow chart illustrating a method for driving a touch panel comprising a plurality of touch sensors according to an embodiment of the disclosure. In an embodiment of the disclosure, the method described in FIG. 22 may be implemented by the electronic device 100 of FIG. 1. In another embodiment of the disclosure, the method described in FIG. 22 may be implemented by the electronic device 200 of FIG. 2. Step S2201 is grouping (i.e., determining or defining or obtaining information about) the plurality of touch sensors into a sensing group and a non-sensing group. Step S2202 is controlling the sensing group to perform a proximity or hover sensing operation during a first sensing period and not controlling the non-sensing group to perform the proximity or hover sensing operation during the first sensing period, wherein the sensing group includes a plurality of first touch sensor units, the non-sensing group includes a plurality of second touch sensor units, the first touch sensor units and the second touch sensor units are arranged in an array and alternately disposed in each column and each row of the array. Step S2203 is setting one or more of first touch sensors of the non-sensing group to a floating state during the first sensing period, wherein at least one of the one or more first touch sensors of the non-sensing group is adjacent to the sensing group.

In an embodiment of the disclosure, the method of FIG. 22 may be implemented by the electronic device 100 of FIG. 1. In this embodiment, the touch controller may be further configured to set one or more second touch sensors of the non-sensing group to a simultaneously-driven state during the first sensing period.

In other words, in some implementations, all touch sensors of the non-sensing group can be set to a floating state. Alternatively, some touch sensors of the non-sensing group can be set to a floating state and some other touch sensors of the non-sensing group can be set to a simultaneously-driven state.

In some implementations, the one or more first touch sensors of the non-sensing group may be adjacent to the first touch sensor units of the sensing group in the first sensing period, and the one or more second touch sensors of the non-sensing group may be farther away from the touch sensor unit of the sensing group in the first sensing period.

In some implementations, each of the first touch sensor units and the second touch sensor units may include a same number of one or more touch sensors.

In some implementations, the touch controller may be configured to further control the non-sensing group to perform a proximity or hover sensing operation during a second sensing period and not control the sensing group to perform the proximity or hover sensing operation during the second sensing period. In other words, the sensing group and the non-sensing group can be rearranged, and the above state-setting operation can be performed similarly.

Figure 23:
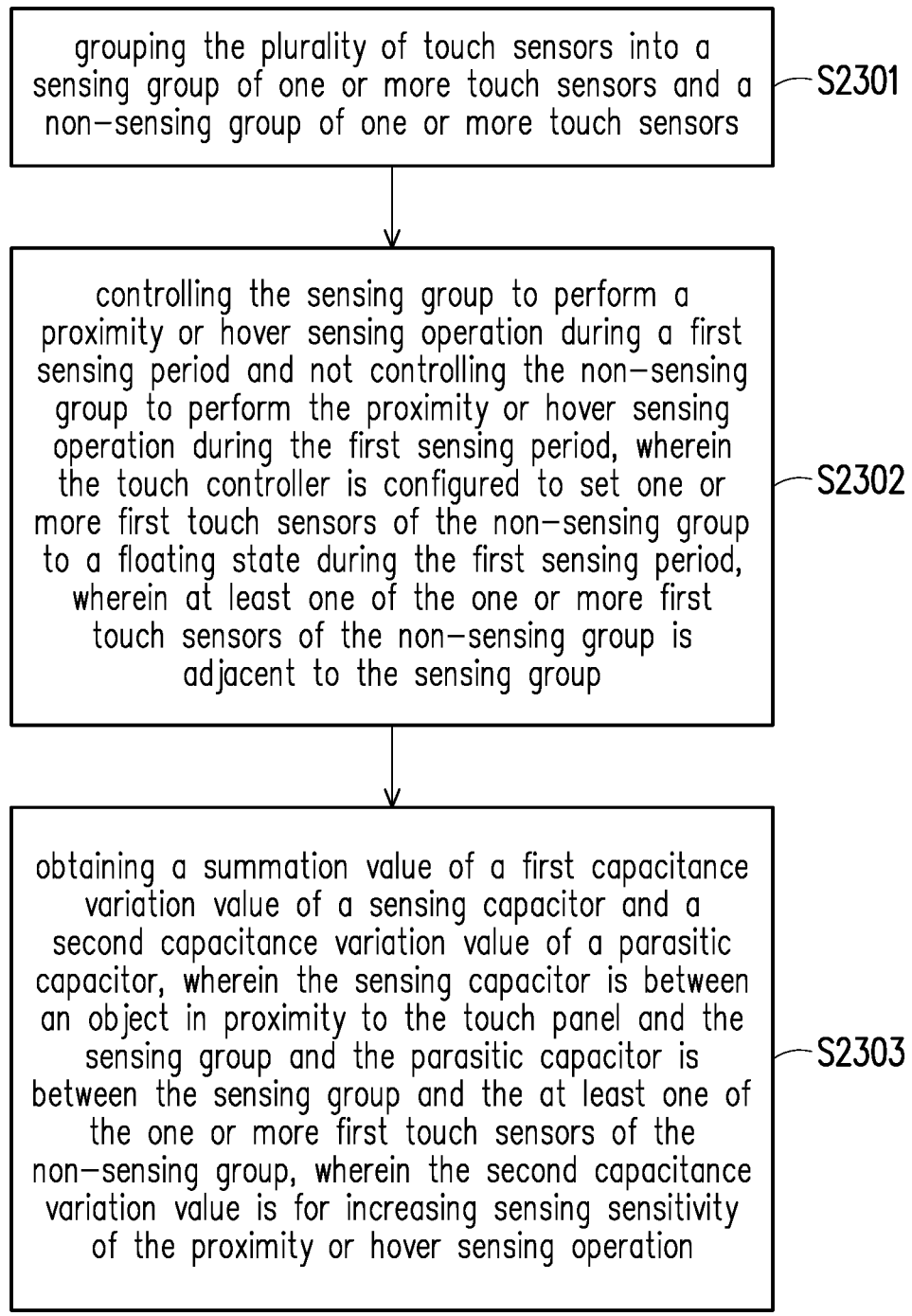
FIG. 23 is a flow chart illustrating a method for controlling a touch panel comprising a plurality of touch sensors according to an embodiment of the disclosure.

FIG. 23 is a flow chart illustrating a method for controlling a touch panel comprising a plurality of touch sensors according to an embodiment of the disclosure. In an embodiment of the disclosure, the method described in FIG. 23 may be implemented by the electronic device 100 of FIG. 1. In another embodiment of the disclosure, the method described in FIG. 23 may be implemented by the electronic device 200 of FIG. 2. Step S2301 is grouping (i.e., determining or defining or obtaining information about) the plurality of touch sensors into a sensing group of one or more touch sensors and a non-sensing group of one or more touch sensors. Step S2302 is controlling the sensing group to perform a proximity or hover sensing operation during a first sensing period and not controlling the non-sensing group to perform the proximity or hover sensing operation during the first sensing period, wherein the touch controller is configured to set one or more first touch sensors of the non-sensing group to a floating state during the first sensing period, wherein at least one of the one or more first touch sensors of the non-sensing group can be adjacent to the sensing group. Step S2303 is obtaining a summation value of a first capacitance variation value of a sensing capacitor and a second capacitance variation value of a parasitic capacitor, wherein the sensing capacitor can be between an object in proximity to the touch panel and the sensing group and the parasitic capacitor can be between the sensing group and the at least one of the one or more first touch sensors of the non-sensing group. The second capacitance variation value can exist for increasing sensing sensitivity of the proximity or hover sensing operation. More details can be referred to the descriptions related to the embodiments of FIGS. 3A-3B and FIGS. 4A-4B.

In an embodiment of the disclosure, the method of FIG. 23 may be implemented by the electronic device 100 of FIG. 1. In this embodiment, the touch controller may be configured to set one or more second touch sensors of the non-sensing group to a simultaneously-driven state during the first sensing period.

In other words, in some implementations, all touch sensors of the non-sensing group can be set to a floating state. Alternatively, some touch sensors of the non-sensing group can be set to a floating state and some other touch sensors of the non-sensing group can be set to a simultaneously-driven state.

Figure 24:
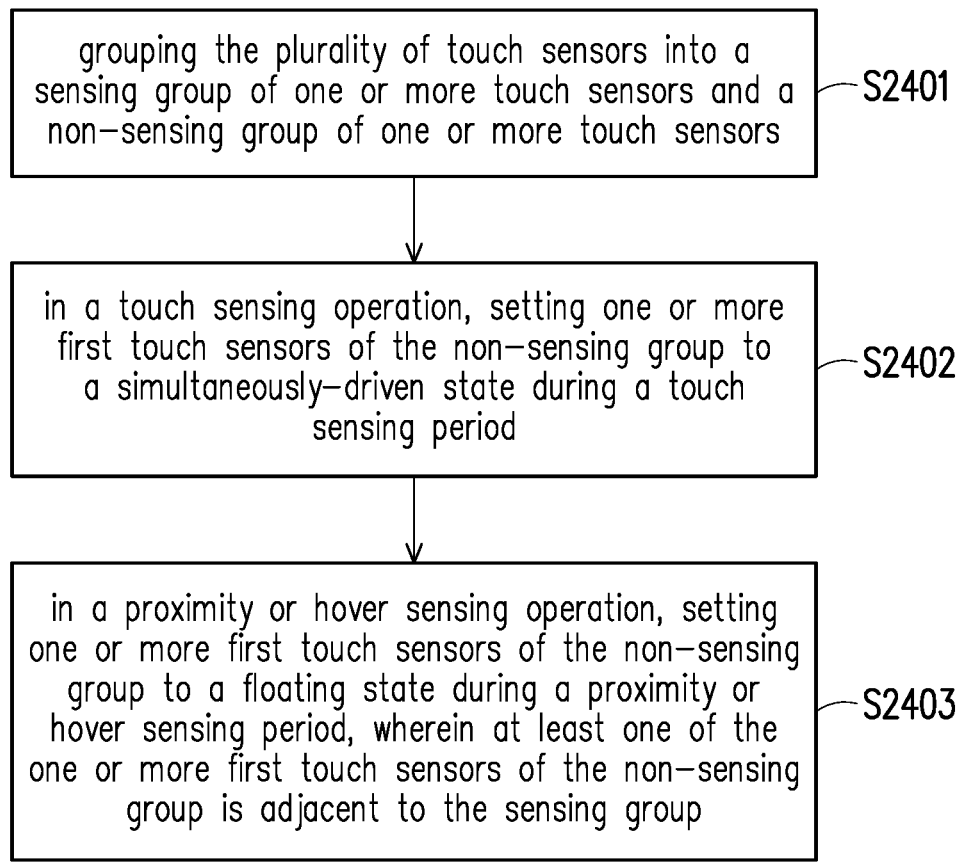
FIG. 24 is a flow chart illustrating a method for controlling a touch panel comprising a plurality of touch sensors according to an embodiment of the disclosure.

FIG. 24 is a flow chart illustrating a method for controlling a touch panel comprising a plurality of touch sensors according to an embodiment of the disclosure. In an embodiment of the disclosure, the method described in FIG. 24 may be implemented by the electronic device 100 of FIG. 1. In another embodiment of the disclosure, the method described in FIG. 24 may be implemented by the electronic device 200 of FIG. 2. Step S2401 is grouping (i.e., determining or defining or obtaining information about) the plurality of touch sensors into a sensing group of one or more touch sensors and a non-sensing group of one or more touch sensors. Step S2402 is in a touch sensing operation, setting one or more first touch sensors of the non-sensing group to a simultaneously-driven state during a touch sensing period (for example, under a touch sensing mode). Step S2403 is in a proximity or hover sensing operation, setting one or more first touch sensors of the non-sensing group to a floating state during a proximity or hover sensing period (for example, under a proximity or hover sensing mode), wherein at least one of the one or more first touch sensors of the non-sensing group is adjacent to the sensing group. It is noted that steps 2402 and S2403 may be performed in an opposite sequence according to operation conditions. In addition, the sensing group and the non-sensing group can be changed between different modes according to operation conditions.

In some embodiments, all touch sensors of a non-sensing group may be set to a simultaneously-driven state under the touch sensing mode. Differently, at least some or even all of the touch sensors of touch sensors of a non-sensing group may be set to a floating state during the proximity or hover sensing mode.

The touch controller may use the touch sensing operation to sense that an object touches the panel. During a proximity sensing operation, the touch controller may need to increase sensing sensitivity since the object may not touch the panel. In order to increase sensing sensitivity, the touch controller may set at least several touch sensors of the non-sensing group to the floating state.

In an embodiment of the disclosure, the method of FIG. 24 may be implemented by the electronic device 100 of FIG. 1. In this embodiment, the touch controller may be configured to set the first touch sensors to the floating state to introduce a capacitance variation value of a parasitic capacitor between the sensing group and the at least one of the one or more first touch sensors of the non-sensing group and thereby increase sensing sensitivity of the proximity or hover sensing operation.

In the same or alternative embodiment, the touch controller may be configured to set one or more second touch sensors of the non-sensing group to a simultaneously-driven state during the touch sensing period and the proximity or hover sensing period.

In view of the aforementioned descriptions, the disclosure is suitable for being used in an electronic device controlling a touch panel to perform proximity or hover sensing operation. The electronic device includes a touch controller. The touch controller is coupled to the touch panel. The touch panel includes a plurality of touch panel sensors. The electronic device described in the several embodiments of the disclosure performs proximity or hover sensing operation with the touch panel sensors of a sensing group. The electronic devices set the touch panel sensors in a non-sensing group to a floating state and/or to a simultaneously-driven state. Thus, the electronic device may provide higher sensing sensitivity, proximity or hover sensing for longer distances, and lower power consumption.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device to control a touch panel comprising
an array of a plurality of touch sensors, the electronic device comprising:
a touch controller, configured to group the plurality of touch sensors into a sensing group of one or more touch sensors and a non-sensing group of one or more touch sensors, control the sensing group to perform a proximity or hover sensing operation during a first sensing period and not control the non-sensing group to perform the proximity or hover sensing operation during the first sensing period,
wherein the touch controller is configured to set one or more first touch sensors of the non-sensing group to a floating state as floating sensors during the first sensing period, and set one or more second touch sensors of the non-sensing group to a simultaneously-driven state during the first sensing period,
wherein each touch sensor of the sensing group and each floating sensor of the non-sensing group are alternately arranged along at least one row of the touch panel,
wherein at least one of the one or more first touch sensors of the non-sensing group is adjacent to the sensing group.

2. The electronic device of claim 1, wherein the sensing group comprises at least one touch sensor arranged as a touch sensor unit, and the one or more first touch sensors of the non-sensing group are adjacent to the touch sensor unit, and the one or more second touch sensors of the non-sensing group are farther away from the touch sensor unit.

3. The electronic device of claim 2, wherein the touch controller is configured to control all of the touch sensors surrounding the touch sensor unit to be the one or more first touch sensors of the non-sensing group.

4. The electronic device of claim 2, wherein the touch controller is configured to control a first part of the touch sensors surrounding the touch sensor unit to be the one or more first touch sensors of the non-sensing group and control a second part of the touch sensors surrounding the touch sensor unit to be the one or more second touch sensors of the non-sensing group.

5. The electronic device of claim 2, wherein the touch controller is configured to control all of the touch sensors other than the touch sensors surrounding the touch sensor unit to be the one or more second touch sensors of the non-sensing group.

6. The electronic device of claim 2, wherein the touch controller is configured to control a first part of the touch sensors other than the touch sensors surrounding the touch sensor unit to be the one or more first touch sensors of the non-sensing group and control a second part of the touch sensors other than the touch sensors surrounding the touch sensor unit to be the one or more second touch sensors of the non-sensing group.

7. The electronic device of claim 2, wherein the touch sensor unit is a square shape.

8. The electronic device of claim 2, wherein the extension direction of the touch sensor unit is parallel with a column or row direction of the touch panel.

9. The electronic device of claim 2, wherein the extension direction of the touch sensor unit is non-parallel with a column or row direction of the touch panel.

10. The electronic device of claim 1, wherein the touch controller is further configured to control the plurality of touch sensors to perform a touch-sensing operation in a second sensing period during which the touch controller is configured to set the one or more first touch sensors of the non-sensing group to the simultaneously-driven state.

11. The electronic device of claim 1, wherein the proximity or hover sensing operation is a self-sensing operation which uses the sensing group serving as both transmitters and receivers, and wherein the touch controller is configured to control the plurality of touch sensors to perform a mutual-sensing operation in a second sensing period.

12. An electronic device to control a touch panel comprising an array of a plurality of touch sensors, the electronic device comprising:
- a touch controller, configured to group the plurality of touch sensors into a sensing group and a non-sensing group, control the sensing group to perform a proximity or hover sensing operation during a first sensing period and not control the non-sensing group to perform the proximity or hover sensing operation during the first sensing period,
- wherein the sensing group comprises a plurality of first touch sensor units each comprising one or more touch sensors, the non-sensing group comprises a plurality of second touch sensor units each comprising one or more touch sensors, the first touch sensor units of the sensing group and the second touch sensor units of the non-sensing group are arranged in an array and alternately disposed in each column and each row of the array,
- wherein the touch controller is configured to set one or more of first touch sensors of the non-sensing group to a floating state during the first sensing period, and
- wherein at least one of the one or more first touch sensors of the non-sensing group is adjacent to the sensing group.

13. The electronic device of claim 12, wherein the touch controller is further configured to set one or more second touch sensors of the non-sensing group to a simultaneously-driven state during the first sensing period.

14. The electronic device of claim 12, wherein the one or more first touch sensors of the non-sensing group are adjacent to the first touch sensor units of the sensing group in the first sensing period, and one or more second touch sensors of the non-sensing group are farther away from the touch sensor unit of the sensing group in the first sensing period.

15. The electronic device of claim 12, wherein each of the first touch sensor units and the second touch sensor units comprises a same number of one or more touch sensors.

16. The electronic device of claim 12, wherein
- the touch controller is configured to further control the non-sensing group to perform a proximity or hover sensing operation during a second sensing period and not control the sensing group to perform the proximity or hover sensing operation during the second sensing period.

17. An electronic device, comprising:
- a touch panel comprising an array of a plurality of touch sensors; and
- a touch controller, coupled to the touch panel and configured to group the plurality of touch sensors into a sensing group and a non-sensing group, control the sensing group to perform a proximity or hover sensing operation during a first sensing period and not control the non-sensing group to perform the proximity or hover sensing operation during the first sensing period,
- wherein the sensing group comprises a plurality of first touch sensor units, the non-sensing group comprises a plurality of second touch sensor units, the first touch sensor units of the sensing group and the second touch sensor units of the non-sensing group are arranged in an array and alternately disposed in each column and each row of the array,
- wherein the touch controller is configured to set one or more of first touch sensors of the non-sensing group to a floating state during the first sensing period, and
- wherein at least one of the one or more first touch sensors of the non-sensing group is adjacent to the sensing group.

18. A method for driving a touch panel, wherein the touch panel comprises an array of a plurality of touch sensors, the method comprising:
- grouping the plurality of touch sensors into a sensing group and a non-sensing group;
- controlling the sensing group to perform a proximity or hover sensing operation during a first sensing period and not controlling the non-sensing group to perform the proximity or hover sensing operation during the first sensing period, wherein the sensing group comprises a plurality of first touch sensor units, the non-sensing group comprises a plurality of second touch sensor units, the first touch sensor units of the sensing group and the second touch sensor units of the non-sensing group are arranged in an array and alternately disposed in each column and each row of the array; and
- setting one or more of first touch sensors of the non-sensing group to a floating state during the first sensing period, wherein at least one of the one or more first touch sensors of the non-sensing group is adjacent to the sensing group.

19. An electronic device to control a touch panel comprising an array of a plurality of touch sensors, the electronic device comprising:
- a touch controller, configured to group the plurality of touch sensors into a sensing group of one or more touch sensors and a non-sensing group of one or more touch sensors, control the sensing group to perform a proximity or hover sensing operation during a first sensing period and not control the non-sensing group to perform the proximity or hover sensing operation during the first sensing period,
- wherein the touch controller is configured to set one or more first touch sensors of the non-sensing group to a floating state during the first sensing period,
- wherein at least one of the one or more first touch sensors of the non-sensing group is adjacent to the sensing group,
- the touch controller is configured to obtain a summation value of a first capacitance variation value of a sensing capacitor and obtain a second capacitance variation value of a parasitic capacitor, wherein the second capacitance variation value of the parasitic capacitor is not zero, and the second capacitance variation value of the parasitic capacitor serves to increase sensing sensitivity of the proximity or hover sensing operation,
- wherein the sensing capacitor is between an object in proximity to the touch panel and the sensing group and the parasitic capacitor is between the sensing group and the at least one of the one or more first touch sensors of the non-sensing group.

20. The electronic device of claim 19, wherein the touch controller is configured to
- set one or more second touch sensors of the non-sensing group to a simultaneously-driven state during the first sensing period.

21. An electronic device to control a touch panel comprising an array of a plurality of touch sensors, the electronic device comprising:
- a touch controller, configured to group the plurality of touch sensors into a sensing group of one or more touch sensors and a non-sensing group of one or more touch sensors, wherein the touch controller is configured to set one or more first touch sensors of the non-sensing group to a simultaneously-driven state only when performing a touch sensing operation, wherein the touch controller is configured to set the one or more first touch sensors of the non-sensing group to a floating state only when performing a proximity or hover sensing operation, and wherein at least one of the one or more first touch sensors of the non-sensing group is adjacent to the sensing group.

22. The electronic device of claim 21, wherein the touch controller is configured to set the first touch sensors to the floating state to introduce a capacitance variation value of a parasitic capacitor between the sensing group and the at least one of the one or more first touch sensors of the non-sensing group and thereby increase sensing sensitivity of the proximity or hover sensing operation.

23. The electronic device of claim 21, wherein the touch controller is configured to set one or more second touch sensors of the non-sensing group to a simultaneously-driven state during the touch sensing period and the proximity or hover sensing period.

24. The electronic device of claim 21, wherein the proximity or hover sensing operation is a self-sensing operation which uses the sensing group serving as both transmitters and receivers.

25. An electronic device to control a touch panel comprising an array of a plurality of touch sensors, the electronic device comprising:

a touch controller, configured to group the plurality of touch sensors into a sensing group of one or more touch sensors and a non-sensing group of one or more touch sensors, control the sensing group to perform a proximity or hover sensing operation during a first sensing period and not control the non-sensing group to perform the proximity or hover sensing operation during the first sensing period, wherein the touch controller is configured to set one or more first touch sensors of the non-sensing group to a floating state during the first sensing period, wherein at least one of the one or more first touch sensors of the non-sensing group is adjacent to the sensing group, wherein the touch controller is further configured to control the sensing group to perform a touch sensing operation during a second sensing period, different from the first sensing period used for performing the proximity or hover sensing operation, and configured to not control the non-sensing group to perform the touch sensing operation during the second sensing period, wherein the touch controller is further configured to set the one or more first touch sensors of the non-sensing group to a simultaneously-driven state during the second sensing period associated with the touch sensing operation.

26. The electronic device of claim 25, wherein the touch controller is configured to set all of the touch sensors of the non-sensing group to the floating state during the first sensing period.

27. The electronic device of claim 25, wherein the touch controller is further configured to set one or more second touch sensors of the non-sensing group to a simultaneously-driven state during the first sensing period.

* * * * *